US006241334B1

(12) United States Patent
Haselby

(10) Patent No.: US 6,241,334 B1
(45) **Date of Patent: *Jun. 5, 2001**

(54) AUTOMATIC PRINT CARTRIDGE ALIGNMENT SENSOR SYSTEM

(75) Inventor: Robert D. Haselby, San Diego, CA (US)

(73) Assignee: Hewlett Packard Company, Fort Collins, CO (US)

(*) Notice: Subject to any disclaimer, the term of this patent is extended or adjusted under 35 U.S.C. 154(b) by 0 days.

This patent is subject to a terminal disclaimer.

(21) Appl. No.: 09/273,014

(22) Filed: Mar. 19, 1999

Related U.S. Application Data

(62) Division of application No. 08/885,337, filed on Jun. 30, 1997, which is a continuation of application No. 08/200,101, filed on Feb. 22, 1994, now Pat. No. 5,644,344, which is a continuation of application No. 07/786,145, filed on Oct. 31, 1991, now Pat. No. 5,289,208.

(51) Int. Cl.[7] ........ B41J 2/01
(52) U.S. Cl. ........ 347/19
(58) Field of Search ........ 347/19, 81, 37; 356/379, 380; 400/708, 709; 395/103, 105

(56) References Cited

U.S. PATENT DOCUMENTS

| | | | | |
|---|---|---|---|---|
| 4,878,063 | * | 10/1989 | Katerberg | 347/19 |
| 4,916,638 | | 4/1990 | Haselby et al. | 358/1.5 |
| 5,036,340 | | 7/1991 | Osborne | 347/19 |
| 5,049,898 | | 9/1991 | Arthur et al. | 347/19 |
| 5,069,556 | * | 12/1991 | Sasaki et al. | 400/74 |
| 5,109,239 | | 4/1992 | Cobbs et al. | 347/19 |
| 5,250,956 | * | 10/1993 | Haselby et al. | 347/19 |
| 5,644,344 | * | 7/1997 | Hasselby | 347/19 |

* cited by examiner

*Primary Examiner*—John Barlow
*Assistant Examiner*—Craig A. Hallacher
(74) *Attorney, Agent, or Firm*—Pennie & Edmonds LLP

(57) ABSTRACT

Apparatus and techniques are disclosed for aligning the operation of the ink jet printhead cartridges of a multiple printhead ink jet swath printer that includes a print carriage that is movable along a horizontal carriage scan axis, (b) first and second ink jet printhead cartridges supported by the movable carriage for printing onto a print media that is selectively movable along a vertical media scan axis, and (c) an optical sensor supported by the movable carriage. The optical sensor includes a quad photodiode detector whose outputs are indicative of the horizontal positions of vertical test lines imaged on the detector in conjunction with horizontal alignment correction, as well as the vertical positions of horizontal test lines imaged on the detector in conjunction with vertical alignment correction.

18 Claims, 41 Drawing Sheets

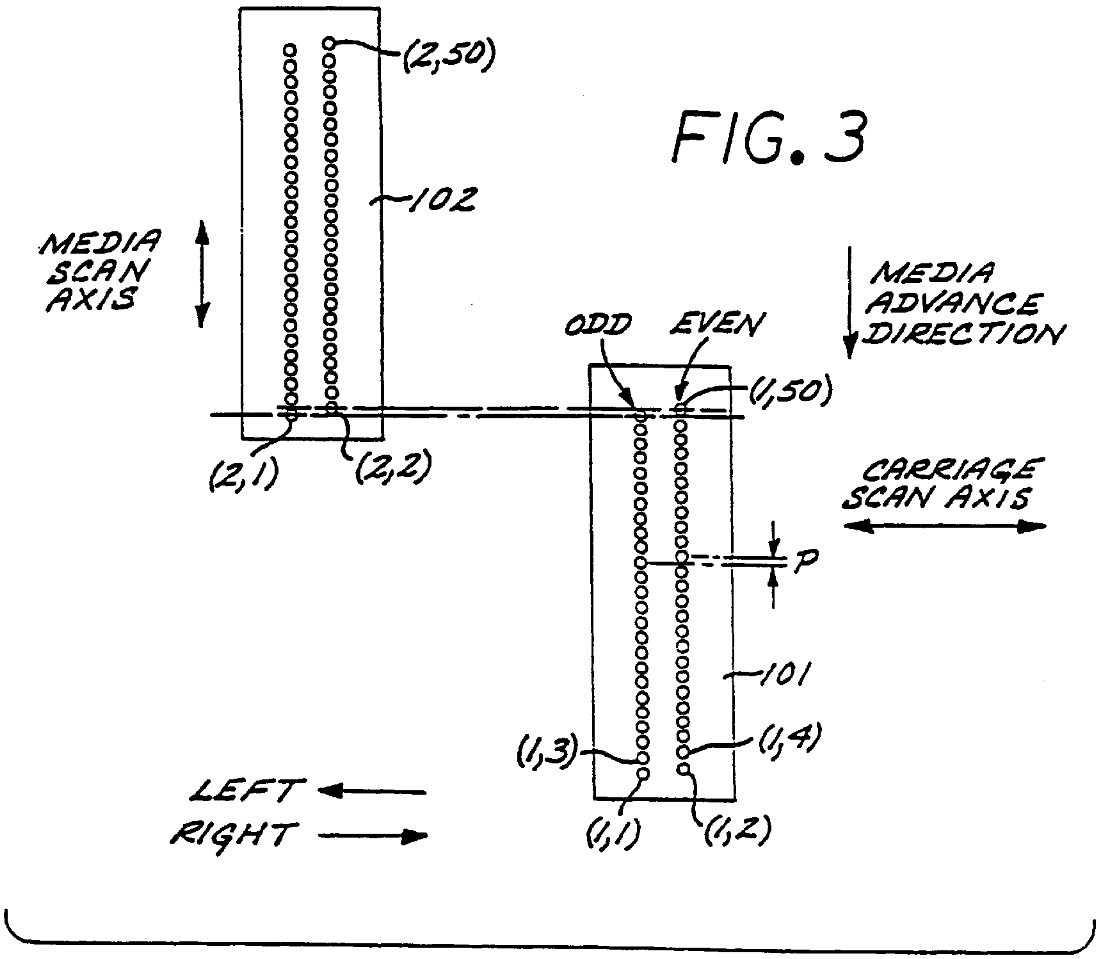
FIG. 3
FIG. 2
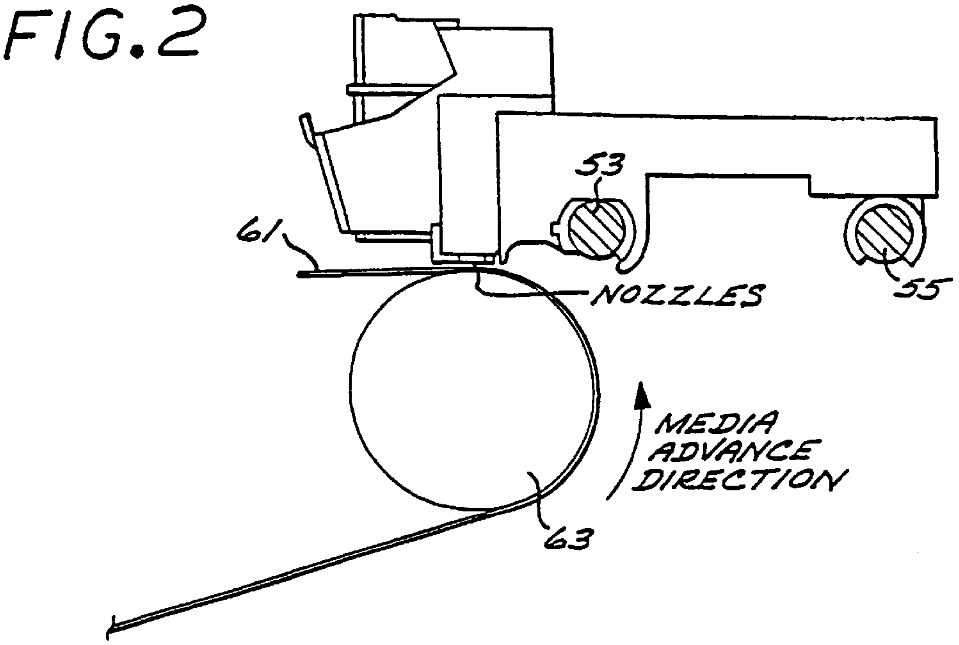

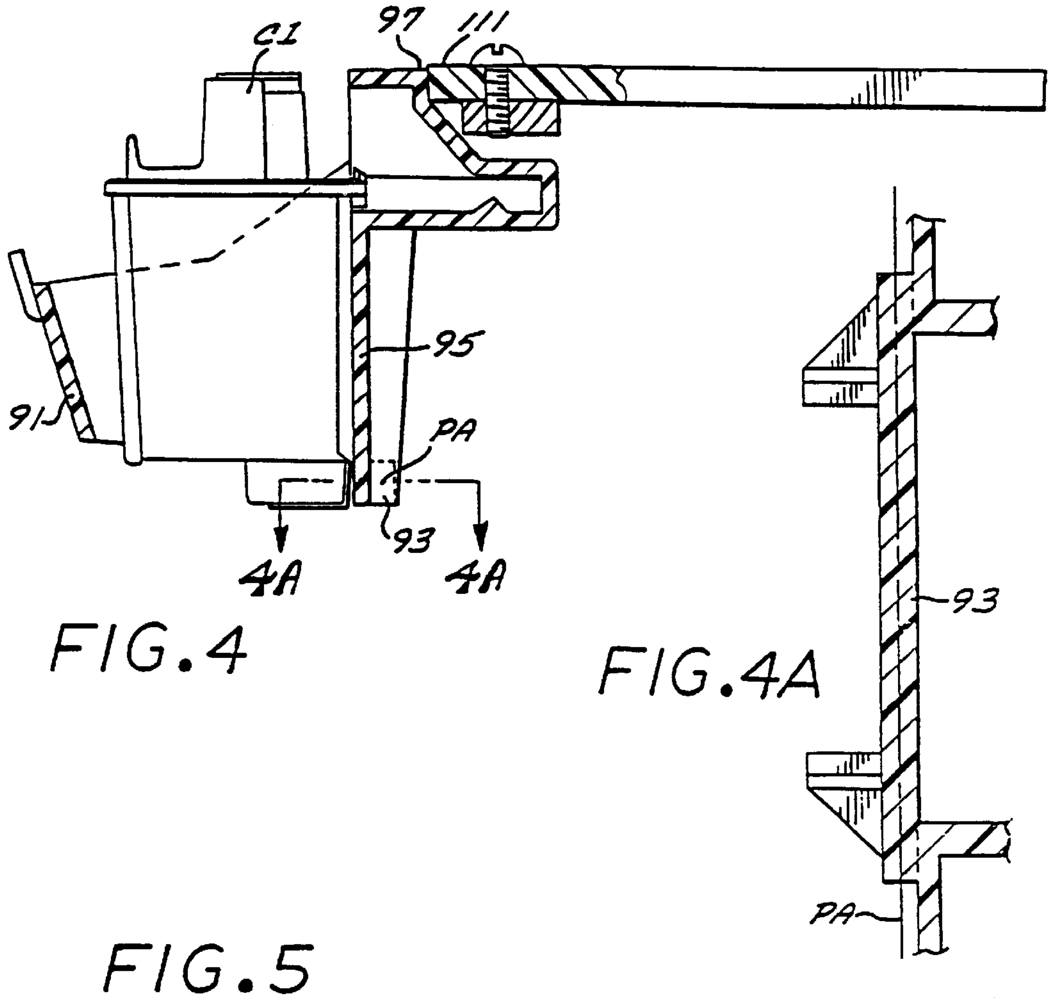
FIG. 4
FIG. 4A
FIG. 5
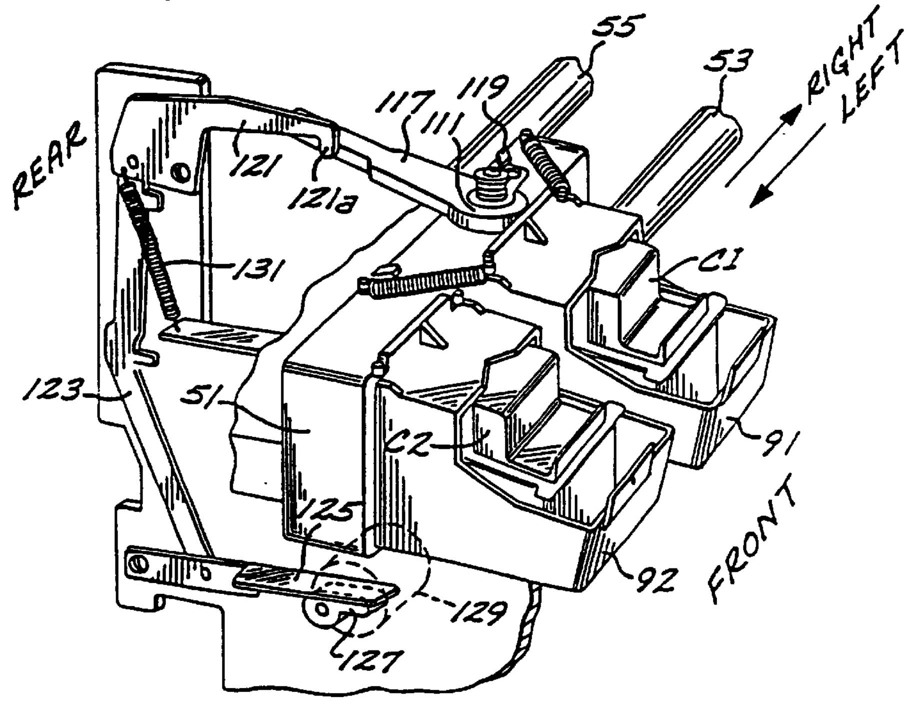

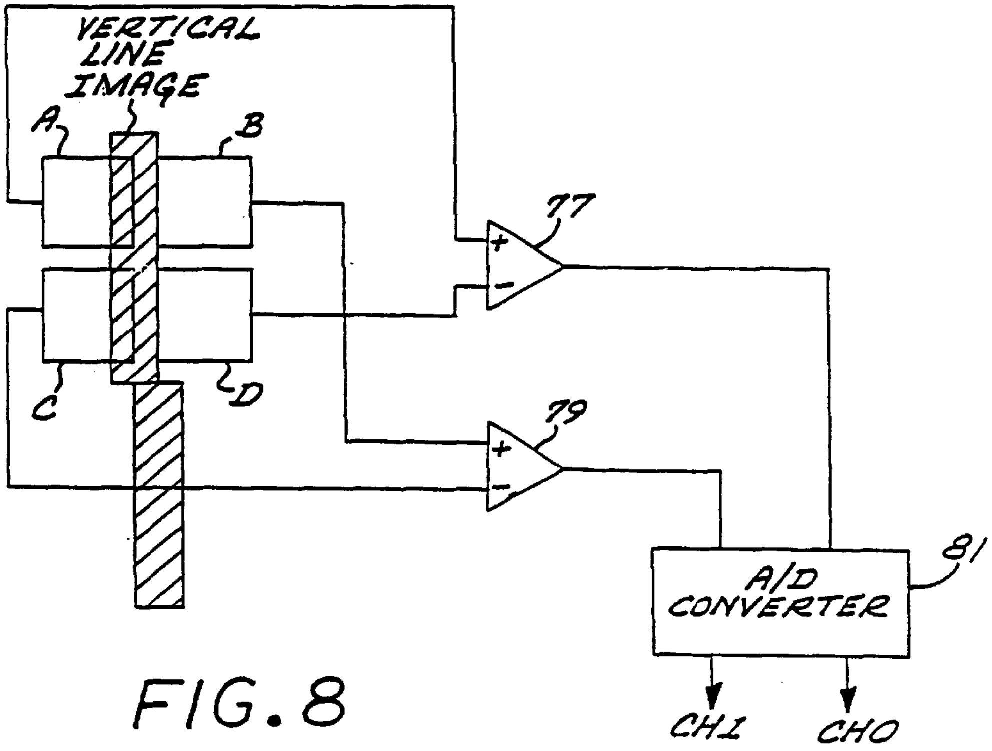
FIG. 8
FIG. 9
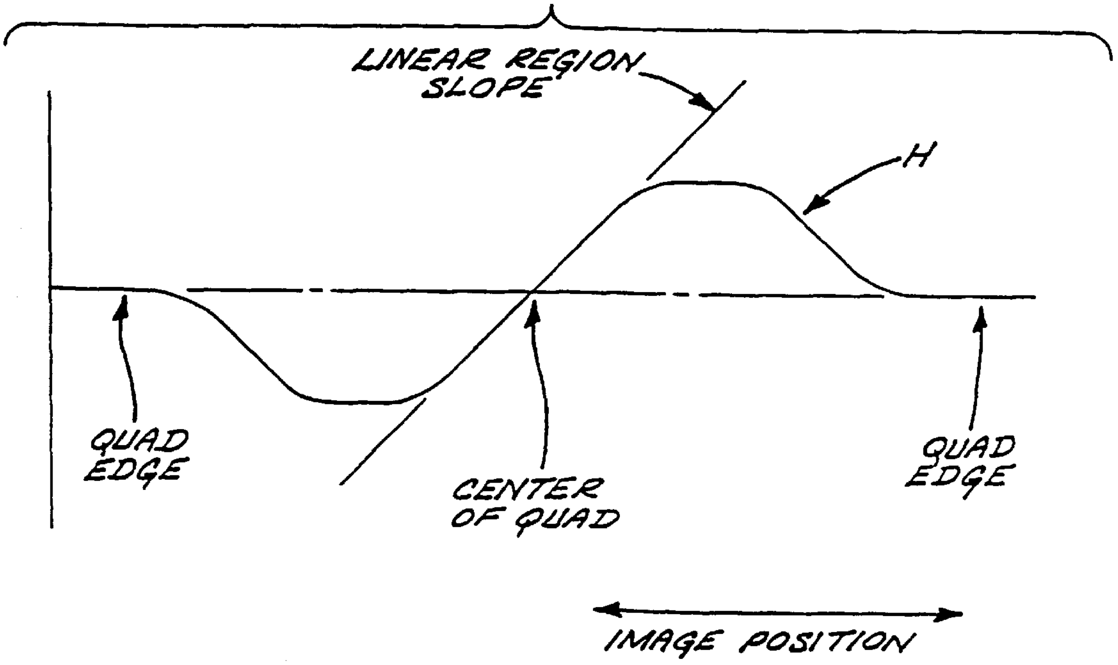

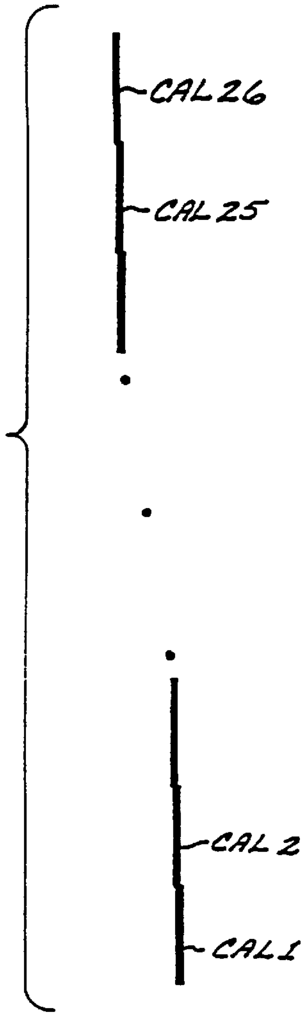
FIG. 10
FIG. 11
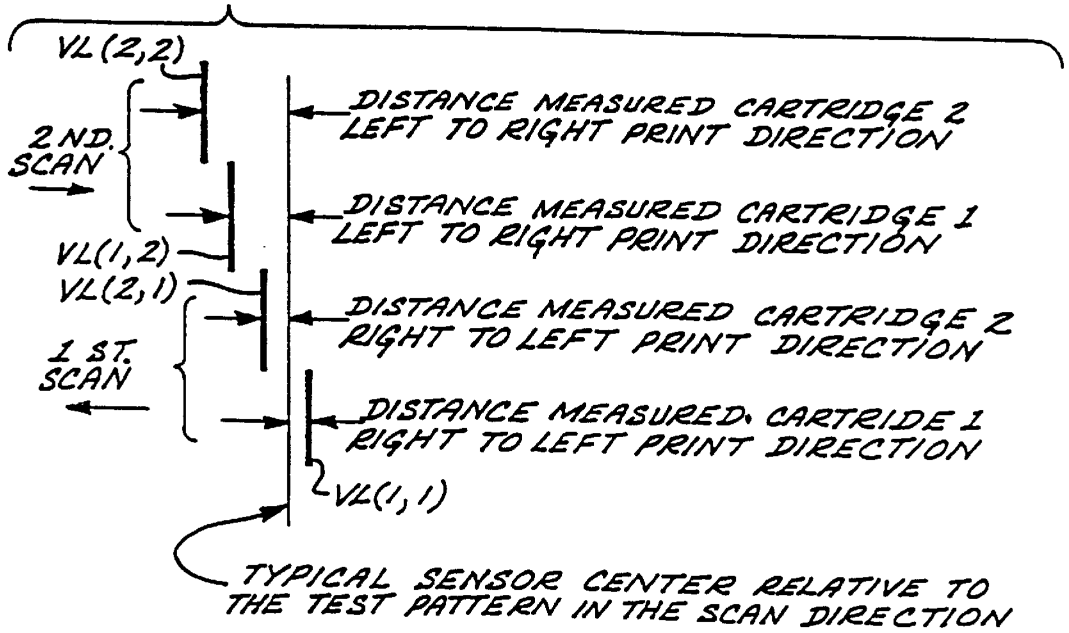

(6)

389 — USE THE FRACTION PART OF THE CALCULATED CORRECTION VALUES TO CALCULATE THE APPROPRIATE TIMING CORRECTIONS FOR EACH PRINT CARTRIDGE FOR EACH DIRECTION OF PRINTING; THESE DELAY TIMES WILL BE LOADED BEFORE EACH SWATH AND WILL BE DEPENDENT UPON WHICH DIRECTION OF PRINTING WILL FOLLOW

391 — UPDATE THE EXISTING DELAYS AND DATA SHIFTS IN ACCORDANCE WITH RESULTS OF CALCULATIONS IN STEPS 387 AND 389 (INITIALLY DELAYS ARE ZERO AND SHIFTS ARE NOMINAL OFFSETS FOR THE NOMINAL MECHANICAL DIMENSIONS OF THE CARRIAGE AND AVERAGE FLIGHT TIMES ETC.)

393 — REPEAT STEPS 365 THROUGH 391 FOR FURTHER CONVERGENCE UNTIL (A) THE CORRECTIONS HAVE BECOME SUFFICIENTLY SMALL, OR (B) CORRECTIONS HAVE BEEN CALCULATED A PREDETERMINED NUMBER OF TIMES

395 — PERFORM SIMILAR ALIGNMENT PROCEDURE WITH θ VALUES TO ALIGN EACH PRINT CARTRIDGE PRIMITIVE TO CORRECT FOR ROTATIONAL MISALIGNMENT

CORRECTION OF VERTICAL LINE MISALIGNMENTS COMPLETED

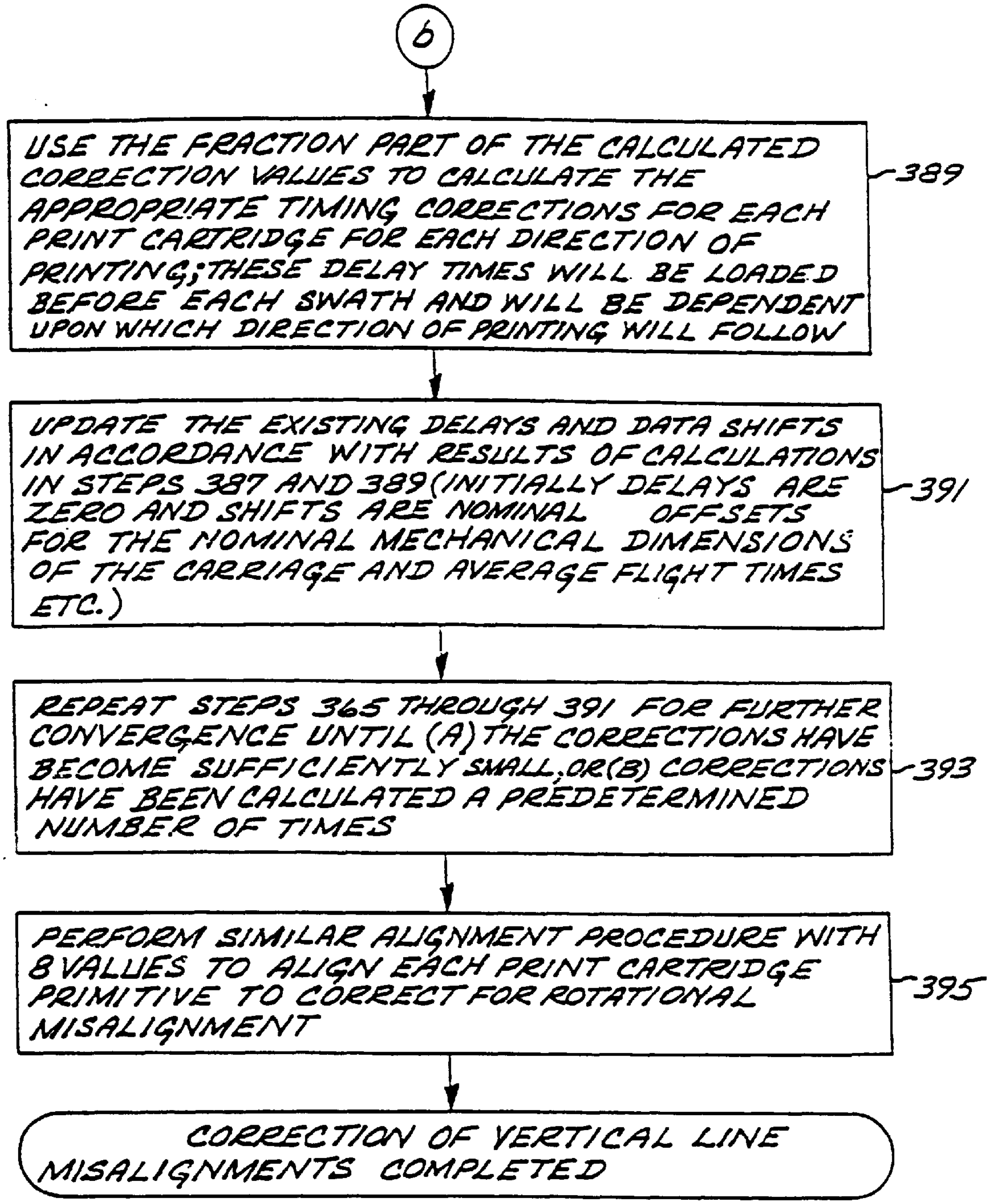

FIG. 16C

SEQUENCE CONTROLLER STATE DIAGRAM

SWATH RAM CONTROLLER

THETA-Z CORRECTION CIRCUIT DATAPATH BLOCK DIAGRAM

| State Assignments $2^4$ $2^3$ $2^2$ $2^1$ $2^0$ |
| --- |
| $2^4$ Fire |
| $2^3$ nFireCntLoad |
| $2^2$ Select |
| $2^1$ fdy0 |
| $2^0$ AddrCount |

| Signal Conditions ( ! implies logic low ) |
| --- |
| 1: DlydFP |
| 2: FireCntDone |
| 3: !FireCntDone |
| 4: FireCntDone |
| 5: FireCntDone • !AddrDone |
| 6: FireCntDone • AddrDone |

State Assignments
$2^4$ $2^3$ $2^2$ $2^1$ $2^0$ $2^4$ Fire
$2^3$ nFireCntLoad
$2^2$ Select
$2^1$ fdy0
$2^0$ AddrCount

Signal Conditions
( *! implies logic low* )

1: DlydFP
2: FireCntDone
3: !FireCntDone
4: FireCntDone
5: FireCntDone • !AddrDone
6: FireCntDone • AddrDone

AUTOMATIC PRINT CARTRIDGE ALIGNMENT SENSOR SYSTEM

CROSS REFERENCE TO RELATED APPLICATION

This is a divisional of copending application Ser. No. 08/885,337 filed on Jun. 30, 1997.

This is a continuation of application Ser. No. 08,200,101, filed Feb. 22, 1994, now U.S. Pat. No. 5,644,344, in turn a continuation of application Ser. No. 07/786,145, filed Oct. 31, 1991, now U.S. Pat. No. 5,289,208.

BACKGROUND OF THE INVENTION

The subject invention is generally directed to swath type printers, and more particularly to apparatus and techniques for vertical and horizontal alignment of the printheads of a multiple printhead swath type printer.

A swath printer is a raster or matrix type printer that is capable of printing a plurality of rows of dots in a single scan of a movable print carriage across the print media. The print carriage of a swath printer typically includes a plurality of printing elements (e.g., ink jet nozzles) displaced relative to each other in the media motion direction which allows printing of a plurality of rows of dots. Depending upon application, the separation between the printing elements in the media scan direction can correspond to the dot pitch for the desired resolution (e.g., 1/300th of an inch for 300 dot per inch (dpi) resolution). After one swath or carriage scan, the media can be advanced by number of rows that the printer is capable of printing in one carriage scan or swath (i.e., the swath height or swath distance). Printing can be unidirectional or bidirectional.

The printing elements of a swath printer are commonly implemented in a printhead that includes an array of printing elements such as ink jet nozzles. Depending upon implementation, the printhead comprises a removable printhead cartridge such as those commonly utilized in ink jet printers. Throughput of a swath type ink jet printer can be increased by utilizing multiple ink jet printhead cartridges to increase the height of a swath by the additional printhead cartridges. A consideration with multiple printhead cartridge swath printers is print quality degradation as a result of printhead mechanical tolerances (e.g., the uncertainty of printhead cartridge to printhead cartridge positioning, and uncertainty of variations due to cartridge insertions), and drop velocity differences between printhead cartridges, where such degradation can occur in both bidirectional and unidirectional printing. Mechanical tolerances of the printhead to print media spacing also causes print quality degradation in bidirectional printing, with one or a plurality of printhead cartridges.

Factory compensation for each printer manufactured and/or tight manufacturing tolerance control would address some of the factors contributing to print quality degradation, but would be extremely difficult and expensive. Moreover, manufacturing tolerance control might not be able to address the effects on the printer of aging and temperature, particularly as to electronic components of the printer.

SUMMARY OF THE INVENTION

It would therefore be an advantage to provide methods and apparatus for detecting and compensating misalignments that affect print quality in a multiple printhead cartridge swath printer.

Another advantage would be to provide methods for automatically detecting and compensating misalignments that affect print quality in a multiple printhead cartridge swath printer.

In accordance with the invention, an optical sensor including a quad photodiode detector is utilized to determine the horizontal positions of printed vertical test lines which are imaged on the detector in conjunction with horizontal alignment correction, as well as the vertical positions of printed horizontal lines which are imaged on the detector in conjunction with vertical alignment correction.

BRIEF DESCRIPTION OF THE DRAWINGS

The advantages and features of the disclosed invention will readily be appreciated by persons skilled in the art from the following detailed description when read in conjunction with the drawing wherein:

FIG. 2 is a schematic side elevational sectional view illustrating the relation between the downwardly facing ink jet nozzles and the print media of the printer of FIG. 1.

FIG. 3 is a schematic plan view illustrating the general arrangement of the nozzle arrays of the printhead cartridges of the printer of FIG. 1.

FIG. 4 is a detail view of a positionally adjustable printhead cartridge retaining shoe of the swath printer of FIG. 1.

FIG. 5 is a detail view illustrating an example of a cam actuating mechanism for adjusting the position adjusting cam of the positionally adjustable printhead cartridge retaining shoe of FIG. 4.

FIG. 8 is a schematic diagram of the quad photodiode detector of the optical sensor of FIG. 7 that depicts the active areas of the photodiodes of the quad detector as well as circuitry for processing the outputs of the quad sensor.

FIG. 9 is a continuous plot of the response of the quad detector and associated output circuitry as a function of displacement of the image of a vertical line across the active areas of the quad detector along an axis that is perpendicular to the length of the line.

FIG. 10 illustrates in exaggerated form a series of printed offset vertical line segments which are utilized for calibration of the quad sensor outputs for determining horizontal position of vertical test line segments.

FIG. 11 illustrates in exaggerated form a plurality of vertical test line segments that can be utilized for horizontal alignment of the operation of the print cartridges of the swath printer of FIG. 1.

FIG. 16A through 16C set forth a flow diagram of a procedure for horizontally aligning the operation of the print cartridges of the swath printer of FIG. 1.

DETAILED DESCRIPTION OF THE DISCLOSURE

Figure 1:
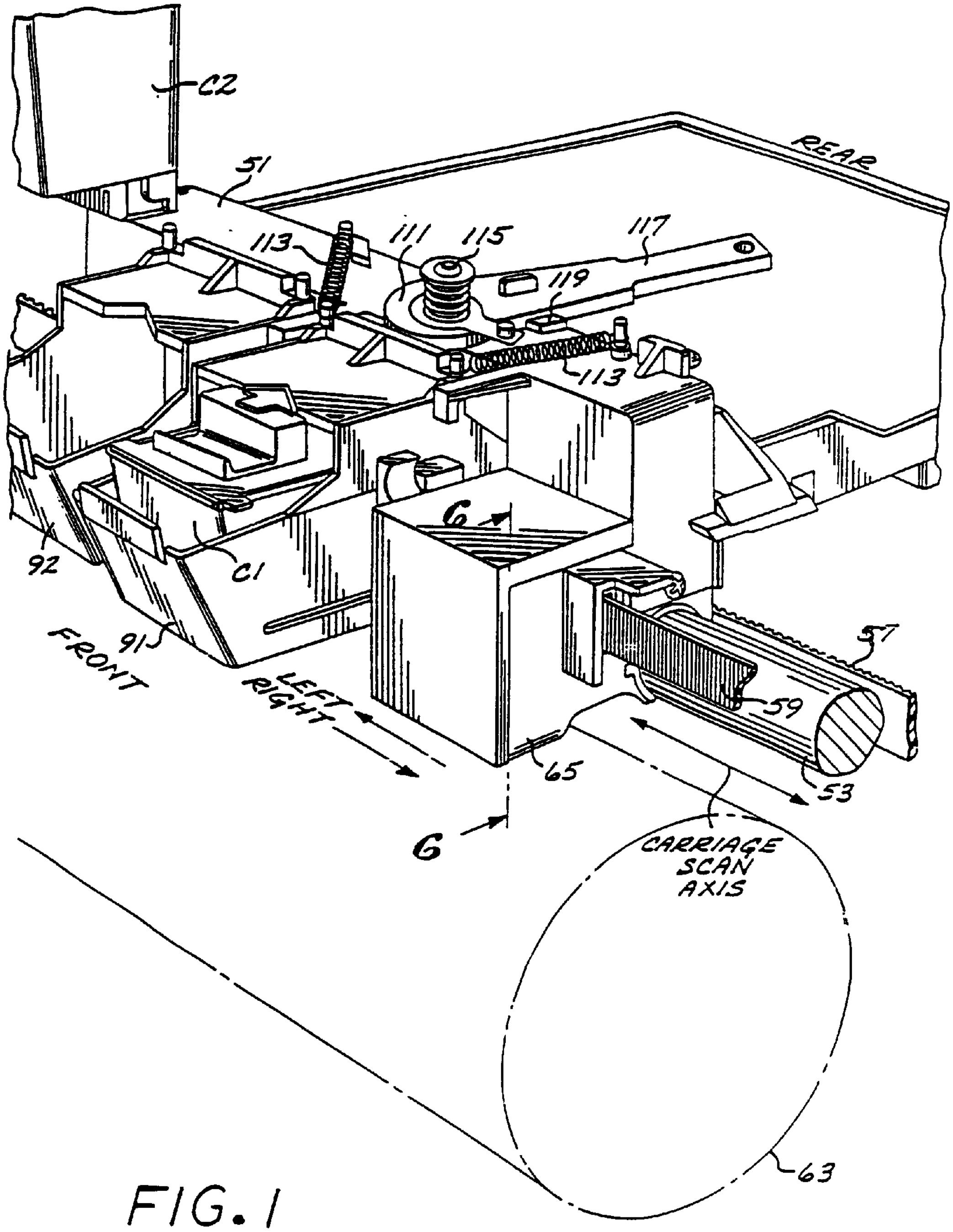
FIG. 1 is a schematic perspective view of the major mechanical components of a multiple printhead swath printer employing the disclosed apparatus and techniques for aligning the operation of the multiple printheads thereof.

In the following detailed description and in the several figures of the drawing, like elements are identified with like reference numerals.

Referring now to FIG. 1, set further therein is a schematic frontal quarter perspective view depicting, by way of illustrative example, major mechanical components of a swath type multiple printhead ink jet printer employing an alignment system in accordance with the invention for calibrating and correcting printhead misalignments, as viewed from in front of and to the right of the printer. The printer includes a movable carriage 51 mounted on guide rails 53, 55 for translational movement along the carriage scan axis (commonly called the Y-axis in the printer art). The carriage 51 is driven along the guide rails 53, 55 by an endless belt 57 which can be driven in a conventional manner, and a linear encoder strip 59 is utilized to detect position of the carriage 51 along the carriage scan axis, for example in accordance with conventional techniques.

The carriage 51 supports first and second cartridge retaining shoes 91, 92 located at the front of the carriage for retaining substantially identical removable first and second ink jet printhead cartridges C1, C2 (sometimes called "pens," "print cartridges," or "cartridges"). FIG. 1 shows the cartridge C2 in a removed condition, while in FIG. 5 shows the cartridge C2 in its installed position. As depicted in FIG. 2, the printhead cartridges C1, C2 include downwardly facing nozzles for ejecting ink generally downwardly to a print media 61 which is supported on a print roller 63 that is generally below the printhead cartridges.

For reference, the print cartridges C1, C2 are considered to be on the front of the printer, as indicated by legends on FIG. 1, while left and right directions are as viewed while looking toward the print cartridges, as indicated by labelled arrows on FIG. 1. By way of example, the print media 61 is advanced while printing or positioning so as to pass from beneath the cartridge nozzles toward the front of the printer, as indicated on FIG. 2, and is rewound in the opposite direction.

A media scan axis (commonly called the X-axis) as shown in FIG. 3 will be utilized as a reference for displacement of the media, as well as a reference for orientation of a line. The media scan axis can be considered as being generally tangential to the print media surface that is below the nozzles of the printhead cartridges and orthogonal to the carriage scan axis. In accordance with prior usage, the media scan axis is conveniently called the "vertical" axis, probably as a result of those printers having printing elements that printed on a portion of the print media that was vertical. Also in accordance with known usage, the carriage scan axis is conveniently called the "horizontal axis". From a practical viewpoint, if the printed output of the printer of FIG. 1 were placed vertically in front of an observer in the same orientation as it would hang down from the print roller 63, a line printed by with a single ink jet nozzle and media movement rather than carriage movement would be "vertical," while a line printed with a single ink jet nozzle and carriage movement rather than media movement. If the print media containing such lines were positioned horizontally in front of an observer, the line that extends away from the observer can be considered vertical by common convention; and the line that extends sideways as to the observer can be considered horizontal by common convention. Accordingly, in the following description, printed lines aligned with the media scan axis will be called "vertical" lines, and printed lines aligned with the carriage scan axis will be called horizontal lines.

FIG. 3 schematically depicts the arrangement of the nozzle plates 101, 102 of the first and second cartridges C1, C2 as viewed from above the nozzles of the cartridges (i.e., the print media would be below the plane of the figure). Each nozzle plate includes an even number of nozzles arranged in two columns wherein the nozzles of one column are staggered relative to the nozzles of the other column. By way of illustrative example, each nozzle plate is shown as having 50 nozzles which are numbered as (a,1) through (a,50) starting at the lower end of the nozzle array with nozzles in the left column being the odd numbered nozzles and the nozzles in the right column being the even numbered nozzles, where "a" represents the printhead cartridge number. The distance along the media scan axis between diagonally adjacent nozzles, as indicated by the distance P in FIG. 3 is known as the nozzle pitch, and by way of example is equal to the resolution dot pitch of the desired dot resolution (e.g., 1/300 inch for 300 dpi). In use, the physical spacing between the columns of nozzles in a printhead is compensated by appropriate data shifts in the swath print data so that the two columns function as a single column of nozzles.

The first and second cartridges C1, C2 are side by side along the carriage scan axis and are offset relative to each other along the media scan axis, and can be overlapped by as much as about 3 nozzle pitches along the media scan axis. As described more fully herein, 2 nozzles in each pen are logically disabled as selected pursuant to a test pattern in order to bring the enabled nozzles closer to proper operational alignment along the vertical axis.

The second retaining shoe 92 is fixedly secured to the carriage 51, while the first cartridge retaining shoe 91 is pivotally secured to the carriage 51 by a flexurally deformable, torsion bar like support member 93 located at the lower rear part of the retaining shoe 91 near the plane of the nozzle plate of the first printhead cartridge C1 and generally parallel to the carriage scan axis. By way of illustrative example, the torsion bar like support member 93 is integrally formed with a backplate 95 of the first cartridge retaining shoe 91 and with a portion of the carriage frame, such that the first retaining shoe 91 is pivotable about a pivot axis PA that passes through the torsion bar like support member 93. The top of the first cartridge retaining shoe 91 includes a cam follower flange 97 that is structurally integral with the back plate 95 of the retaining shoe. The cam follower flange 97 is biased rearwardly against a position adjustment cam 111 by a pair of retaining springs 113 which are connected between the top of the carriage and the top of the first retaining shoe.

The adjustment cam 111 is rotatably mounted on a pin 115 on the carriage 51 and is shaped so as to increase the distance between the cam pin 115 and the retaining shoe flange 97 with increased counterclockwise rotation of the cam, as viewed from above. The cam is rotated by a cam lever 117 that is integral with the cam, and is engageable with a right cam stop 119 which limits the clockwise rotation of the cam. Thus, as the cam lever 117 is rotated counterclockwise away from the cam stop 119, the nozzle plate 101 of the first cartridge C1 is rotated downward about the pivot axis PA, which aims the nozzle plate of the first cartridge so that its print area is closer to the print area of the second cartridge along the media scan axis. Rotation of the adjustment cam 111 in the counterclockwise direction as viewed from above effectively positions the first print cartridge C1 closer to the second print cartridge C2.

The adjustment cam 111 is controllably moved pursuant to movement of the carriage 51 while the cam lever 117 is engaged against the downwardly extending tab 121*a* of a conveniently located pivoted adjustment lever arm 121 that can be pivoted so that the tab 121*a* is in or above the path of the cam lever 117 as the cam lever 117 moves with the carriage 51. As shown in FIG. 5, the cam actuator arm 121 can be in the proximity of one end of the carriage guide rails, and is actuated by an actuating lever 123 that is driven by a cam follower 125 which in turn is controlled by a cam 127 on the output of a stepper motor 129. A bias spring 131 ensures that the cam actuator arm 121 is fully raised when actuated to be in the raised position.

It should be appreciated that the cam actuator arm 121 can be controlled by other mechanisms, and that the stepper motor 129 can be used of additional purposes. The use of an actuator arm 121 and carriage displacement relative to the actuator arm 121 for cam adjustment avoids the use a separate servo motor for cam adjustment.

For ease of discussion relative to figures depicting printed lines, the media scan direction will also be called the vertical direction and the carriage scan direction will also be called the horizontal direction. Also Thus, the carriage moves to the left when it moves toward the cam actuator mechanism, and it moves the right when it moves away from the cam actuator mechanism. FIGS. 1, 3 and 5 generally include indications of the left and right directions.

As to swath advance, since the print media 61 enters beneath the print roller and is on top of the print roller when printed, the material first printed is closest to the bottom of the printed image as it hangs down from the print roller. Accordingly, printed subject matter depicted in the drawings will generally be regarded as having been printed from the bottom up, such that the bottom swath will have been printed first.

An optical sensor 65 is mounted on the carriage 51, for example to the right of and adjacent the first printhead cartridge retaining shoe 91. As discussed further herein, the optical sensor 65 is utilized to provide position data as to test lines printed on the print media 61 which is processed to compensate for horizontal and vertical misalignments between the first and second printhead cartridges C1, C2.

Figure 6:
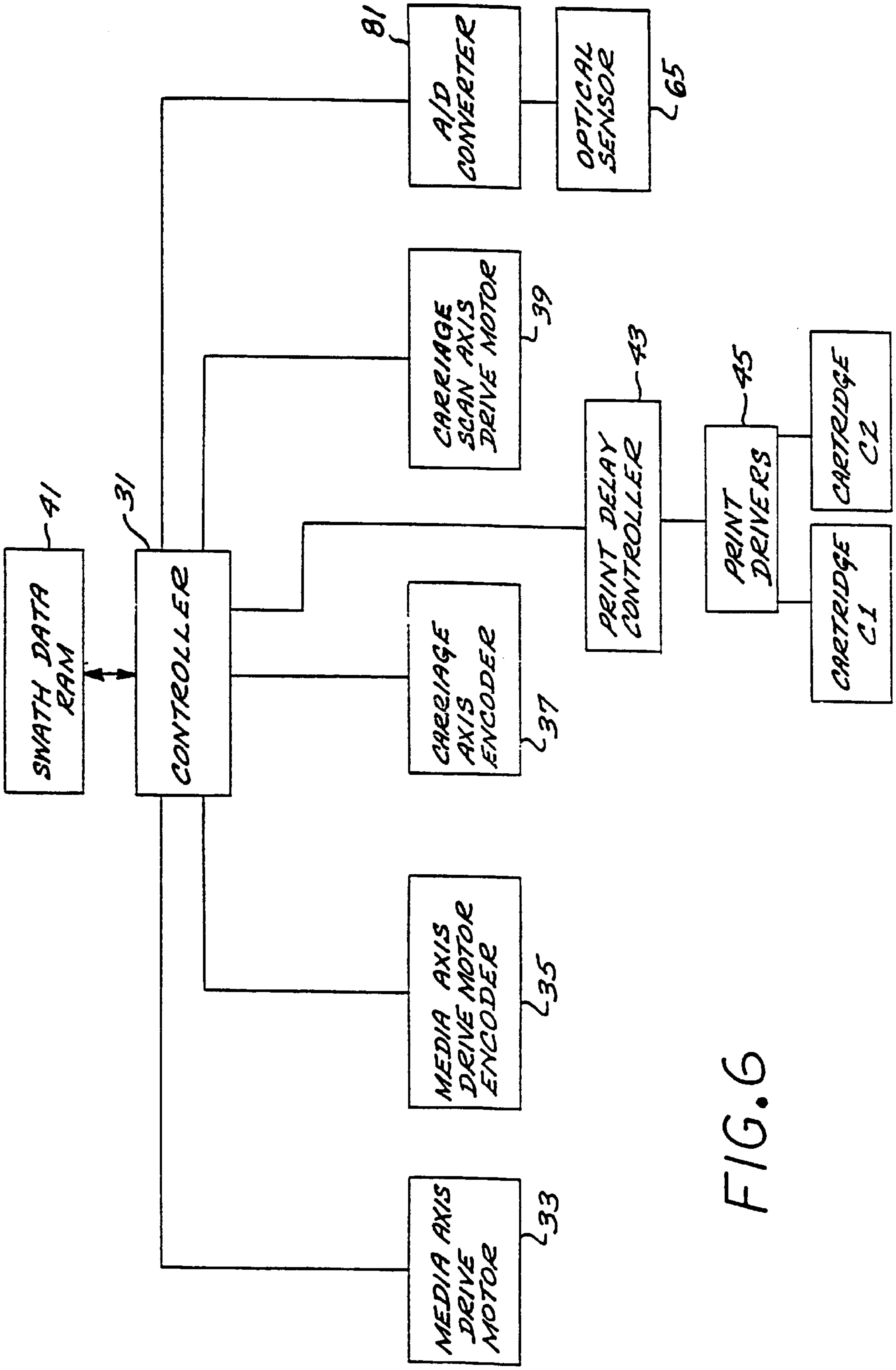
FIG. 6 is a simplified block diagram of a printer controller controlling the swath printer of FIG. 1.

The movement of the carriage 51, the movement of the print media 61, the operation of the printhead cartridges C1 and C2, and the adjustment of the position of the first printhead cartridge C1 are controlled by a printer control system as shown in FIG. 6. The control system includes main controller 31 which controls the actions of the elements in the control system. A media axis drive motor encoder 35 provides information for the feedback control of a media axis driver motor 33 which moves the print roller 63 pursuant to media motion commands from the controller 31. Similarly, a carriage axis encoder 39 provides feedback information for the feedback control of a carriage scan axis drive motor 33 which positions the carriage 51 pursuant to carriage motion commands from the controller 31. A multichannel analog-to-digital (A/D) converter 81 receives analog signals based on the outputs of the optical sensor 65 and provides digital versions of such analog signals for processing in accordance with the procedures described further herein. The controller further stores swath raster data into a swath data random access memory (RAM) 41, for example by converting input vector end points to raster data or by loading raster data directly from an appropriate source. The controller controls the transfer of swath raster data so as to map the ideal bit map in swath RAM to the media by selectively shifting the data in the horizontal sense so that appropriate data from the bitmap arrives at the print cartridge nozzles when the nozzles are over the appropriate region of the print media 61 as the carriage traverses in either carriage scan direction. This mapping will nominally contain appropriate shifts for each nozzle of each print cartridge to compensate for the two rows of nozzles on each print cartridge, and for the horizontal offset between print cartridges, where such shifts correspond to integral resolution dot pitches. As discussed further herein, nominal swath data shifts are adjusted or corrected to compensate for horizontal misalignments that are detected pursuant to the procedures described herein. The controller 31 also sets delays in the print delay controller 43 to compensate for horizontal alignment shifts that are less than one resolution dot pitch, in order to effect fine control of the final drop placement from the cartridges C1, C2. The print delay controller 43 controls print drivers 45 which provide ink firing pulses to the nozzles of the print cartridges C1, C2.

Swath data to media mapping and print cartridge timing delay corrections can be implemented, for example, with circuitry and techniques disclosed in commonly assigned copending application Ser. No. 07/786,326, filed concurrently herewith on Oct. 31, 1991, for "FAST FLEXIBLE PRINTER/PLOTTER WITH THETA-Z CORRECTION," by Chen, Corrigan, and Haselby, incorporated herein by reference.

For instance, Chen, Corrigan, and Haselby disclose the following:

Pixel Shuffler

Figure 18:
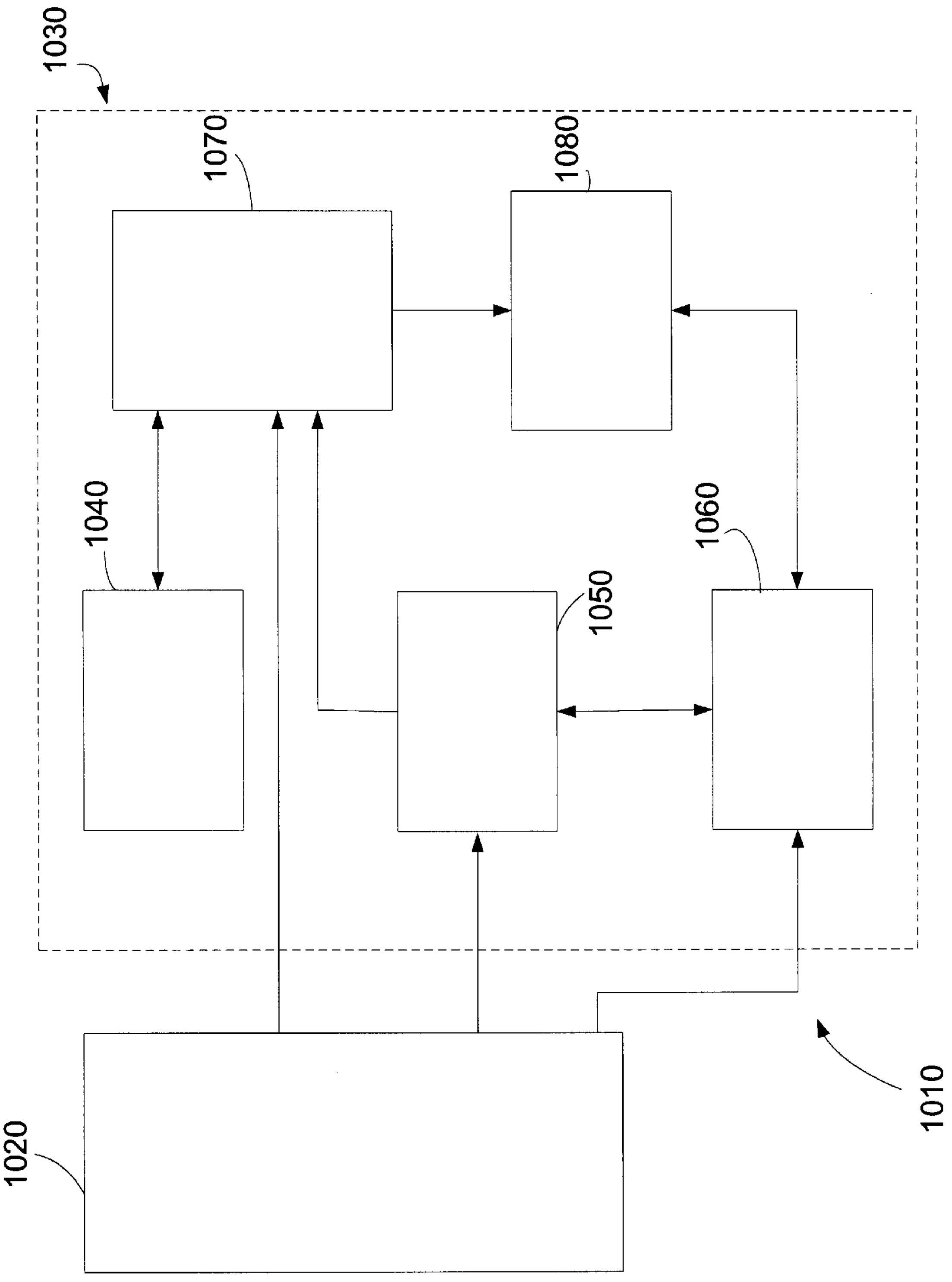
FIG. 18 is a simplified block diagram of a system including a computer and a printer/plotter constructed in accordance with the present teachings.

Referring to FIG. 18, the computer 1020 provides an image map to the swath memory 1040, physical offsets to the fire pulse controller 1050 and the motion controller 1060, pen nozzle offsets, pen configuration data and other data to the pixel shuffler 1070. On receipt of sync (fire) pulses from the fire pulse controller 1050 indicating that the carriage is in location for a column of image data to be printed, the pixel shuffler combines nozzle offsets with swath address data and sends a pixel of image data at the combined address to the printing control circuit (described below). That is, the pixel shuffler 1070 generates individual activation signals for each of the printing elements at locations on the surface determined in accordance with the image address data in response to the stored image data.

Figure 19:
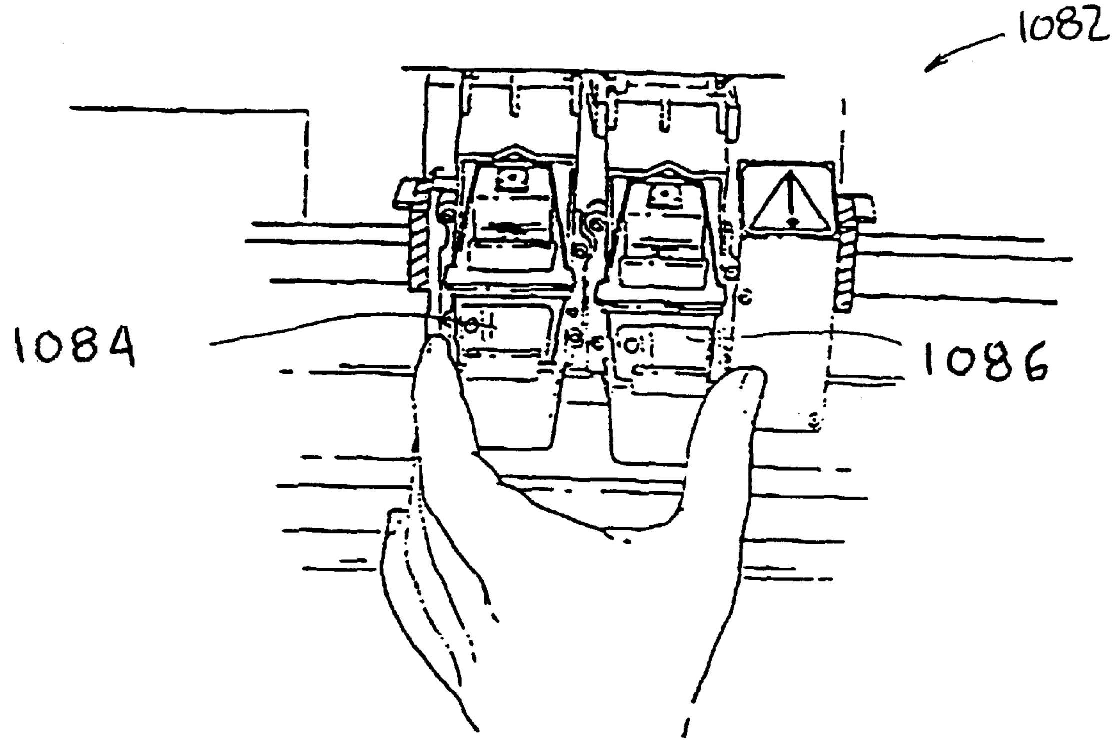
FIG. 19 shows a rear view of a physical representation of a carriage mechanism having two print cartridges utilized in the printer/plotter of the present invention.
Figure 19A:
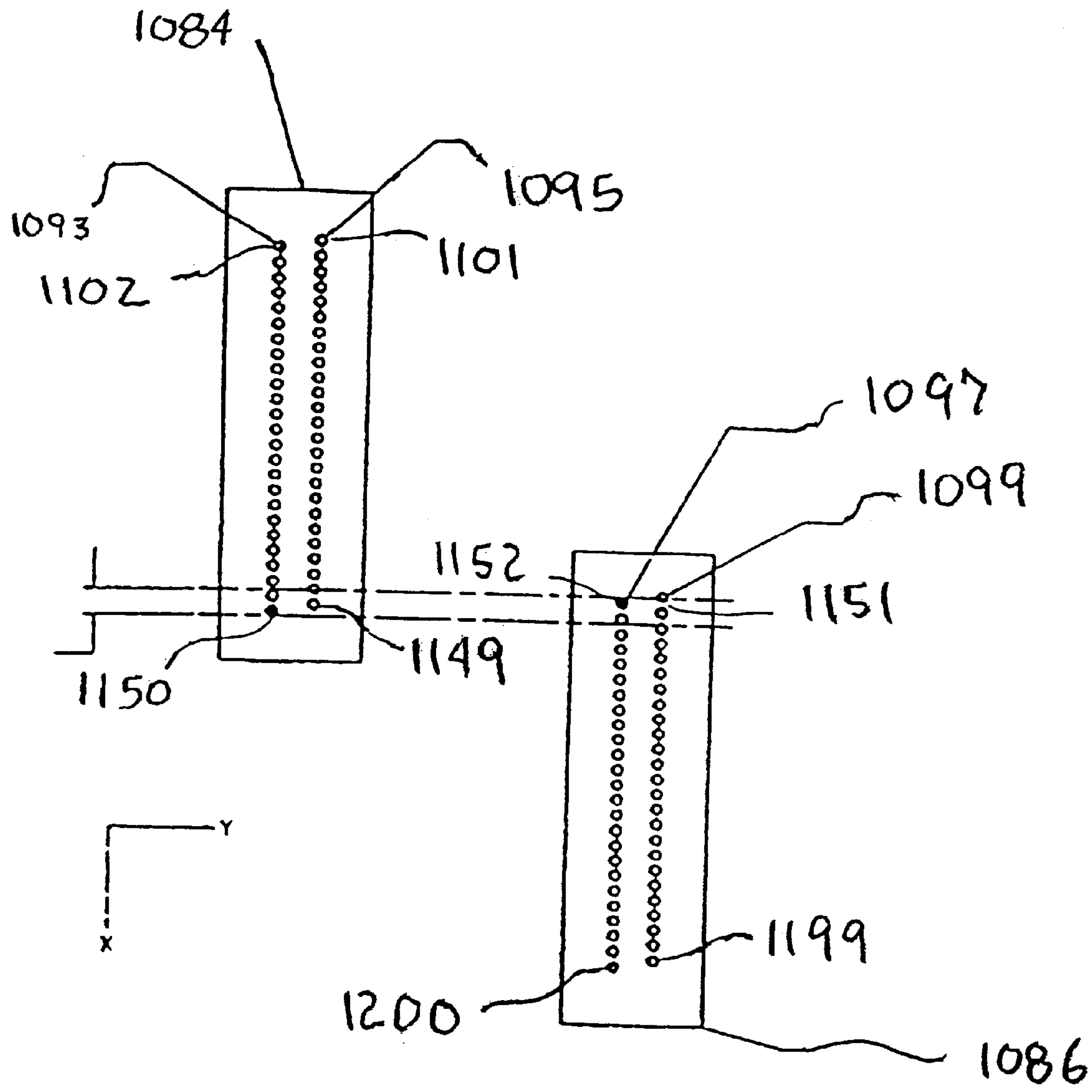
FIG. 19A is a simplified rear view of dual printheads utilized in the printer/plotter of the present invention.

The function of the pixel shuffler 1070 is best illustrated with initial reference to an illustrative pen nozzle configuration for an inkjet printer/plotter. FIG. 19 shows a rear view of a physical representation of a carriage mechanism 1082 having two print cartridges or pens 1084 and 1086. Use of dual pens allows for higher throughput and therefore greater speed in operation. As shown in the simplified rear view of FIG. 19*a*, each print cartridge has a printhead. The printhead of the first cartridge 1084 is offset vertically relative to that of the second cartridge 1086 as shown in FIG. 19*a*. Each printhead has two columns of inkjet nozzles. Thus, four columns 1093, 1095, 1097 and 1099 of nozzles are provided. The first and second columns 1093 and 1095 are provided by the first cartridge 1084 and the third and fourth columns 1097 and 1099 being provided by the second cartridge 1086. In the illustrative embodiment, each printhead has fifty (50) nozzles. The first printhead has nozzles 1101–1150 with the first column 1093 having 25 even numbered nozzles 1102–1150 and the second column having 25 odd numbered nozzles 1101–1149. Likewise, the second printhead has nozzles 1151–1200 with the first column 1097 having even numbered nozzles 1152–1200 and the second column 199 having odd numbered nozzles 1151–1199. The columns of nozzles are offset vertically. Hence, the vertical location of each nozzle defines a unique and separately addressable row. The row address and the column address define a unique nozzle.

Figure 19B:
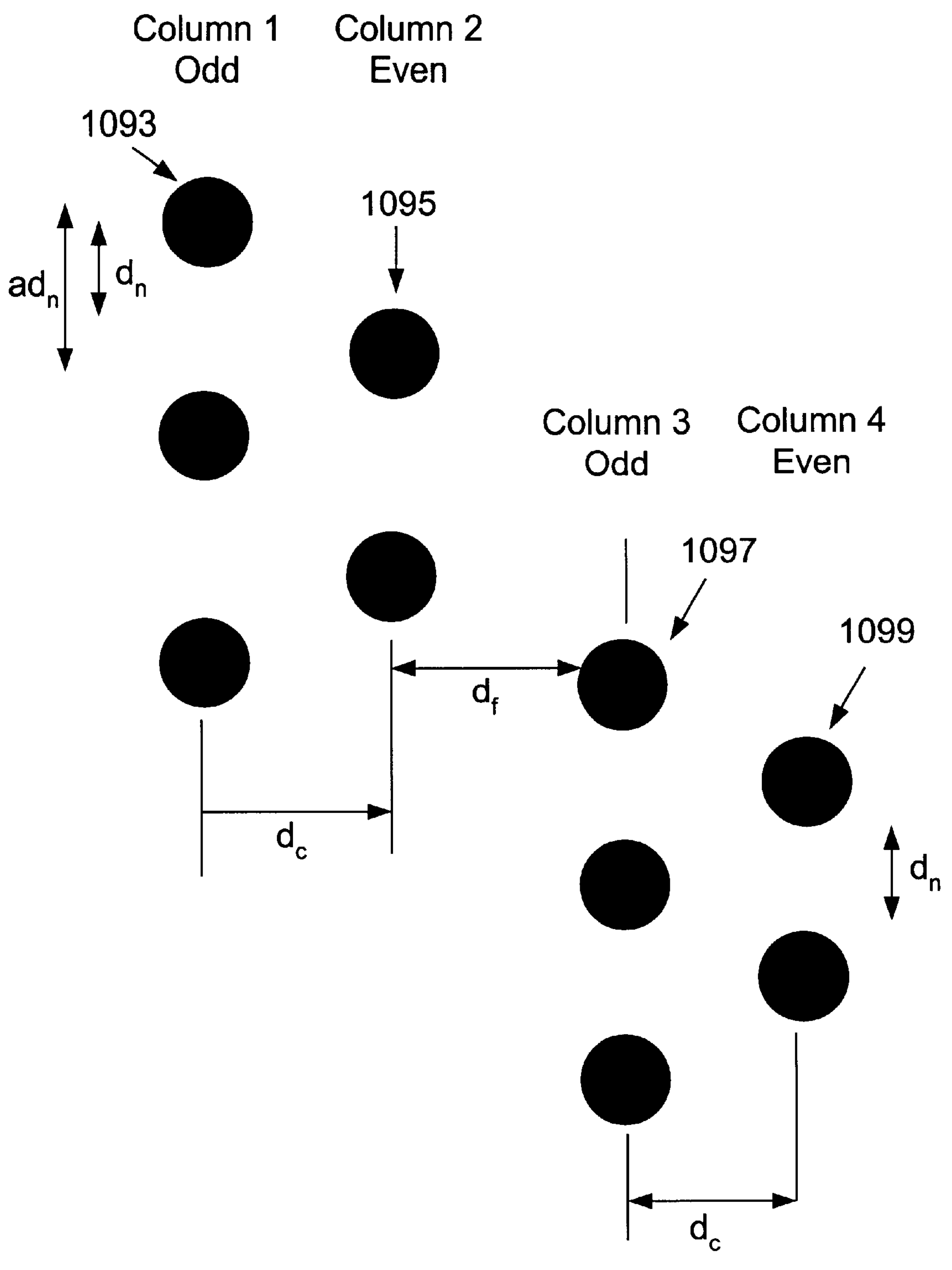
FIG. 19B illustrates the nozzle effect $d_n$ the column offset $d_c$, and the pen offset $d_p$ of the dual printheads utilized in connection with the present invention.

FIG. 19*b* illustrates the nozzle offset dn the column offset dc, and the pen offset $d_n$ of the dual printheads utilized in connection with the present invention. If at a particular location on a page, a single line of data is to be printed, the carriage position would have to be controlled so that each column is positioned so that each nozzle can fire a jet of ink and provide a pixel of imagery at the appropriate location creating a solid linear composite image. The creation of other characters and images requires the positioning and selective firing of appropriate nozzles. Inasmuch as other design considerations and limitations (e.g., pen thermal overload and paper soaking) dictate that the nozzles fire independently and selectively. Thus, each printhead must be positioned and then the nozzles must be selectively speed operation. Pen positioning is provided by the motion control circuit 60 as mentioned above while the pixel shuffler 1070 as discussed below.

The pixel shuffler 1070 transforms the pure image map stored in the swath memory 1040 into an inkjet pen nozzle firing configuration. Inkjet printers are known in the art, see for example U.S. Pat. No. 4,922,270, entitled INTER PEN OFFSET DETERMINATION AND COMPENSATION IN MULTI-PEN THERMAL INK JET PEN PRINTING SYSTEMS, issued May. 1, 1990, to Cobbs et al., the teachings of which are incorporated herein by reference. As mentioned above, conventional hardware implementations of the pixel shuffler have not been designed to accommodate a variety of pen nozzle configurations. Conventional software pixel shufflers have been somewhat slow. The present invention provides a pixel shuffler design which is implemented in hardware and yet capable of accommodating various pen nozzle configurations through software.

Figure 20:
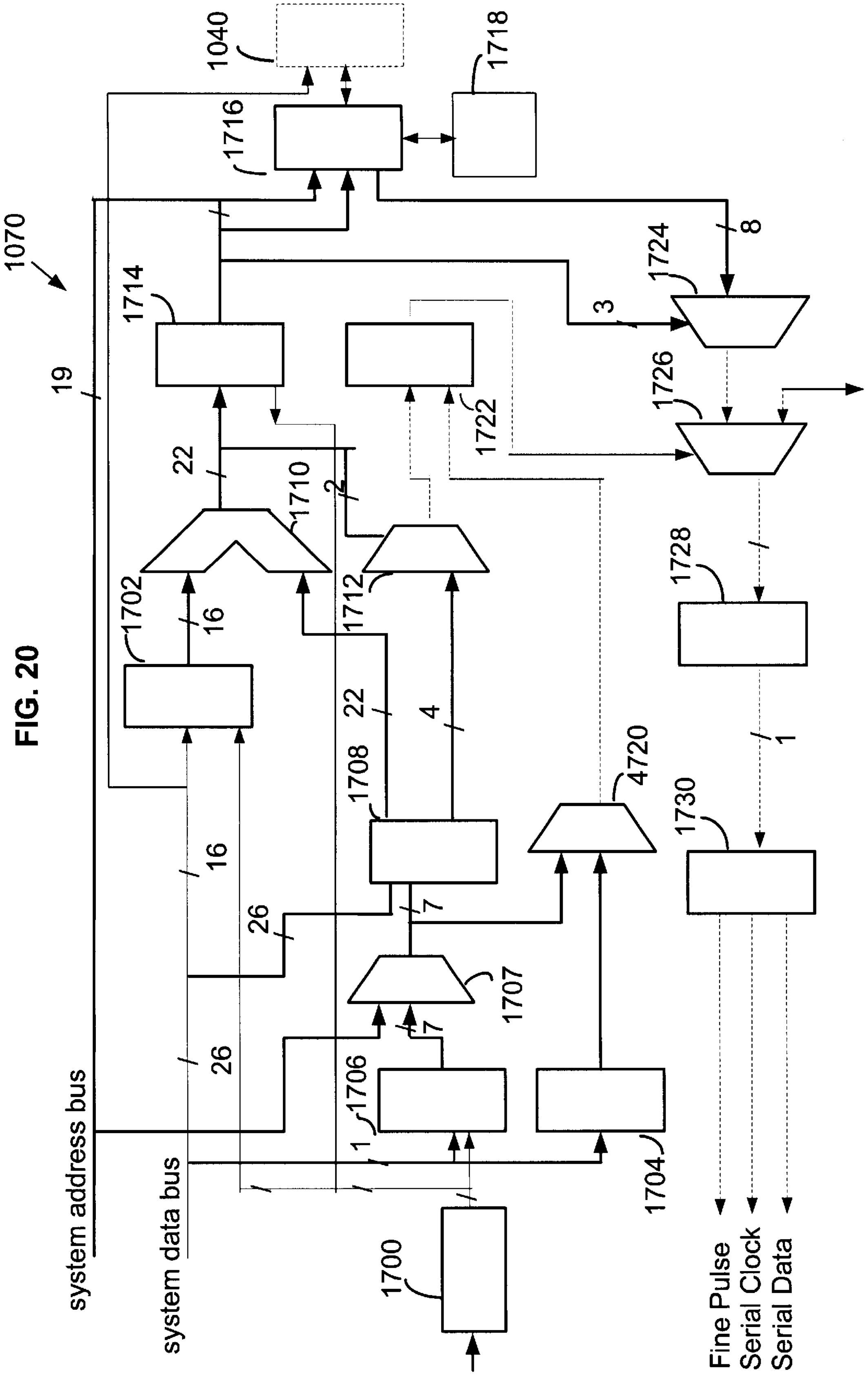
FIG. 20 is a simplified block diagram of an illustrative implementation of the pixel shuffler utilized in connection with the printer/plotter of the present invention.

FIG. 20 is a simplified block diagram of an illustrative implementation of the pixel shuffler utilized in connection with the printer/plotter of the present invention. The pixel shuffler 1070 essentially includes a sequence controller 1700, a column address up/down counter 1702, a pixel number register 1704, a row address counter 1706, a 2-to-1 data selector 1707, a sequencer random access memory (RAM) 1708, an adder 1710, a pixel address pipeline register 1714 and a swath RAM controller 1716. Control signals are managed by a 4-to-1 mask selector, a comparator 1720, and a pixel control pipeline register 1722. Serial output is managed by a 3-to-1 data selector 1724, a 2-to-1 data selector 1726, a pixel pipeline register 1728 and a serial controller 1730.

In operation, pen configuration data is provided by the computer and stored in the pixel number register 1704 and the sequencer RAM 1708. The number of nozzles to be fired per pixel is stored in the pixel number register 1704 ap the sequencer RAM stores the nozzle offsets for each nozzle. The image map is stored in the swath RAM. When a fire pulse is provided from the fire pulse controller 1050, a sequence of reference pulses are generated by the sequence controller 1700.

Figure 21:
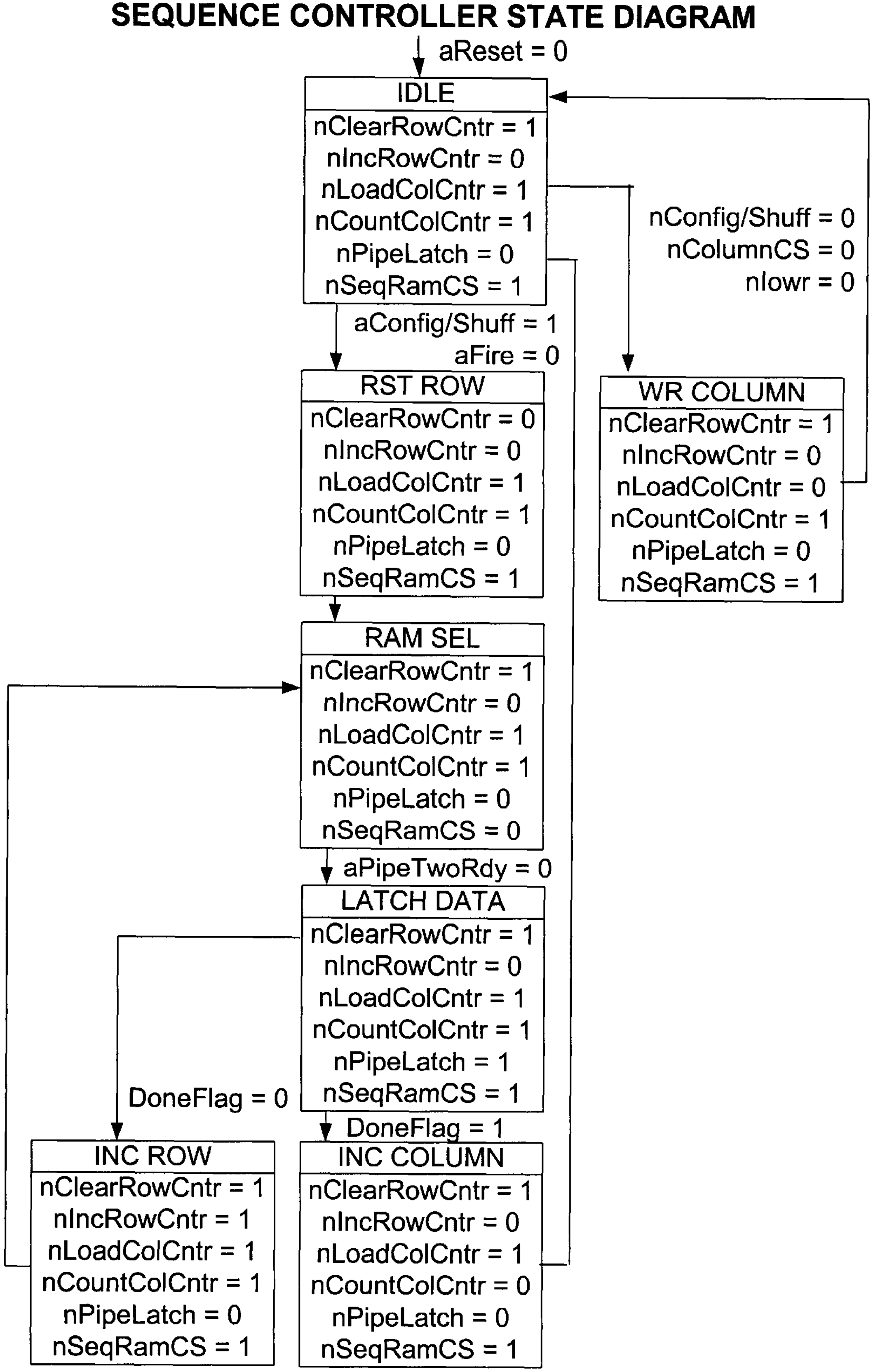
FIG. 21 is a state diagram of the sequence controller of the pixel shuffler of the present invention.

The sequence controller 1700 is implemented in logic 1010 designed to operate in accordance with the state diagram of FIG. 21. The sequence controller 1700 controls the first stage of three shuffler pipelines. The sequence controller 1700 controls reading and sequencing of the column counter 1702, the loading and sequencing of the row counter 1706 and the latching of, the computed result into the pixel address pipeline register 1714. The sequence of events includes resetting the row address counter 1706, waiting for the data in the sequencer RAM 1708 to settle and then latching the result into the pixel address pipeline register 1714. It then checks for the done flag in the pixel number register 1704. If the column done flag is not set, it increments the row address and repeats the same computation. If the flag done bit is set, it terminates the fetching of bit for the current column and also increments/decrements the column counter depending on a direction control bit set by the computer 1020.

Table I below includes sequence controller state diagram input and output definitions:

TABLE I

| | | |
|---|---|---|
| INPUT | nReset | reset signal for sequence controller |
| INPUT | nConfig/Shuff | control bit for shuffler |
| INPUT | nFire | fire pulse from fire pulse controller |
| INPUT | nColumnCs | column counter chip select |
| INPUT | nPipeTwoRdy | Pipeline #2 ready flag |
| INPUT | DoneFlag | column done flag |
| INPUT | nIOWr | shuffler I/O write signal |
| OUTPUT | nClearRowCntr | clear signal for the row address counter |
| OUTPUT | nIncRowCntr | count signal for the row address counter |
| OUTPUT | nLoadColCntr | load signal for the column counter |
| OUTPUT | nCountColCntr | count signal for the column counter |
| OUTPUT | nPipeLatch | load signal for the pixel address pipeline register |
| OUTPUT | nSeqRamCS | chip select for the sequencer RAM |

As noted, the reference pulses from the sequence controller 1700 strobe the row address counter 1706 until the count in the pixel number register 1704 is reached. Each row address is input to the sequencer RAM through the first 2-to-1 data selector 1707. The 2-to-1 data selector 1707 allows for loading of the sequencer RAM 1708 with nozzle offset data and later for the accessing of the data. The input of a row address into the sequencer RAM 1708 causes the sequencer RAM 1708 to output the nozzle offset for a given row.

In the illustrative embodiment, the sequencer RAM 1708 is a 128 by 26 bit static RAM. The lower 22 bits contain the row pixel address, and the upper 4 bits contain a 4 bit mask address. The sequencer RAM 1708 contains the address in RAM of the beginning of each row, taking into account the physical arrangement of the printhead nozzles. This address is added to the column count for each row when the column is being assembled. These locations depend upon the relative positions of the four columns; i.e. the fixed column offset of 10 pixels, and the variable pen offset caused by the mechanical tolerances of the locations of the two pens. Each column therefore has an equation associated therewith. The equations are:

Column 1=row_num*(dots_per_row)−2*column_offset-pen_offset [1a]

Column 2=row_num*(dots_per_row)−column_offset-pen_offset [2a]

Column 3=row_num*(dots_per_row)−column_offset-pen_offset [3a]

Column 4=row_num*(dots_per_row) [4a]

where row_num=the row in the swath for the nozzle;

dots_per_row=the length, in pixels, of the swath being printed;

column_offset=depends on the pen type (e.g., 10 for DeskJet$_{tm}$ pens manufactured by Hewlett Packard;

pen_offset=will be determined by the calibration procedure (e.g. 510).

The swath RAM 1040 will require a pad area of 0's at the end of each row because of the swath. The length of this pad area is:

Pad (in bytes)=ceiling((2*column_offset+pen_offset)/8)

(For the DeskJet$_{tm}$ pens, this will be nominally 67 bytes.)

When printing in the opposite direction from the image loaded in swath RAM, it is only necessary to load the column address counter with the pixel address of the last bit in the first row (including pad bits); this corresponds simply with dots_per_row−1. The column address counter is then instructed via the control register (not shown) to count down. This eliminates the need for storing the image "backwards" for bidirectional printing.

The column counter 1702 points to the logical column currently being assembled. A column is assembled by fetching the proper bits from the swath RAM each firing cycle. These bits correspond to the physical locations of the nozzles on the printhead. In the illustrative embodiment, each of the 100 6 bit RAM locations is divided into a 22 bit pixel address. The pixel addresses are computed as follows:

pixel address[n]=row number*columns per row−pixel offset[n] [5a]

where pixel address=the computed pixel address in swath memory;

row number=the corresponding row in swath RAM, i.e., row #0 equals the nozzle #0, where the pen nozzle is placed in increments of delta distance ($d_n$)in the x-direction.

columns per row=number of columns in the swath PAN;

pixel offset=a signed number which corresponds to the distance between the corresponding nozzle and the reference column pointer in units of columns; and n=nozzle number.

Since each nozzle has its own unique offset address, the shuffler can map any type of pen configuration to the pure swath memory.

The nozzle offset is added to the current firing column position count (from the counter 1702) by the adder 1710. The column count is incremented or decremented with each fire pulse depending on the direction control bit. In the illustrative embodiment, adder 1710 computes the sum of the column counter and the lower 22 bits of the sequencer RAM 1708. The adder 1710 is therefore a 16 by 22 bit adder with a 22 bit sum. In the preferred embodiment, the adder includes a 4 bit look-ahead adder (not shown) to improve computation time. The output of the adder 1710 is the address of the column of the nozzle to be activated with the offset for a given nozzle. This address is stored in the pixel address pipeline register 1714 as the last element in the first pipeline stage.

Thus, the first pipeline stage, the pixel address 1030 generator, controls the transformation of logical columns into printhead physical columns.

The pixel pipeline register is a 24 bit pipeline register that stores the 22 bit computed pixel address result along with the mask bit and a flag done bit (discussed below). The main purpose of the pixel pipeline register is to provide pipelining of the data such that pixel shuffling speed can be maximized.

The 4-to-1 mask selector 1712 is basically a 4 to 2 multiplexer that looks at the 4 bit mask in the sequencer RAM 1708. The resultant mask bit is selected by the lower 2 bit pixel address of the output of the pixel address computer pipeline stage The output of the mask selector 1712 is input to a pixel control pipeline register 1722. A second input to the pixel control pipeline register 1722 is provided by the output of a comparator 1720. The comparator 1720 compares the row count with the value stored in the pixel number register 1704. If these values are equal, the output is set to one, which sets the flag done bit for the current column. The mask bit circuitry implements a moving mask that is based on the computed pixel address. Any of the pixels within the 4 by n mask matrix can be turned on or off depending on the value of the mask bit. The masking can be thought of as convolution of the mask over the pure swath memory where the mask matrix is repeated over the entire swath memory space. The masking size can be increased along with the pixel address offset table size to suit system constraints.

Figure 22:
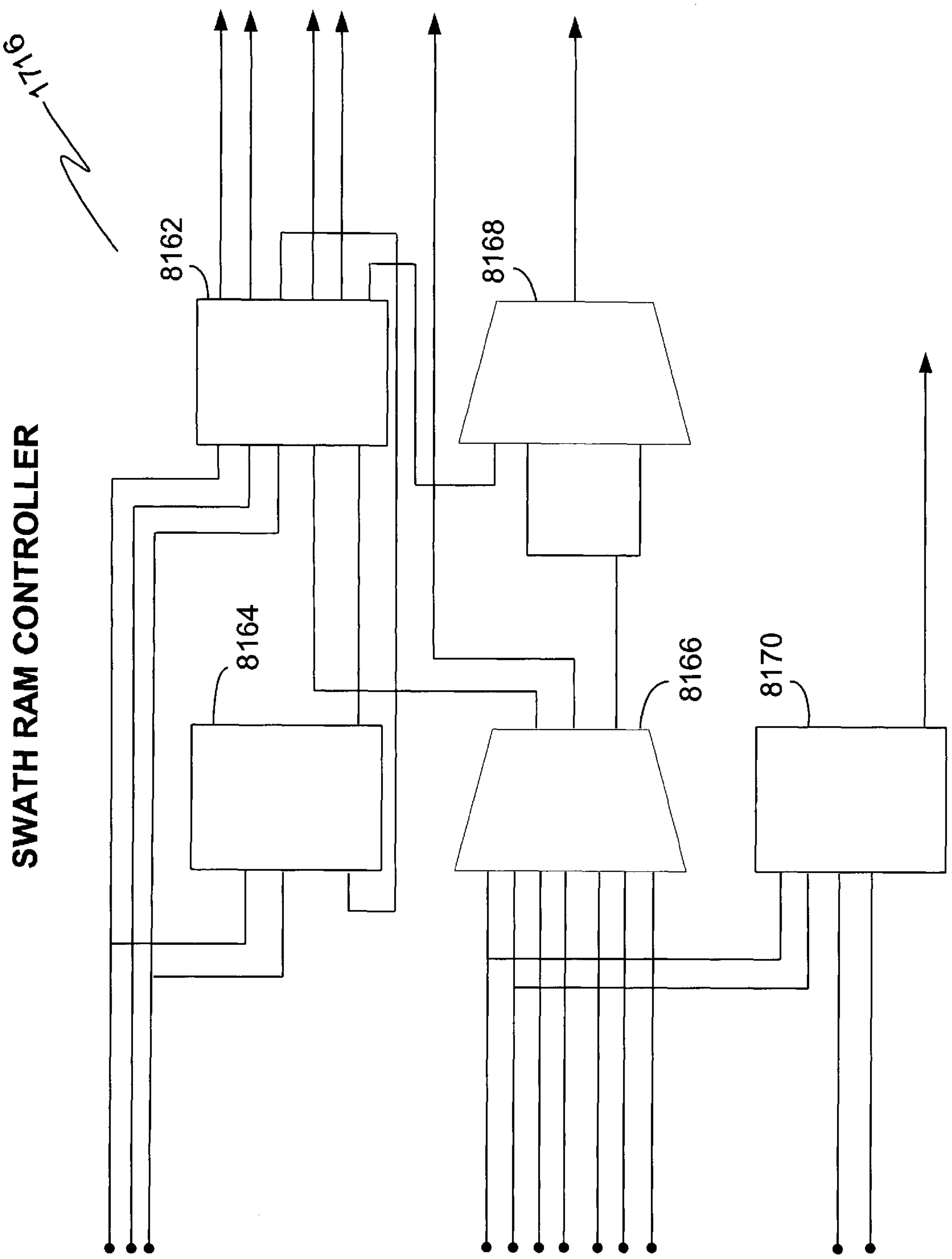
FIG. 22 is a block diagram of the swath RAM controller of the pixel shuffler of the present invention.
Figure 23:
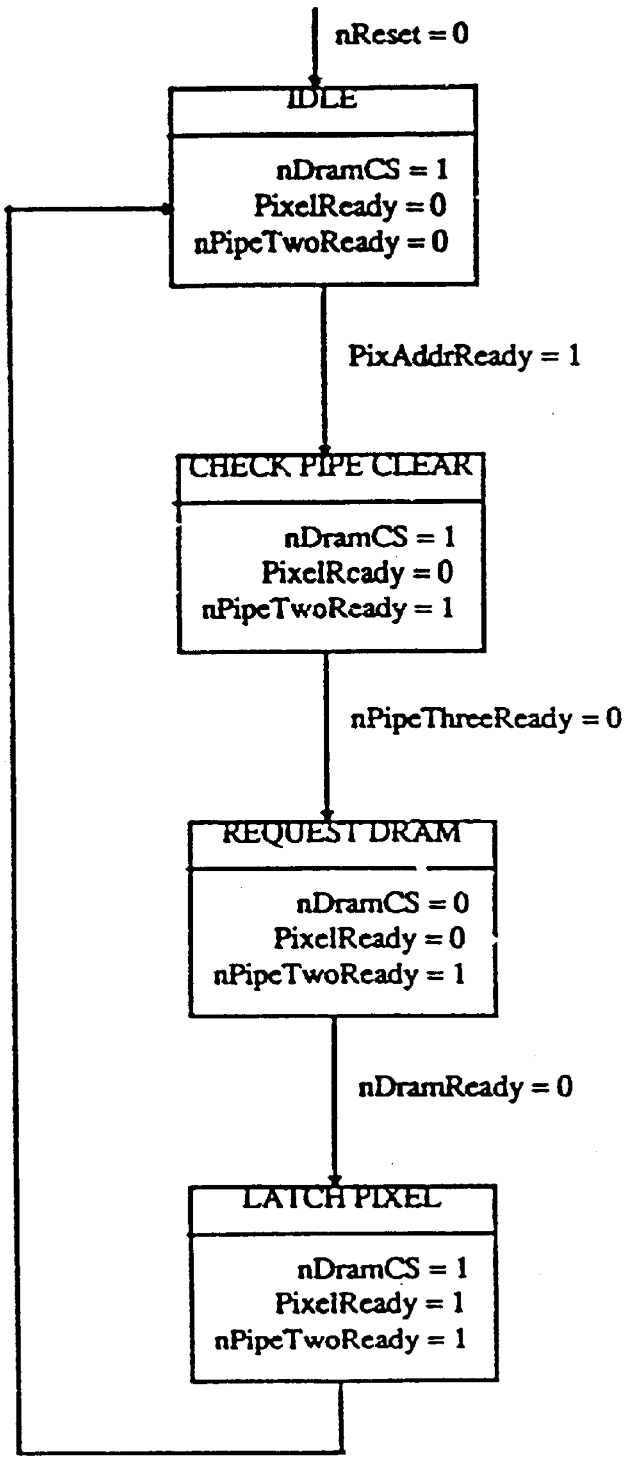
FIG. 23 is a state diagram of the pixel fetch controller of the pixel shuffler of the present invention.

In the second stage of the pipeline, a swath RAM controller 1716 operating under a pixel fetch controller 1718 fetches image data from the swath RAM 1040 at the address stored in the pixel address pipeline register 714. The swath RAM controller 1716 controls the processor read/write of the swath RAM 1040. FIG. 22 is a block diagram of an illustrative implementation of the swath RAM controller. As illustrated in FIG. 22, the swath RAM controller 1716 contains a DRAM controller 8162, a DRAM refresh counter 8164, a system/shuffler bus multiplexer 8166, a DRAM row/column address multiplexer 8168, and a DRAM data tri-state bus buffer 8170.

The DRAM controller 8162 controls the swath RAM directly. It generates proper timing for the swath RAM 1040 which includes row and column address select, refresh, ready, and bus enable. The DRAM controller interacts with the refresh counter such that proper refresh is provided to the swath RAM. DRAM controllers are well known in the art.

The refresh counter 8164 provides refresh to the swath RAM. The system/shuffler bus multiplexer 8166 performs the function of multiplexing the system bus and the shuffler address bus to the swath RAM 1040. The multiplexer 8164 is controlled by a configuration/shuffling control bit provided by the configuration register (not shown). The DRAM row/column address multiplexer 8166 is used to select the row and column of the DRAM address. The selection is controlled by the DRAM controller 8162. Finally, the DRAM data tri-state bus buffer 8170 is used to isolate the DRAM data to the internal system data bus. Those skilled in the art will recognize additional implementations of the swath RAM controller 1716.

The pixel fetch controller 1718 first checks to see if the pixel address is ready, then it checks if the third stage of the pipeline is ready to receive data. If both the upstream and downstream stages of the pipe are ready, it then requests a byte from the swath RAM controller 1716. Data is then transmitted serially using a predefined protocol.

Figure 30A:
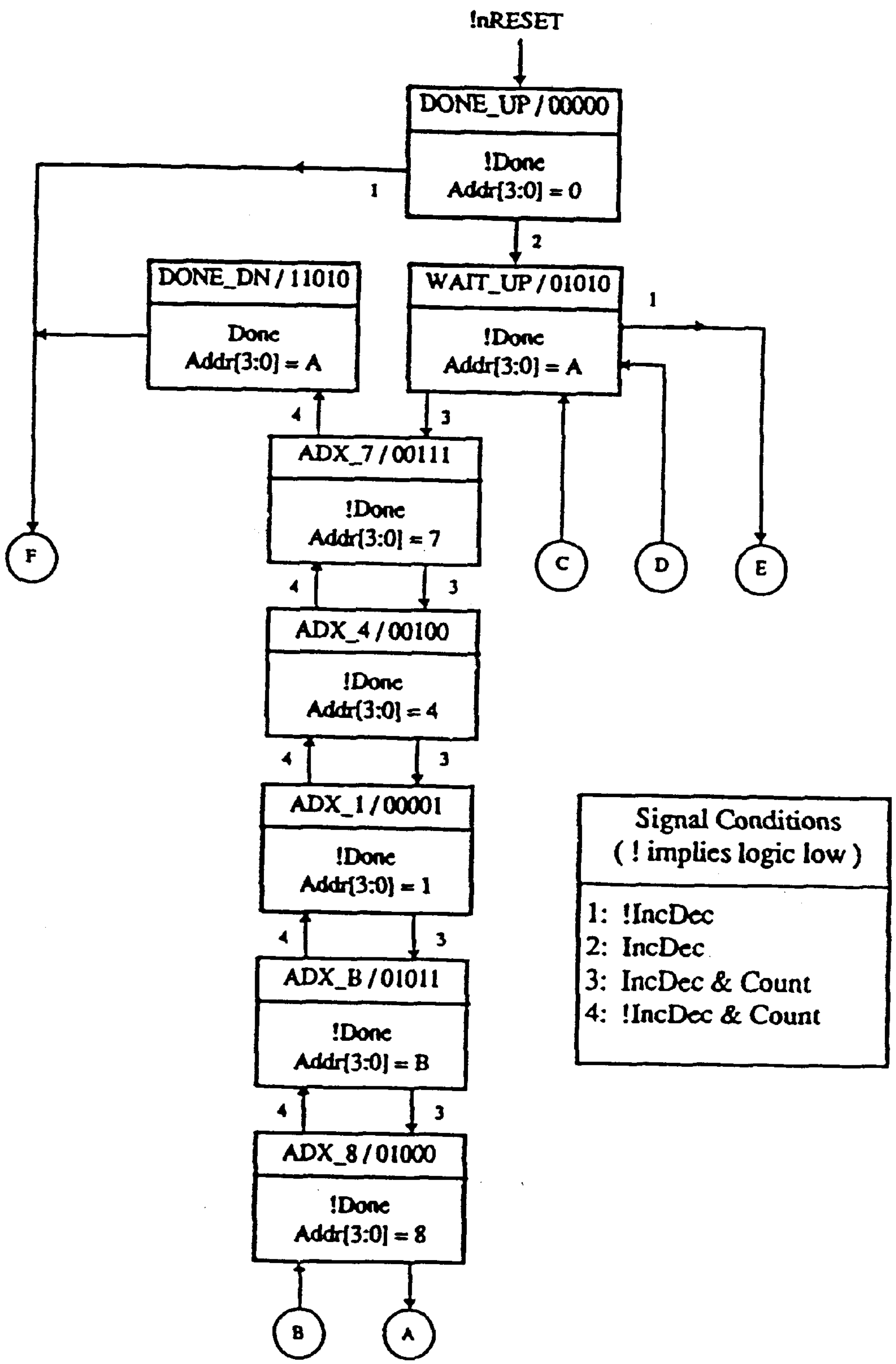
FIG. 30 is a state diagram of the fire nozzle address generator state machine.
Figure 30B:
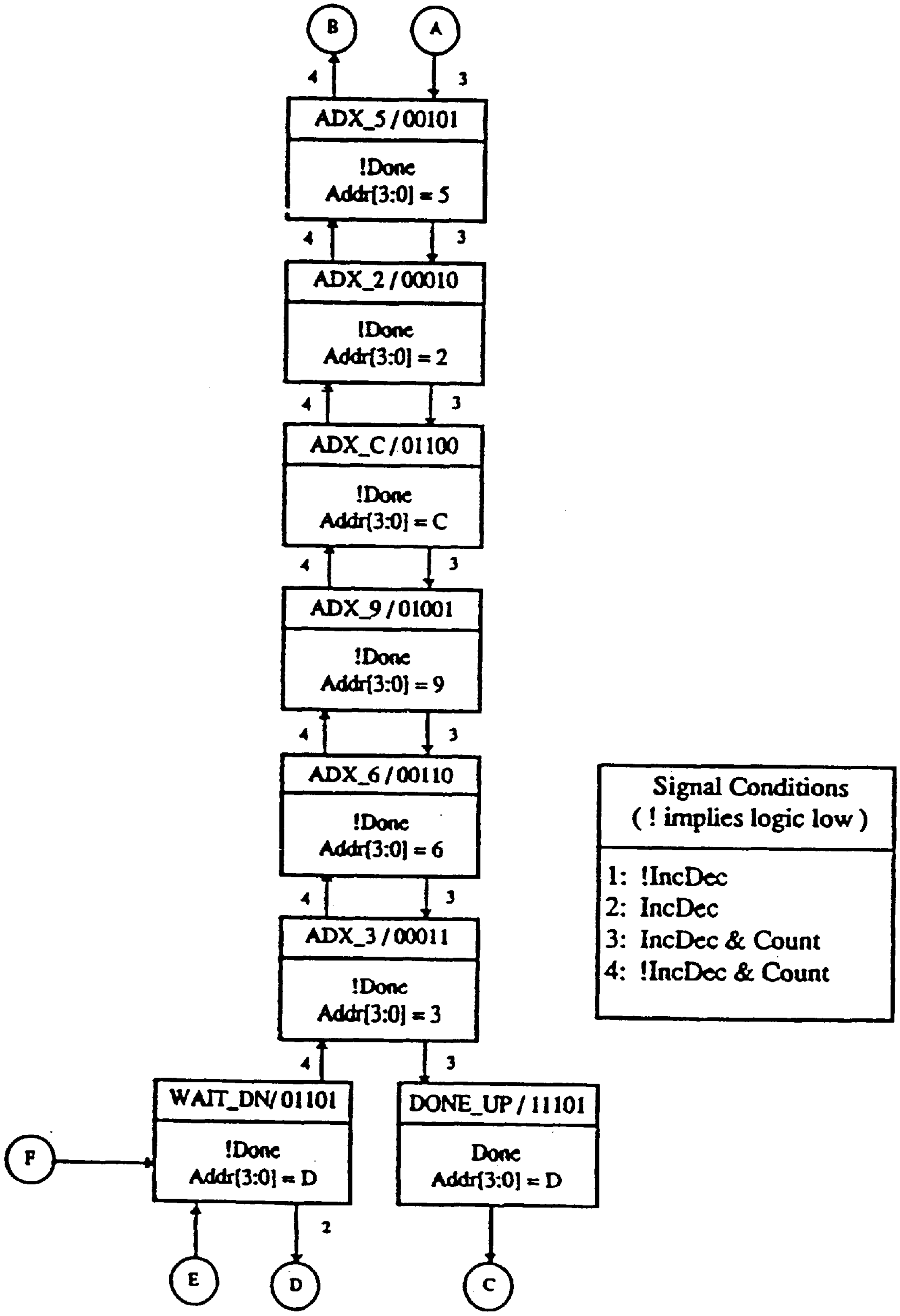

FIG. 30 is a state diagram of the pixel fetch 1030 controller 1718. Table II below provides input and output definitions for the state diagram of the pixel fetch controller:

TABLE II

| | | |
|---|---|---|
| INPUT | nReset | reset signal for the state machine |
| INPUT | PixAddrReady | pixel address ready signal from the first stage pipe |
| INPUT | nPipeThreeReady | pipeline #3 ready signal |
| INPUT | nDramReady | swath RAM controller ready signal |
| OUTPUT | nDramCs | swath RAM chip select |
| OUTPUT | PixelReady | pixel ready signal |
| OUTPUT | nPipeTwoReady | pixel fetcher controller ready signal |

The 3-to-1 data selector 1724 selects the pixel bit according to the lower 3 bits of the pixel address. It is basically an 8 to 1 multiplexer with the lower 3 bits of the computed address as its input. The selected bit is passed to the third stage of the pipeline.

The third stage of the pipeline provides the image data to the printing control circuit (described below) which generates fire pulses for each nozzle. The third stage of the pipeline includes the second 2-to-1 data selector 1726, the pixel pipeline register 1728 and the serial controller 1730. The second 2-to-1 data selector 1726 selects pixel or mask mode according to the mask bit. If the mask bit is set, zero is selected ad latched into the pipeline register instead. Thus, the mask bits allow for selective masking of output for low resolution printing, ink saving and other applications as will be appreciated by one skilled in the art.

The pipeline register 1728 thus stores two bits, one for the pixel bit and one for the done flag bit.

Figure 24:
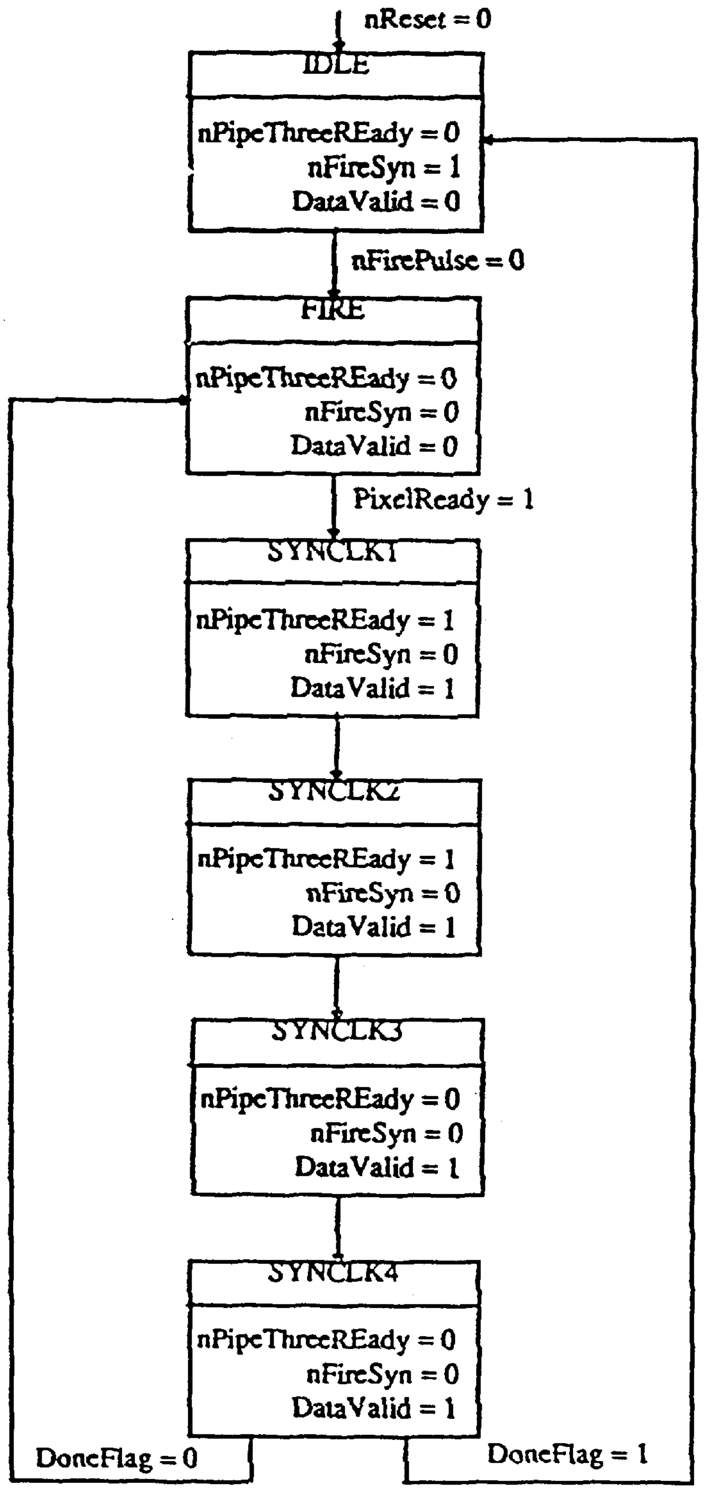
FIG. 24 is a state diagram of the pixel serial controller of the pixel shuffler of the present invention.

The pixel serial (transmitter) controller 1730 controls the transmission of the fetched pixel. It provides proper timing for the serial channel control signals. FIG. 24 is a state diagram of the pixel serial controller 1730. Table III below provides the input and output definitions for the state diagram of FIG. 24.

TABLE III

| | | |
|---|---|---|
| INPUT | nReset | reset signal for the state machine |
| INPUT | nFirePulse | filtered fire pulse from the fire pulse controller |
| INPUT | Pixel Ready | pixel ready signal from the fetcher controller |
| INPUT | DoneFlag | column done flag |
| OUTPUT | nPipe3Ready | pipeline #3 ready signal |
| OUTPUT | nFireSyn | fire pulse to carriage |
| OUTPUT | DataValid | data valid sync clock |

The pixel shuffler 70 implements the following pseudo-code in hardware:

```
for start column<=column pointer<=end column
  for 0<=n<number of nozzles
    pixel address=column pointer+pixel address
      offset[n]
    pixel=content of pixel address
    if pixel address [b1.b0]=0
       pixel=pixel .AND. pixel mask[n] bit 0
    else if pixel address [b1.b0]=1
       pixel=pixel .AND. pixel mask[n] bit 1
    else if pixel address [b1.b0]=2
       pixel=pixel .AND. pixel mask[n] bit 2
    else if pixel address [b1.b0]=3
       pixel=pixel .AND. pixel mask[n] bit 3
    end if
  end for
end for
```

where "column pointer"=a pointer that points to the reference column;

"pixel address"=physical address of pixel in the swath memory;

"pixel address [b1.b0]"=lower 2 bits of the pixel address;

"pixel"=pixel data;

"pixel address off set[n]"=an array that contains an offset address for each pen nozzle;

"pixel mask[n]"=an array that contains 4 bit masks for each pen nozzle;

"number of nozzles"=number of nozzles in the pen configuration; and

"n"=nozzle number in the thermal inkjet pen.

The column address up/down counter 1702 corresponds to the column pointer in the pseudo-code. The pixel number register 1704 corresponds to the number of nozzles in the pseudo-code. The row address counter 1706 corresponds to the "n" in the pseudo-code. The lower 22 bits of the sequence RAM 1708 corresponds to pixel address offset[n] in the pseudo-code and the lower 4 bits correspond to pixel mask[n] in the pseudo-code. The adder 1710 provides the addition of the column pointer and pixel address offset[n] in the pseudo-code and the 4-to-1 mask selector 1712 corresponds to the mask bit selection in the pseudo-code.

To summarize the operation of the pixel shuffler, after the shuffler 1070 is initialized with proper values, it waits for a fire trigger and performs the following sequence.

1) Wait for pen fire trigger. If triggered, go to step 2.

2) Initialize the row address counter to zero.

3) Add the column address counter to zero.

4) Latch the computed address together with the selected mask bit into the address pipeline register.

5) Check if the count of the row address counter equals the pixel number register. If false, increment the row address counter and go to step 3, otherwise, increment/decrement the column address counter and go to step 1.

The pixel fetcher stage takes the computed address together with the selected mask and requests pixel data from the swath memory controller. The swath memory controller returns the 8 bit selected data byte. The 3-to-1 selector 1724 selects the proper pixel bit using the lower 3 bits of the computed address. The pixel data is further processed by the 2-to-1 data selector 1726, which performs the masking based on the computed mask.

After the data processing, the pixel is then latched into the pixel pipeline register 1730. The synchronous serial controller 1730 then performs the serial channel control. It acquires the pixel data from the pixel pipeline register 1728, includes a synchronous clock signal together with the fire pulse signal and sends the data to the carriage assembly as a packet in a serial manner as part of a unique and advantageous serial link as described more fully below.

Serial Link

Figure 25:
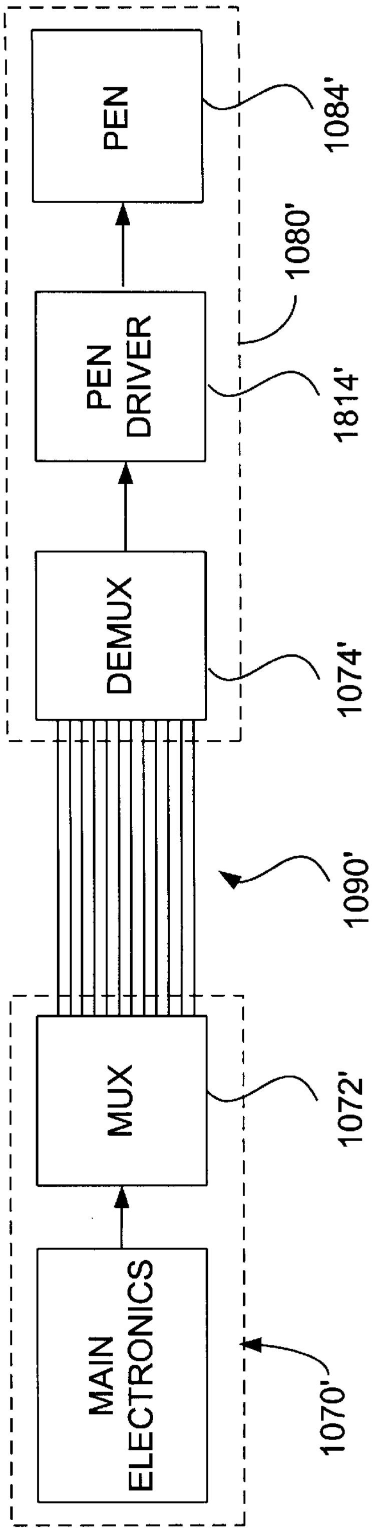
FIG. 25 is a block diagram of a typical conventional carriage link.

To appreciate the unique and advantageous serial data link of the present invention, consider that in the past, design of the electronics for thermal inkjet printer/plotters usually involved design of a data shuffler together with pen fire control circuitry at a main electronics circuit end and an analog pen driver on the carriage close to the pen. Data and fire control signals were sent to the pen driver via a multiconductor cable usually about 2 feet in length in order to reduce the cost of the cable, a multiplexing and de-multiplexing scheme was implemented as shown in FIG. 25. FIG. 25 is a block diagram of a typical conventional carriage link. Signals from the main electronics unit 70' are multiplexed down to a smaller number of lines 90' which are de-multiplexed on the carriage 80' by a de-multiplexer 74'. The output of the de-multiplexer 74 is provided to the pen 84' by a pen driver 814'.

However, cable length and size considerations are more critical in the move from small format printers to large format printers for E size drawings and the like. For large format inkjet printer/plotters, the cable length is often on the order of 5 feet or more. This problem is further complicated when multiple pens are used. To provide for integrity of the signals across this length of cable, multiple grounding schemes and differential drive schemes have been utilized. In view of the ever more demanding design considerations, there is a need in the art for a cost effective data transmission scheme that maintains the integrity of the transmitted signals.

Figure 26:
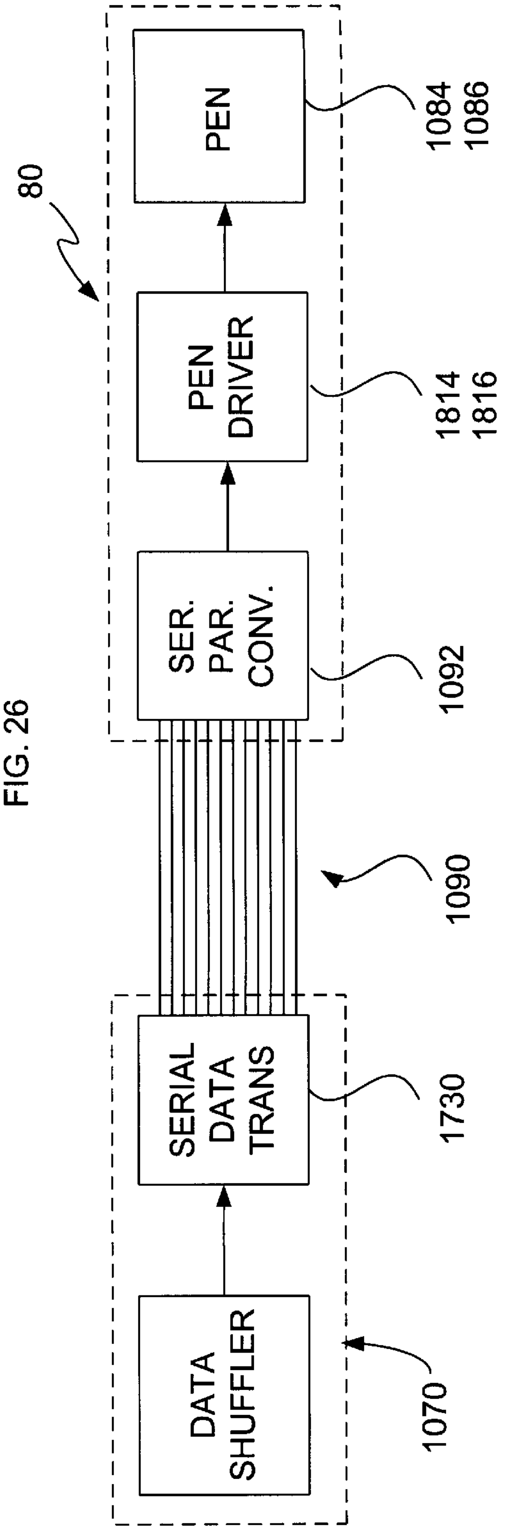
FIG. 26 is a simplified block diagram of the serial data link of the present invention.

The need in the art is addressed by the serial data link of the present invention of which FIG. 26 is a simplified block diagram. The serial link of the present invention begins with the above-mentioned serial data transmitter 1730 of the pixel shuffler 1070. The serial data transmitter 1730 sends a synchronous clock signal, a fire pulse signal and serial data to the carriage assembly over the link 1090 via a conventional differential driver not shown. The differential driver provides common mode noise rejection. As discussed more fully below, the serial data packet is received by a circuit represented generally by a serial-to-parallel converter 1092 and provided to the pens 1084, 1086 via pen drivers 1814 and 1816 respectively.

The use of the inventive serial data transmission scheme allows for a reduction in cable line count from over 70, typically, to say 28 differentially encoded lines of which six are signal lines and 22 are used for other purposes. Of the six signal lines, 2 are differential drive for the fire pulse signal "nFIRE", 2 are for serial data (pixel data), and 2 are for a synchronous clock "SerClk" signal which is used to synchronize the carriage clock with the system clock. Of the remaining differentially encoded lines, 4 may be used for the quad encoder lines for the carriage, 4 may be used for the serial communication link between the main processor 1020 and the carriage processor 1804, 2 for the processor reset signal and 12 for power lines.

The serial data stream is received, buffered and converted to a parallel data format by a serial-to-parallel converter on the carriage as discussed more fully below.

Theta-z Error Correction

Figure 27:
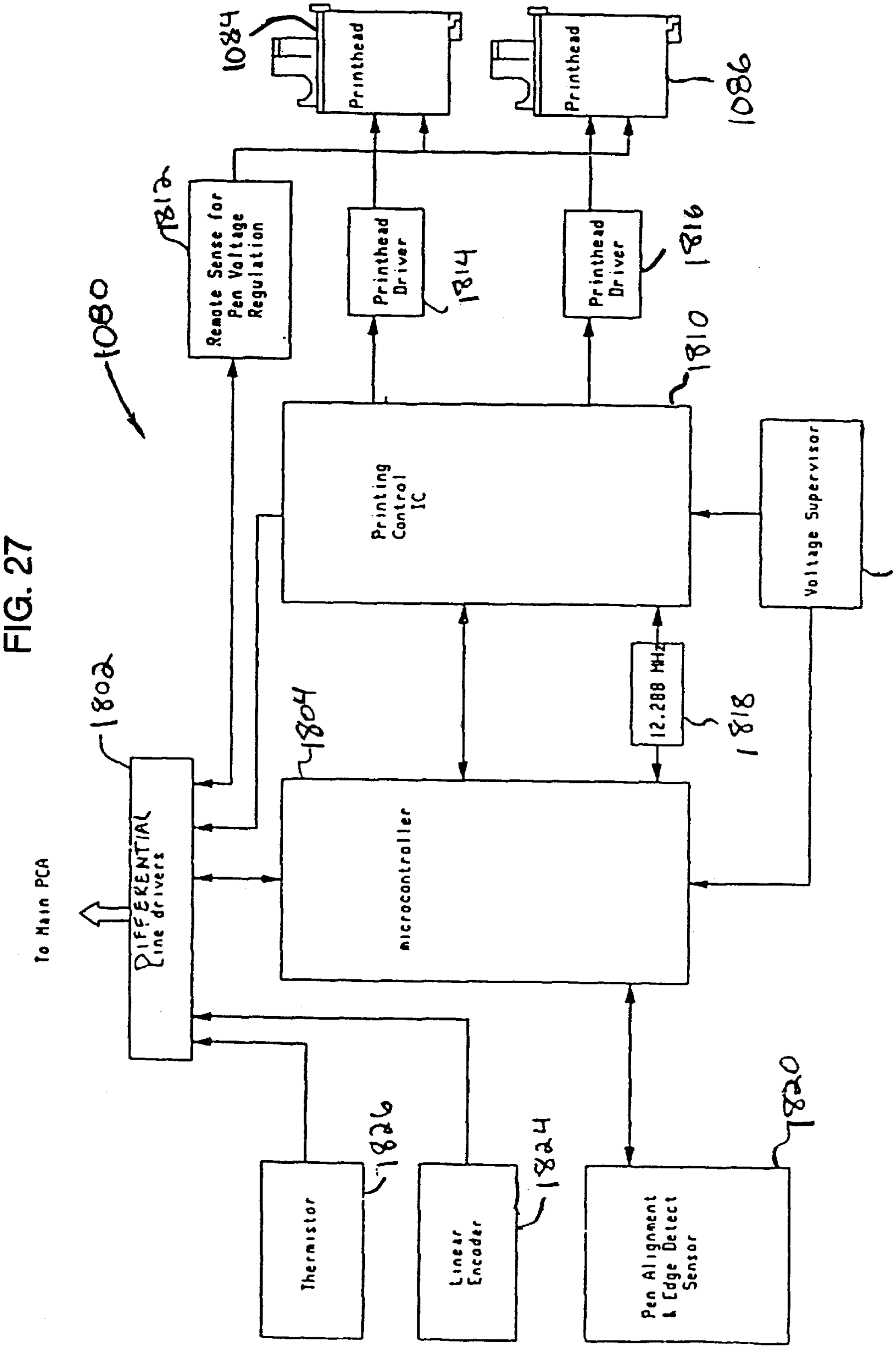
FIG. 27 is a block diagram of the carriage circuit of the printer/plotter of the present invention.

Turning to FIG. 27, a pen alignment and edge detect circuit 1820 is provided along with associated linear encoder and thermistor circuits 1824 and 1826, respectively, to facilitate the correction of printhead alignment errors as discussed more fully below.

Figures 29A, 29B:
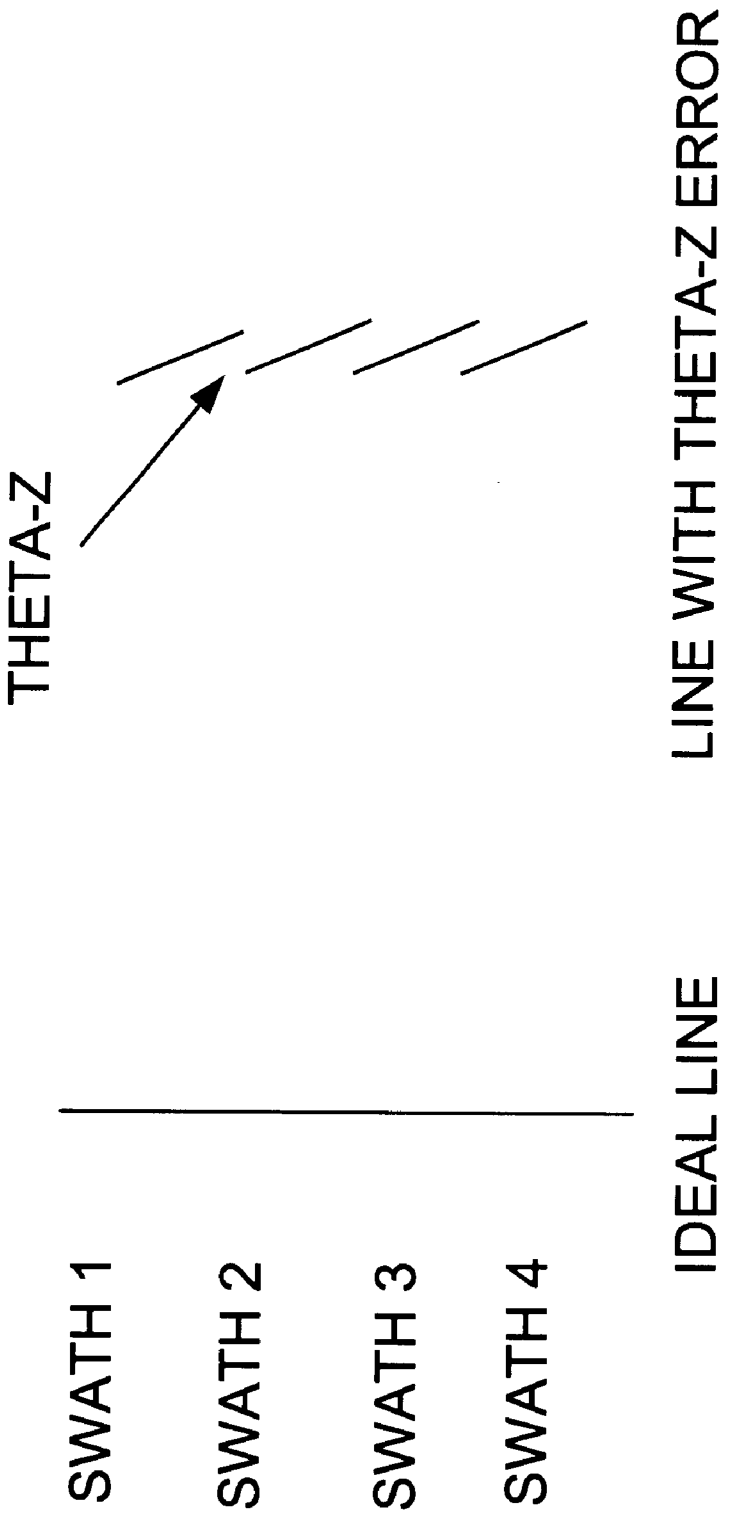
FIG. 29A depicts an ideal line printed by aligned printheads.
FIG. 29B depicts a line with several line segments exhibiting theta-z error.

A particularly troublesome alignment error is the "theta-z error". A typical thermal inkjet pen has columns of nozzles aligned vertically. Thermal inkjet pens are mounted in such a way that only one swath of a line will be printed at a time. Hence, a vertical line is partitioned into segments of shorter lines. Assuming an ideal in which there are no alignment errors, the printed composite line will appear vertical as depicted in FIG. 29*a*. However, if there is a slight angular error, a line with sloped line segments will be printed as depicted in FIG. 29*b*. If the magnitude of the error is sufficiently large, the error will be noticeable to the reader.

In the past, there was no need to address a theta-z problem in thermal inkjet printer/plotters due to the fact that swatch widths were sufficiently short that theta-z errors did not appear on print. However, with wide swatch width and higher resolution of ink drop placement being desired, theta-z errors become significant and need to be addressed.

Currently, mechanical means of adjusting for theta-z error are too costly. The present invention provides an inexpensive yet effective method for correcting theta-z alignment errors. The present invention basically delays the activation of individual nozzles of the pen or groups of nozzles of the pen to reduce or eliminate the theta-z alignment error. The amount of the delay is a function of the printing velocity.

Figure 29C:
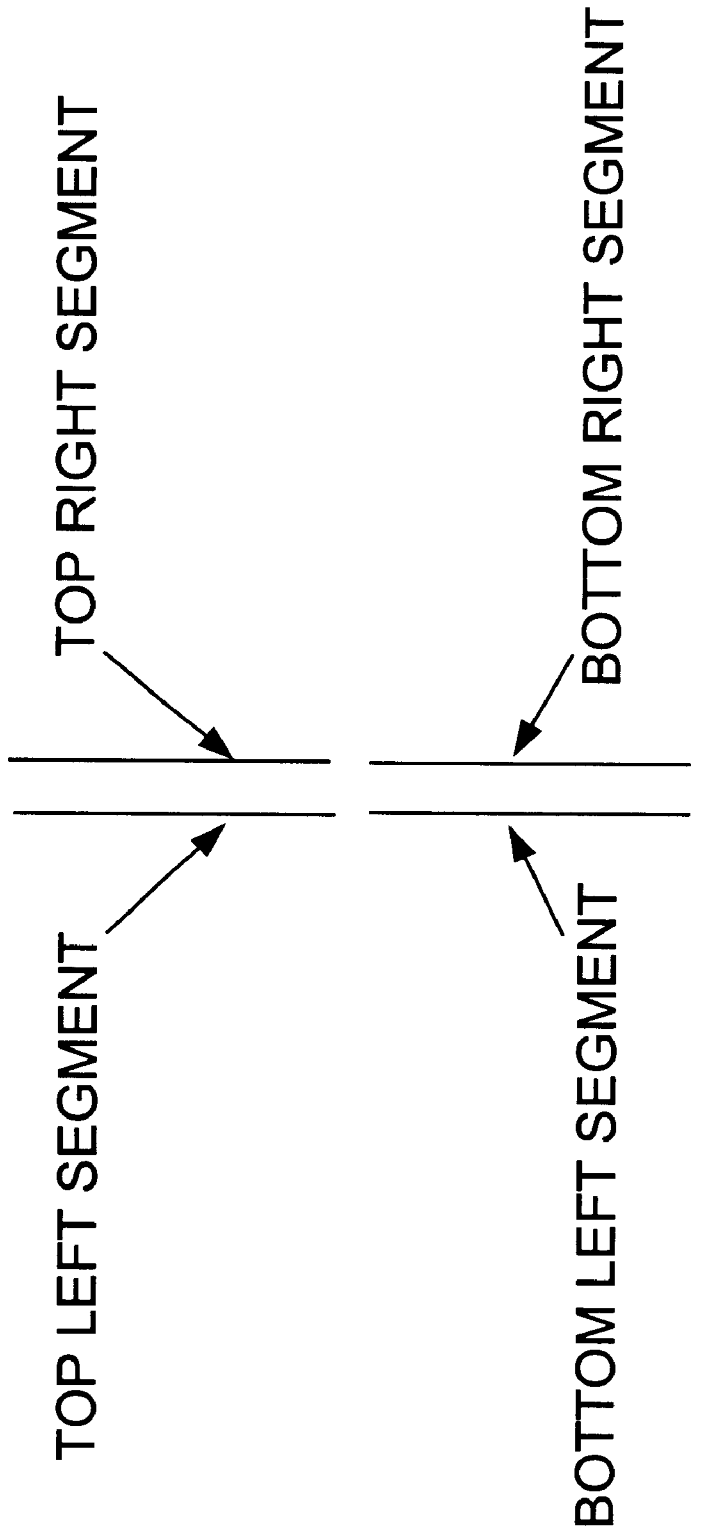
FIG. 29C depicts the static output of nozzles of an illustrative inkjet pen arranged into four segments or quadrants.

FIG. 29*c* depicts the output of 50 nozzles of an illustrative inkjet pen arranged into four segments or quadrants. The quadrants are named "top left" (13 nozzles), "top right" (13 nozzles), "bottom left" (12 nozzles) and "bottom right" (12 nozzles). Each quadrant can be electronically driven independently. Since the left and right segments for each top and bottom half of the pen have the same theta-z error, it is only necessary to divide the printhead into upper and lower segments and shift each segment such that it averages out the theta-z error.

Figure 29D:
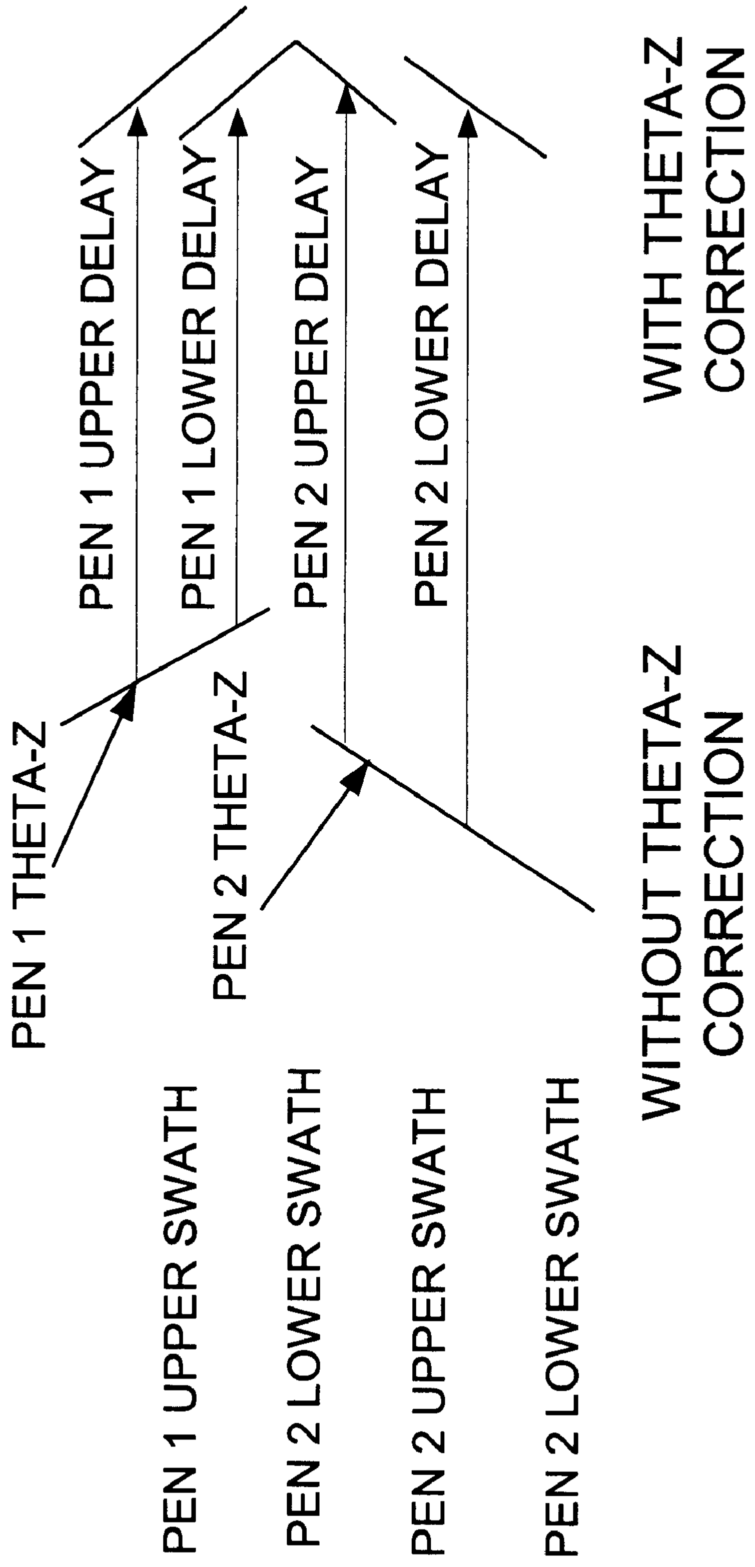
FIG. 29D depicts the theta-z compensation scheme of the present invention.

FIG. 29*d* depicts the compensation scheme of the present invention. The diagram of FIG. 29*d* is blown up for illustration. In actual print, the compensated theta-z error is sufficiently small that it can not be detected easily by the human eye. The present provides for the reduction of average theta-z error within the quadrants such that it is below the bandwidth of the human eye.

Figure 28:
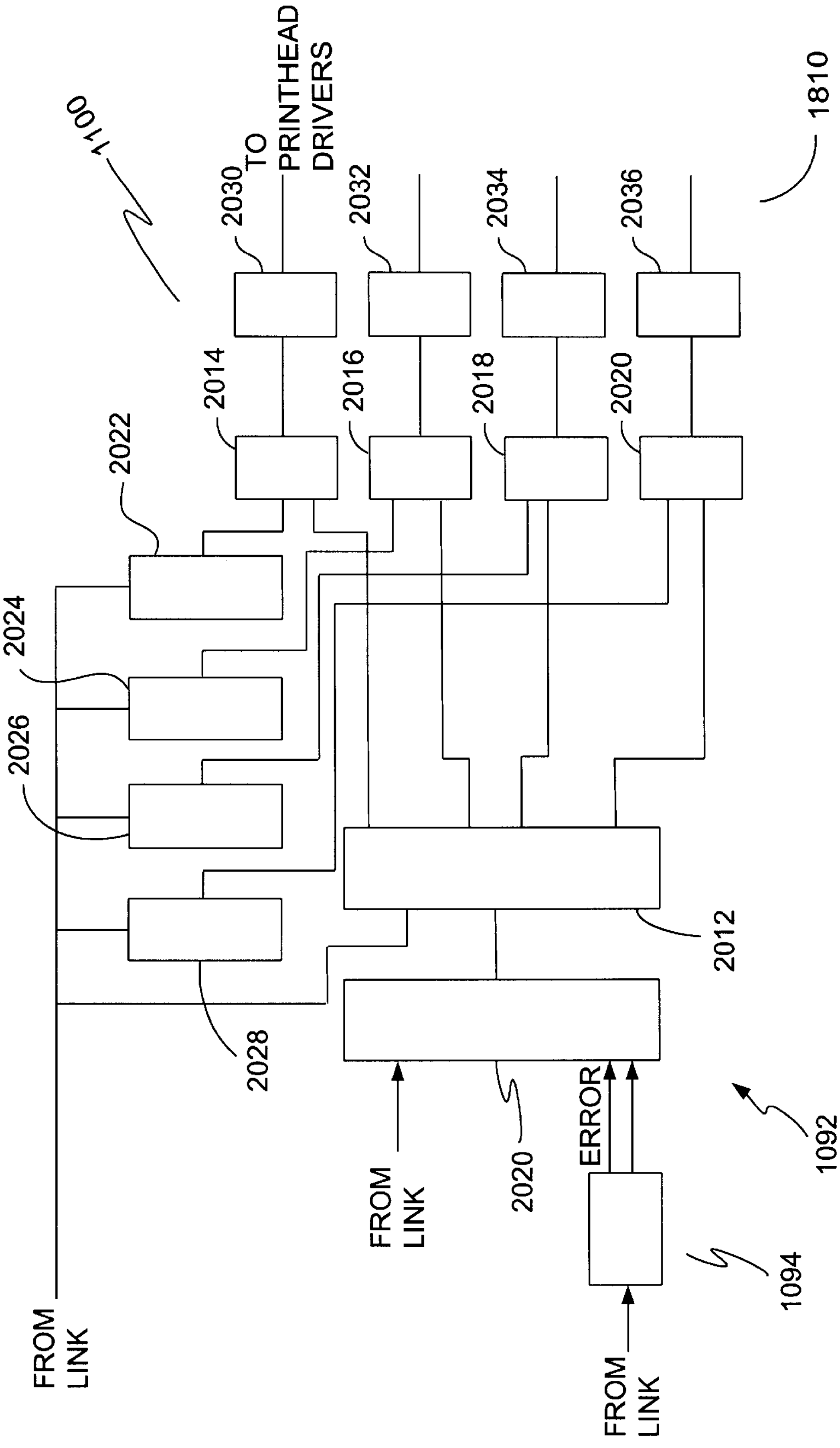
FIG. 28 is a block diagram of the printing control circuit of the present invention.

Turning to FIG. 28, the theta-z correction circuit of the present invention is shown implemented within the pen fire control circuit 1100 in the printing control circuit 1810. The pen fire control circuit 1100 receives its input from the serial-to-parallel converter 1092. As mentioned above, the serial-to-parallel converter 1092 includes a synchronizer 1094, a first pipeline register 2010 and a second pipeline register 2012. The first pipeline shift register 2010 is clocked by the synchronous clock to receive serial data from the shuffler 1070 through the driver circuit 1802 and provides a parallel output to the second pipeline shirt register 2012 on successive fire pulses.

The theta-z correction circuit includes plural delay registers 2014, 2016, 2018, and 2020 which are fed by plural correction controllers 2022, 2024, 2026 and 2028, respectively, and provide inputs to plural fire controllers 2030, 2032, 2034 and 2036, respectively. On the next fire pulse, the parallel output of the second pipeline shift register 2012 is divided between plural (four) delay registers 2014, 2016, 2018 and 2020. The first and second delay registers hold upper and lower quadrants of the nozzles of the first printhead 1084, while the third and fourth delay registers hold upper and lower quadrants of the nozzles of the second printhead 1086. The output of the first, second, third and fourth delay registers 2014, 2016, 2018 and 2020, respectively, are gated to the associated printhead via corresponding firing controllers 2030, 2032, 2034 and 2036, respectively, by alignment correction controllers 2022, 2024, 2026 and 2028, respectively.

Each correction controller controls one segment of each printhead. Although only four controllers are shown, a separate controller may be provided for each nozzle of each printhead. Although only four controllers are shown, a separate controller may be provided for each nozzle of each printhead. The correction controllers may be implemented with shift registers and counters. Each correction controller is programmed by the controller 1804 to delay the application of fire pulse trigger by a predetermined amount based on the following equations:

theta-z error(time)=theta-z error(space)/printing val. [6a]

delay value=theta-z error(time)/system clock [7a]

where:

- theta-z error(time)=theta-z error converted to delta-y error in time domain (in seconds)
- theta-z error(space)=theta-z error converted to delta-y error in space domain (in inches)
- printing vel.=pen velocity during printing (in inches/second)
- delay value=value to be programmed into each theta-z correction delay
- controller (in system clock cycles)
- system clock=delay controller counting speed (in seconds).

Delta-y error represents a shift of the pen in the Y direction.

After the theta-z controller terminates, data in the second state pipeline will be latched into each individual third stage pipeline register. The process is repeated for each fire pulse trigger and each segment of the pens are shifted in the time domain and thus translated into shifts in the space domain in accordance with equations [6a] and [7a] above.

The firing controllers include a fire nozzle address generator sate machine and a subfire pulse generator state machine. The fire nozzle address generator state machine generates the address of the nozzle to be fired. The subfire pulse generator generates pen nozzle firing sequence timing and energy control signals. The nozzle address along with timing and fire control signals are provided via output buses from the fire controllers 2030, 2032, 2034 and 2036 to the printhead drivers.

FIG. 30 is a state diagram of the fire nozzle address generator state machine.

Figure 31A:
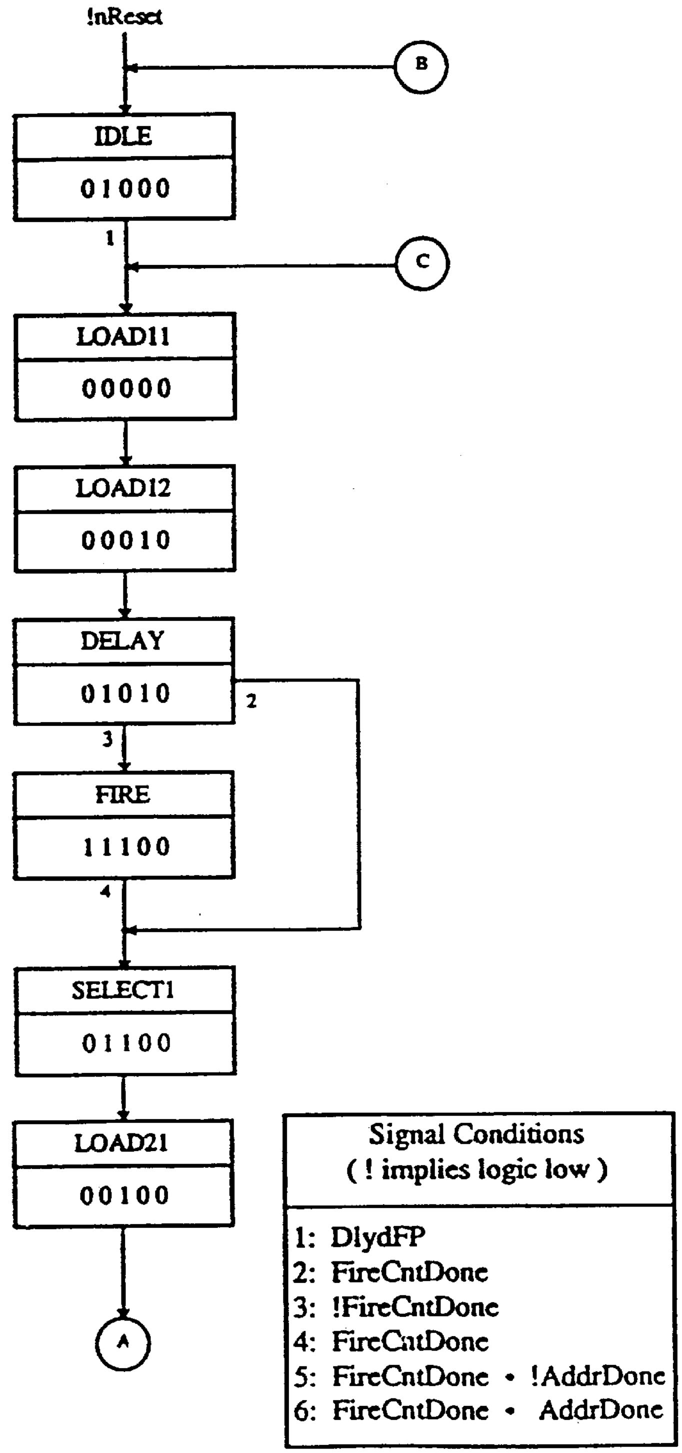
FIG. 31 is a state diagram of the subfire pulse generator state machine.
Figure 31B:
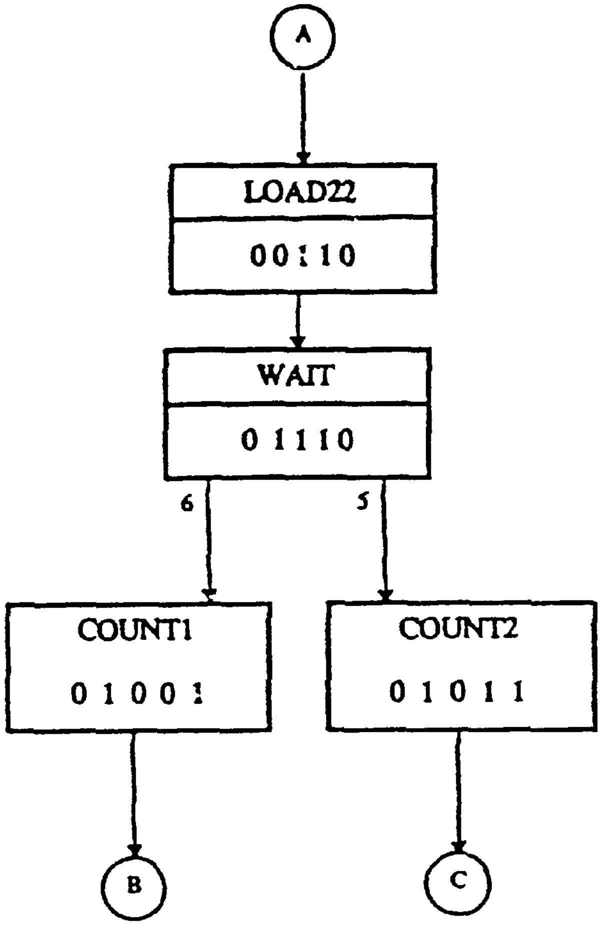

FIG. 31 is a state diagram of the subfire pulse generator state machine.

The degree of delay required is determined by the pen alignment and edge detect sensor 1820. The pen alignment and edge detect sensor 1820 is discussed in various other sections of this specification. In the alternative, any optical arrangement may be used to detect the alignment of the outputs of the nozzles and provide signals corresponding thereto.

The print cartridges C1, C2 are mechanically closely aligned pursuant to manufacturing tolerances, and are finely aligned as disclosed herein so that the two printhead cartridges C1, C2 cooperatively function like a single printhead having a single column of 96 nozzles. In this manner, each scan or swath is 96 nozzle pitches wide (as measured in the media scan direction), and provides for an increased rate of printing as compared to the use of a single print cartridge. Alignment along the carriage scan axis is achieved by adjusting the swath data shifts to provide correction of the integral dot pitch portion of the detected horizontal misalignment, and then adjusting the timing of the firing of the ink jet nozzles to correct the fractional dot pitch portion of the detected horizontal misalignment. Alignment in the media scan direction is achieved by selecting the enabled nozzles of the printhead cartridges C1, C2 to correct the integral nozzle pitch portion of the detected vertical misalignment, and then adjusting the angular position of the first printhead cartridge C1 relative to the second printhead cartridge C2 via the adjustment cam 111 to correct the fractional nozzle pitch portion of the detected vertical misalignment. These adjustments are made pursuant to the printing of test line segments, and then measuring the distances between the test line segments by use of the optical sensor 65 which is shown in simplified schematic cross-section in FIG. 7.

Figure 7:
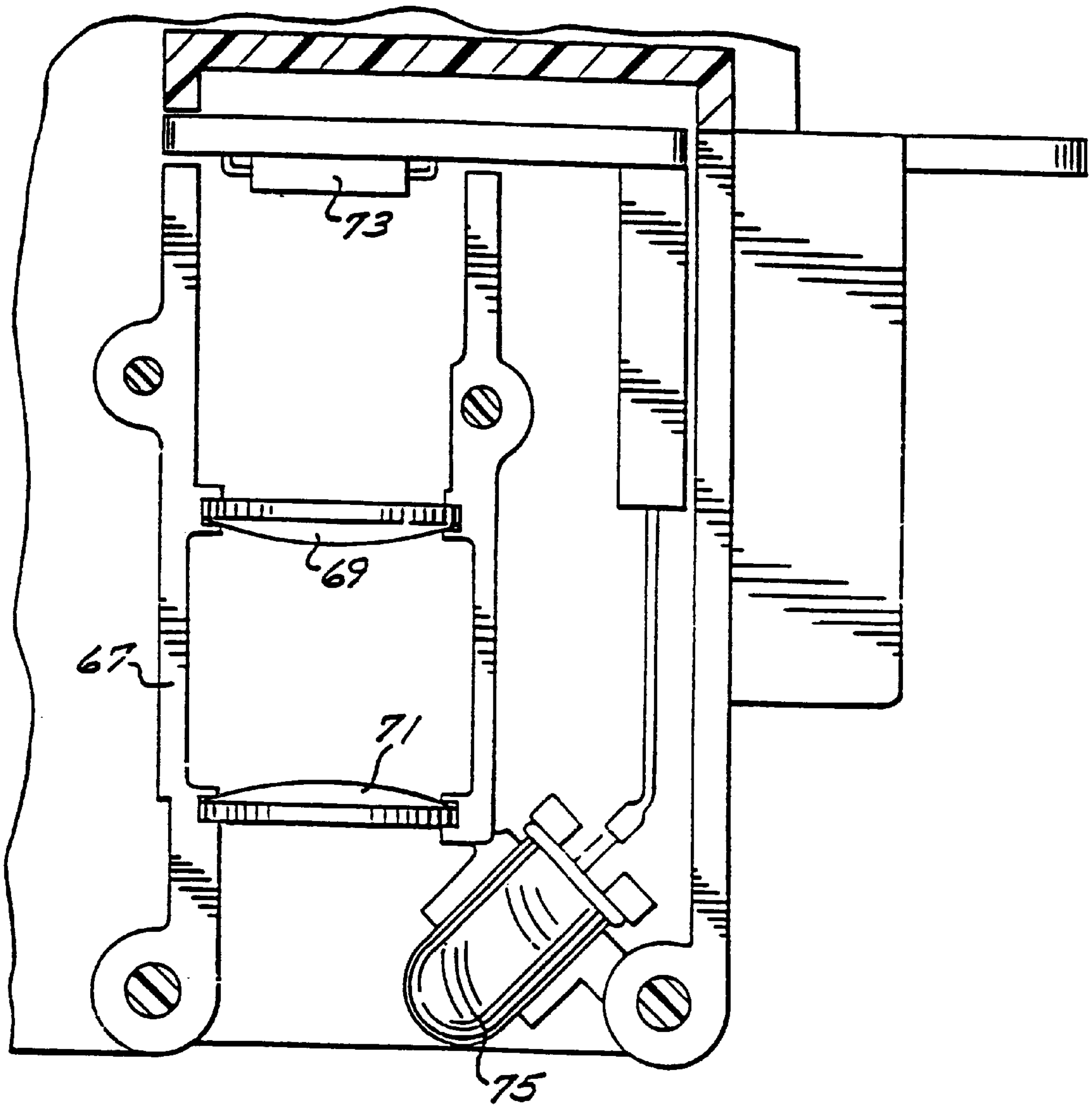
FIG. 7 is a simplified sectional view of the optical sensor of the swath printer of FIG. 1.

Referring particularly to FIG. 7, the optical sensor includes a housing 67 which supports imaging lenses 69, 71 that image a portion of the print media, for example on a one-to-one basis, onto a quad photodiode detector 73 located at the top of the housing. An illumination source 75, comprising for example an LED, is supported at the bottom of the housing so as to illuminate the print media that is in the vicinity of the optical axis of the imaging lenses 69, 71.

The quad photodiode detector 73 comprises four photodiodes A, B, C, D as schematically depicted in FIG. 8 which also illustrates in block form circuitry for processing the outputs of the detector photodiodes. The photodiodes A, B, C, D are depicted as boxes that represent their active areas. The active areas of the photodiodes A and B are aligned with the carriage scan axis as are the active areas of the photodiodes C and D. The active areas of the photodiodes A and C are aligned with the media axis, as are the active areas of the photodiodes B and D. Essentially, the photodiodes are positioned in a square whose sides are aligned with the carriage scan axis and the media scan axis.

A difference amplifier circuit 77 subtracts the output of the photodiode D from the output of the diagonally opposite photodiode A, while a difference amplifier circuit 79 subtracts the output of the photodiode C from the output of the diagonally opposite photodiode B. The analog difference outputs of the difference amplifier circuits 77, 79 are converted to digital by respective channels of the analog-to-digital converter 81, which for illustrative purposes are channels 0 and 1. Alternatively, individual A/D converters can be used for each of the difference outputs of the difference amplifier circuits 77, 79. Subtraction of the digital versions of the difference amplifier circuit outputs produces a difference signal H that is effectively the difference of the outputs of a dual detector wherein the vertically aligned photodiodes A and C function as one detector and the vertically aligned photodiodes B and D function as the other detector:

$$H=CHO-CH1=(A-D)-(B-C)=(A+C)-(B+D) \quad \text{(Equation 1)}$$

where the photodiode detector outputs are represented by the reference letters used to identify the photodiode detectors, and where the outputs of the A/D converter channels 0 and 1 are respectively represented as CH0 and CH1. The difference signal H shall be called the sensor horizontal difference signal H since it will be utilized to determine the horizontal positions of vertical lines.

Analogously, adding the digital versions of the outputs of the difference amplifier circuits 77, 79 produces a difference signal V that is effectively the difference of the outputs of a dual detector wherein the horizontally aligned photodiodes A and B function as one detector and the horizontally aligned photodiodes C and D function as the other detector:

$$V=CH0+CH1=(A-D)+(B-C)=(A+B)-(C+D) \quad \text{(Equation 2)}$$

The difference signal V shall be called the sensor vertical difference signal since it will be used to determine vertical position of horizontal lines.

FIG. 9 schematically illustrates a continuous plot of the sensor horizontal difference signal H as a function of displacement of the image of a vertical line across the active areas of the quad detector along the carriage scan axis. As the image begins to fall on the (A+C) side of the quad the difference signal H becomes negative since less photo current is developed in these segments. The difference signal H flattens out as the image is completely on the (A+C) side. The image then starts leaving the (A+C) side and entering the (B+D) side. The resulting difference signal H then becomes positive because more photo current is being generated by the (A+C) side and less is being generated by the (B+D) side. The slope of the center region of the plot of the difference signal H is ideally linear and is the "useful" region of the optical sensor. The flat positive flat portion of the plot corresponds to when the image of the line is only on the (B+D) side of the quad. Finally the difference signal H returns to the base line as the line image leaves the right side of the quad.

A continuous plot of the sensor vertical difference signal V as a function of displacement of the image of a horizontal line across the active areas of the quad detector along the media scan direction would be similar to that shown in FIG. 9, except that image position would be along the media scan axis. The center of the response of the difference signal V contains a useful linear region wherein the difference signal V can be utilized to sense the vertical position.

The field of view of the optical sensor must be less than the length of the line segment to be sensed, plus or minus the uncertainty of positioning accuracy along the line, so that the image of the line always extends beyond the active area of the quad sensor, for example as schematically illustrated in FIG. 8. In other words, the line segment must be extend in both directions beyond the field of view of the optical sensor. The range of the optical sensor linear region about the center of the quad detector depends upon magnification, the width of the line segment being imaged, and the width of the individual photodiode segments of the quad detector. By way of illustrative example, for a magnification of essentially one, horizontal line segments having a width of 3 resolution dot pitches for vertical position sensing, vertical line segments having a width of 5 resolution dot pitches for horizontal sensing, and quad photodiode elements larger than the widths of the lines to be imaged, the range of the linear sensor region is about 3 resolution dot pitches for vertical position sensing and about 5 resolution dot pitches for horizontal position sensing.

Horizontal alignment can be achieved generally as follows. The optical sensor 65 is initially calibrated to determine a best fit straight line for the center of the plot or response of the horizontal difference signal H for the particular sensor so that the horizontal difference signal H value for a detected vertical line segment can be translated into position relative to a predetermined horizontal reference location. A plurality of vertical test line segments are then printed by each of the cartridges in each of the carriage scan directions, and the horizontal positions of the vertical test line segments are determined relative to the predetermined reference location by horizontally positioning the optical sensor so that all of the vertical test line segments are horizontally within the linear region of the sensor. The media is then displaced so that the sensor is respectively vertically aligned with the nominal vertical centers of the test line segments, and the horizontal difference signal H values for each of the line segments is read and utilized to determined line position in accordance with the best fit straight line. The differences between relative horizontal positions of the vertical test line segments are then utilized to adjust swath print data column shifts and the timing of nozzle firing of the printhead cartridges.

Figure 15A:
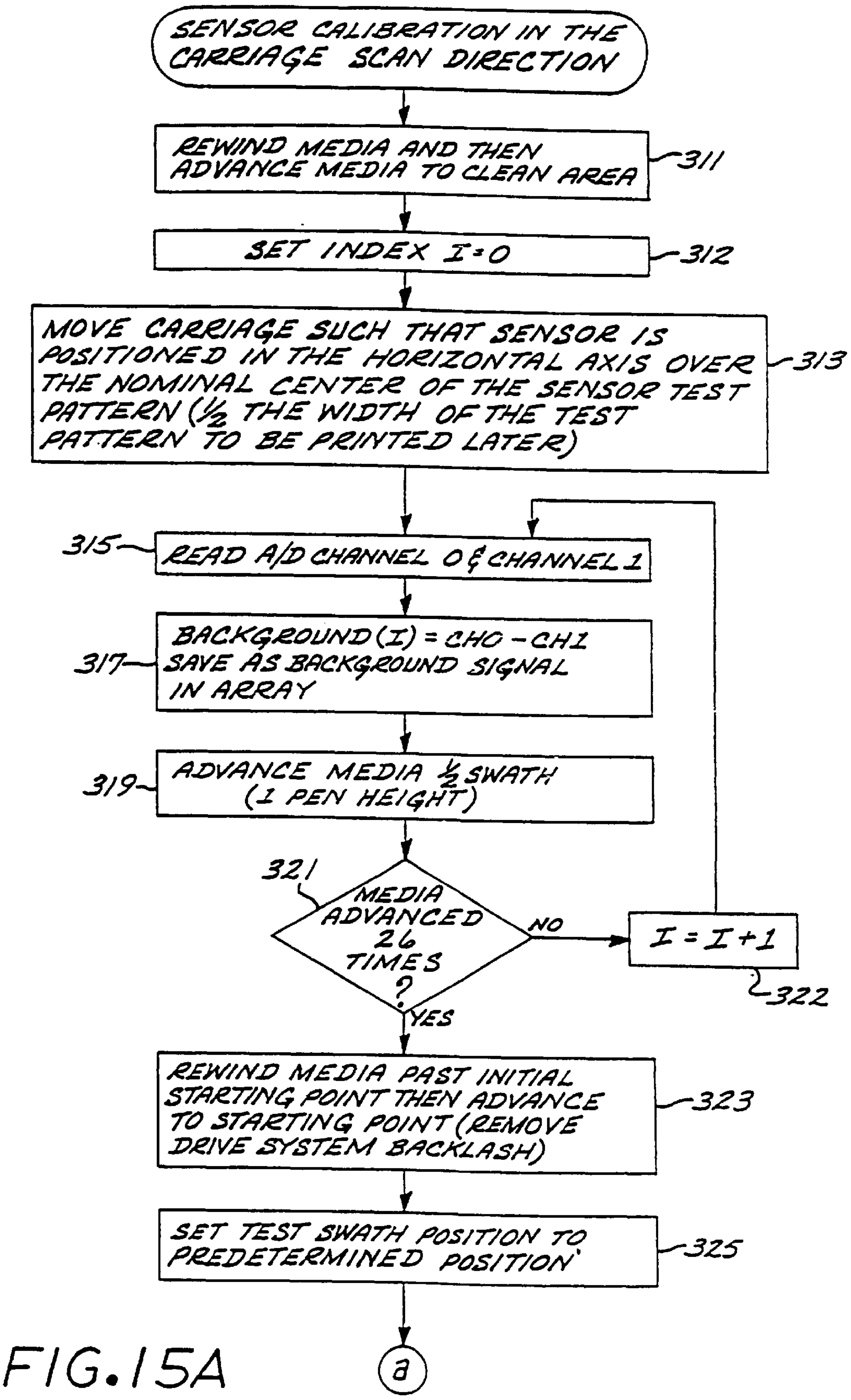
FIGS. 15A through 15C set forth a flow diagram of a procedure for calibrating the optical sensor of the printer of FIG. 1 for use in determining horizontal position of vertical test line segments.
Figure 15B:
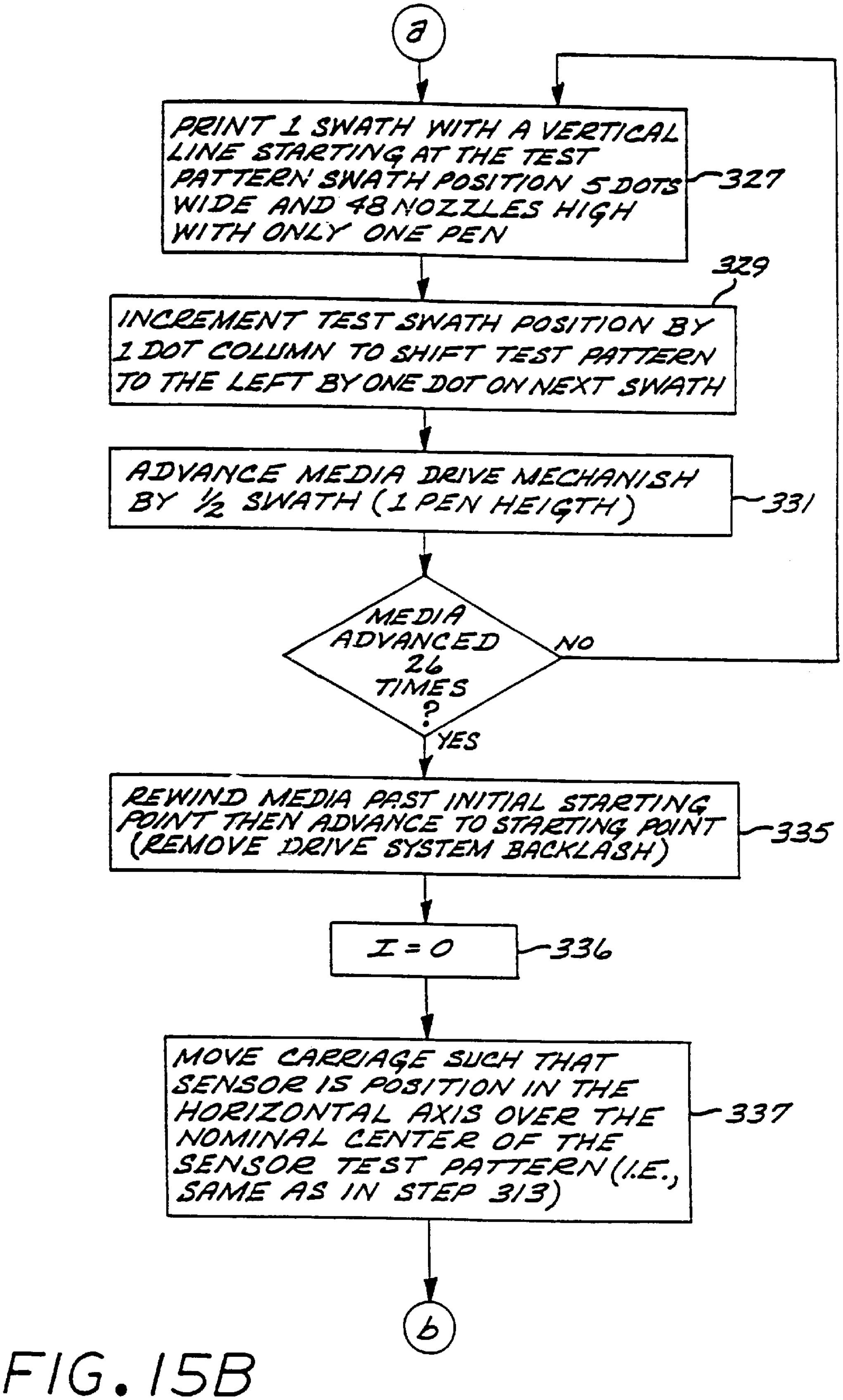
Figure 15C:
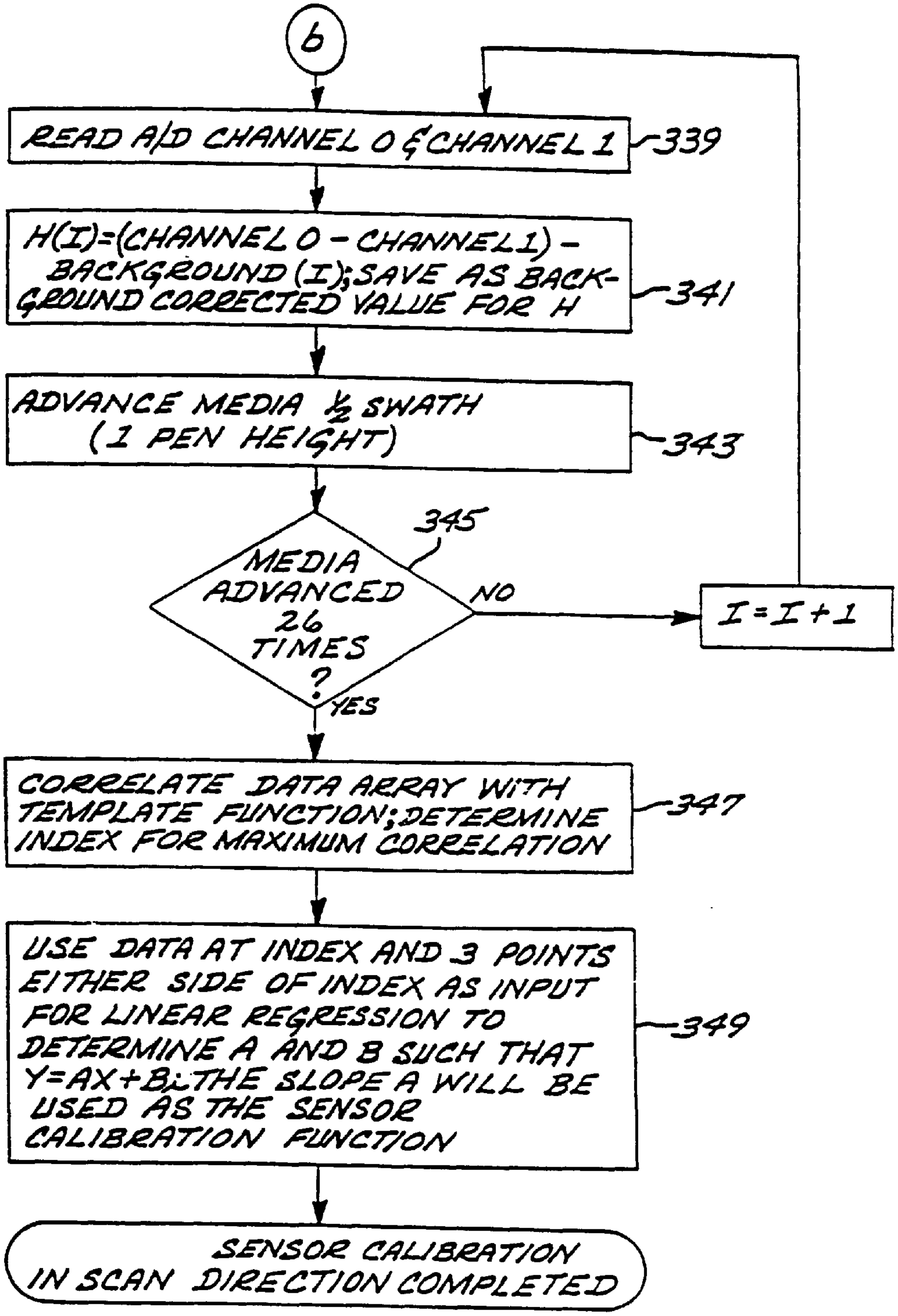

FIG. 10 illustrates in exaggerated form a slightly diagonal calibration "line" that is produced by one of the printheads in a unidirectional mode in conjunction with a calibration procedure set forth FIGS. 15A through 15C for calibrating sensor H difference signal response for horizontal alignment of the print cartridges.

Referring in particular to the flow diagram of FIGS. 15A through 15C, at 311 the print media is rewound and then advanced to a predetermined vertical start location of a clean unprinted area, so as to remove drive system backlash. At 313 the carriage is moved so as to align the optical sensor with the nominal horizontal center of the calibration line to be printed later (i.e., horizontally between the ends of calibration line), and at 315 the channel 0 and channel 1 outputs of the A/D converter 81 are read. At 317 the value of the sensor horizontal difference signal H is calculated in accordance with Equation 1, and the result is stored as a background value for the particular vertical location of the print media. At 319 the media is advanced one-half swath (i.e., 48 nozzle pitches along the media scan axis). At 321 a determination is made as to whether theia has been advanced by 26 half-swaths pursuant to step 319. If no, control transfers to 315 for the calculation and storage of another value of the H difference signal. If the determination at 321 is yes, control transfers to 323.

Pursuant to steps 313 through 321, background values of the horizontal difference signal H are determined for those locations which will be sensed by the optical sensor for sensing the vertical segments of the calibration line to be printed next.

At 323 the media is rewound past the predetermined vertical start location and then advanced to the predetermined vertical start location, so as to remove drive system backlash. At 325 the swath position for the first vertical segment CAL1 of the calibration line is set to a predetermined horizontal location corresponding to the horizontal start of the calibration line. At 327 the carriage is scanned in a predetermined direction, and a vertical line having a width of 5 resolution dot pitches is printed using 48 nozzles of a predetermined cartridge starting at the specified swath position. At 329 the specified swath position is incremented to offset the next vertical line segment one resolution dot pitch, for example to the left, and at 331 the media is advanced by one-half swath. At 333 a determination is made as to whether the media has been advanced 26 times pursuant to step 331. If no, control transfers to 327 to print another vertical segment of the calibration line.

Pursuant to steps 325 through 333, one printhead cartridge is caused to print in the same scan direction a series of vertical line segments CAL1 through CAL26 of substantially constant width, where the vertical line segments are respectively incrementally offset in a given horizontal direction by one resolution dot pitch.

At 335, the media is rewound past the predetermined vertical start location and then advanced to the vertical start position, so as to remove drive system backlash. At 337 the carriage 51 is moved so as to align the optical sensor 65 with the nominal horizontal center of the calibration line that was just printed in pursuant to steps 325 through 333 (i.e. in the same horizontal position as in step 313 above). At 339 the CH0 and CH1 outputs of the A/D converter are read. At 341 a background corrected value for the difference signal H is calculated by taking the difference between the CH0 and CH1 outputs, and subtracting the previously stored background value of H for the present vertical location. The background corrected value for H is stored as to the present vertical location, and at 343 the print media is advanced by one-half swath. At 345 a determination is made as to whether the media has been advance 26 times pursuant to step 343. If no, control transfers to 339 for sampling of further A/D CH0 and CH1 outputs. If yes, control transfers to 347.

Pursuant to steps 335 through 345, background corrected values of the difference signal H for vertical line segments of different horizontal positions are stored in an array, wherein position in the array represents horizontal distance from an undefined but fixed horizontal reference. Thus, if the 0th entry in the array is for the first vertical line, the horizontal positions of the vertical lines responsible for the array values can be considered equal to I resolution dot pitches from the 0 horizontal position which is defined by the first vertical line, where I corresponds to position in the array. As will be seen later, the array values are subtracted from each other for correction purposes, and the actual 0 horizontal location is not pertinent.

At 347 the stored background corrected values of the difference signal H are correlated with a template function that is similar to the linear region of the plot of FIG. 9 of the sensor difference signal H. The template function has fewer data points than the stored array of background corrected values of the difference signal H, and the array position of the difference signal H value at the center of the sequence of difference signal values that produces the maximum correlation is saved as the maximum correlation index. At 349 the background corrected value of the difference signal H corresponding to the maximum correlation index and the three background corrected values of the difference signal H on either side thereof are utilized for a linear regression that determines the best fit straight line:

$$H=A*HPOS+B \qquad \text{(Equation 3)}$$

where H is the background corrected difference signal H, HPOS is horizontal image position relative to a fixed 0 horizontal location, A is the slope, B is the hypothetical value of H according to the best fit line for a vertical line located at the fixed 0 horizontal location. The slope A will be utilized later to determine the position of vertical test lines such as those schematically shown in FIG. 11.

The foregoing calibration procedure effectively scans the calibration line across the sensor in the horizontal direction without horizontally moving the optical sensor 65 and without having to rely upon the resolution of print carriage positioning mechanism of the printer. Thus, this calibration technique and the technique described further herein for determining horizontal position of vertical lines are advantageously utilized in a printer that do not have sufficient resolution in its carriage positioning mechanism, since the resolution of the sensor is relied on rather than the resolution of the carriage positioning mechanism.

Figure 16A:
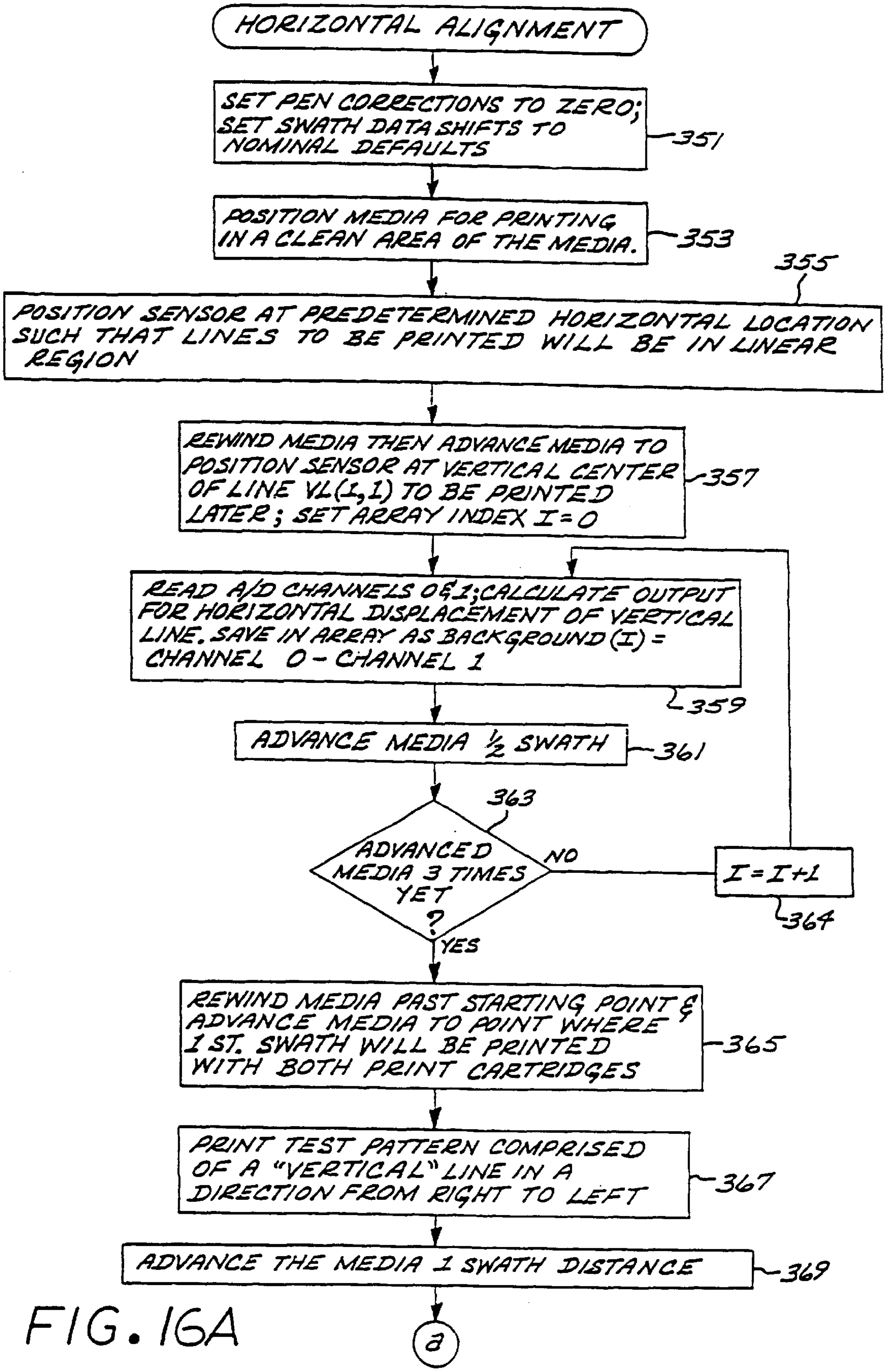
Figure 16B:
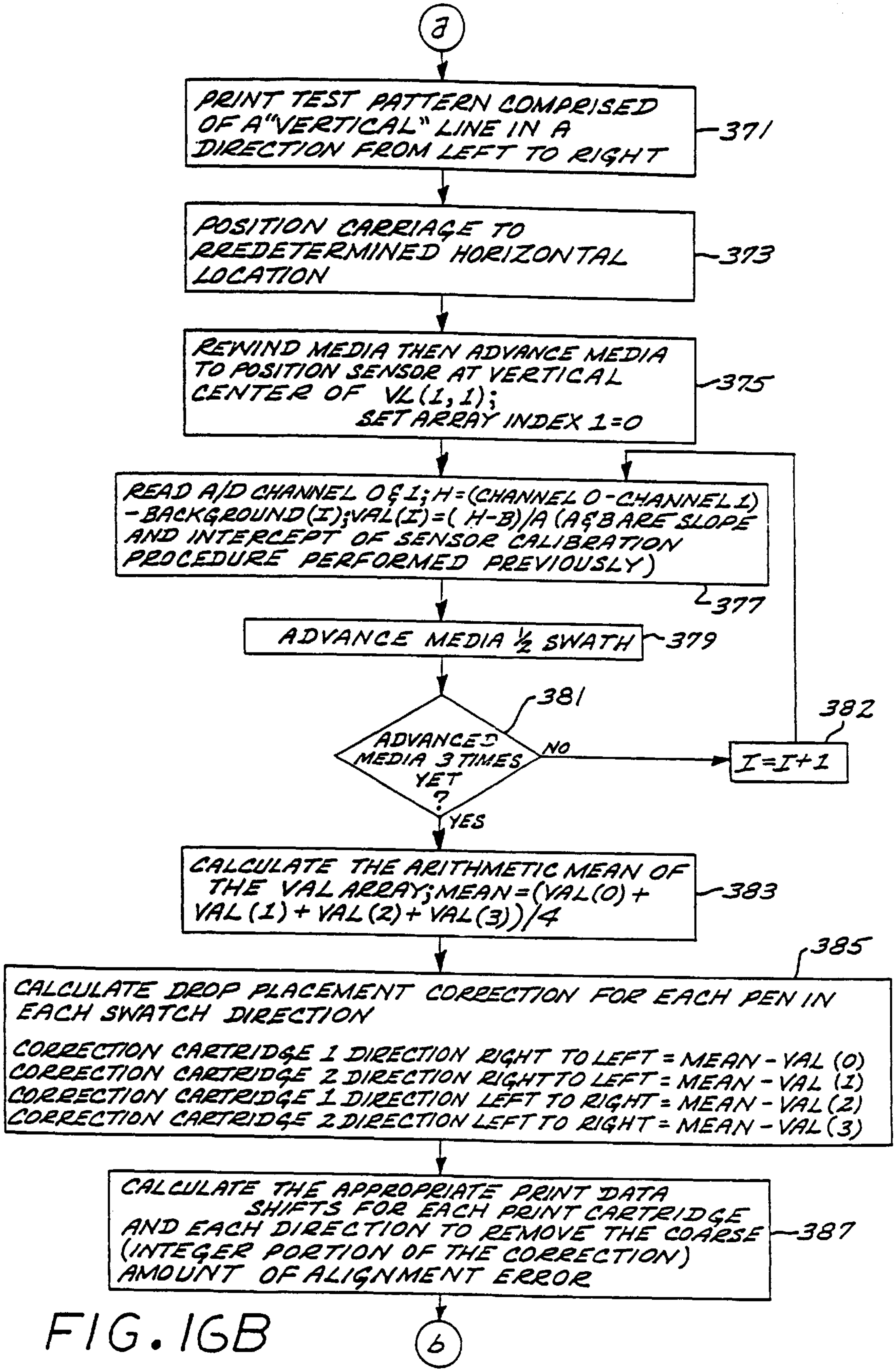
Figure 17A:
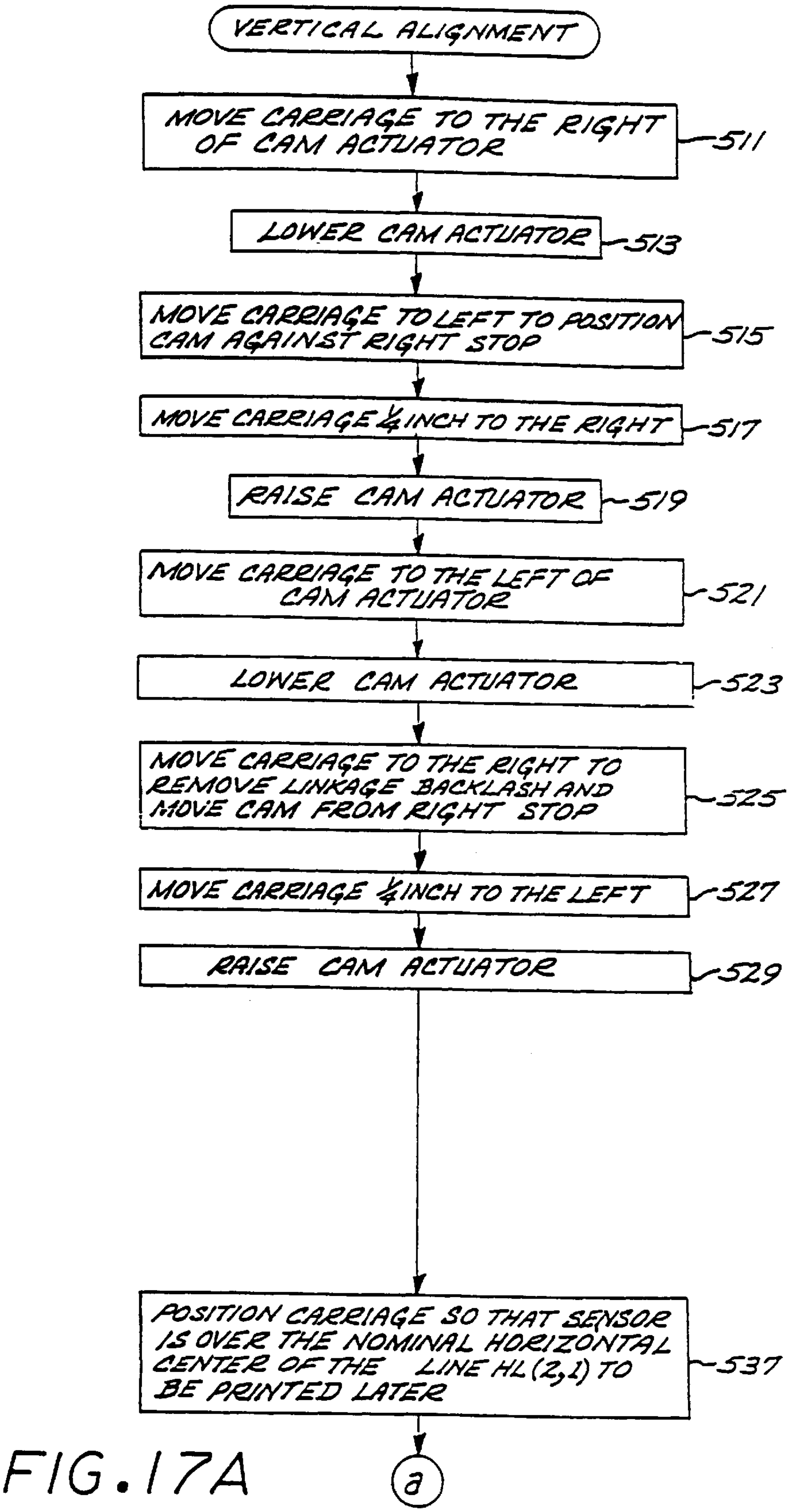
FIG. 17A through 17G set forth a flow diagram flow diagram of a procedure for vertically aligning the operation of the print cartridges of the swath printer of FIG. 1.
Figure 17B:
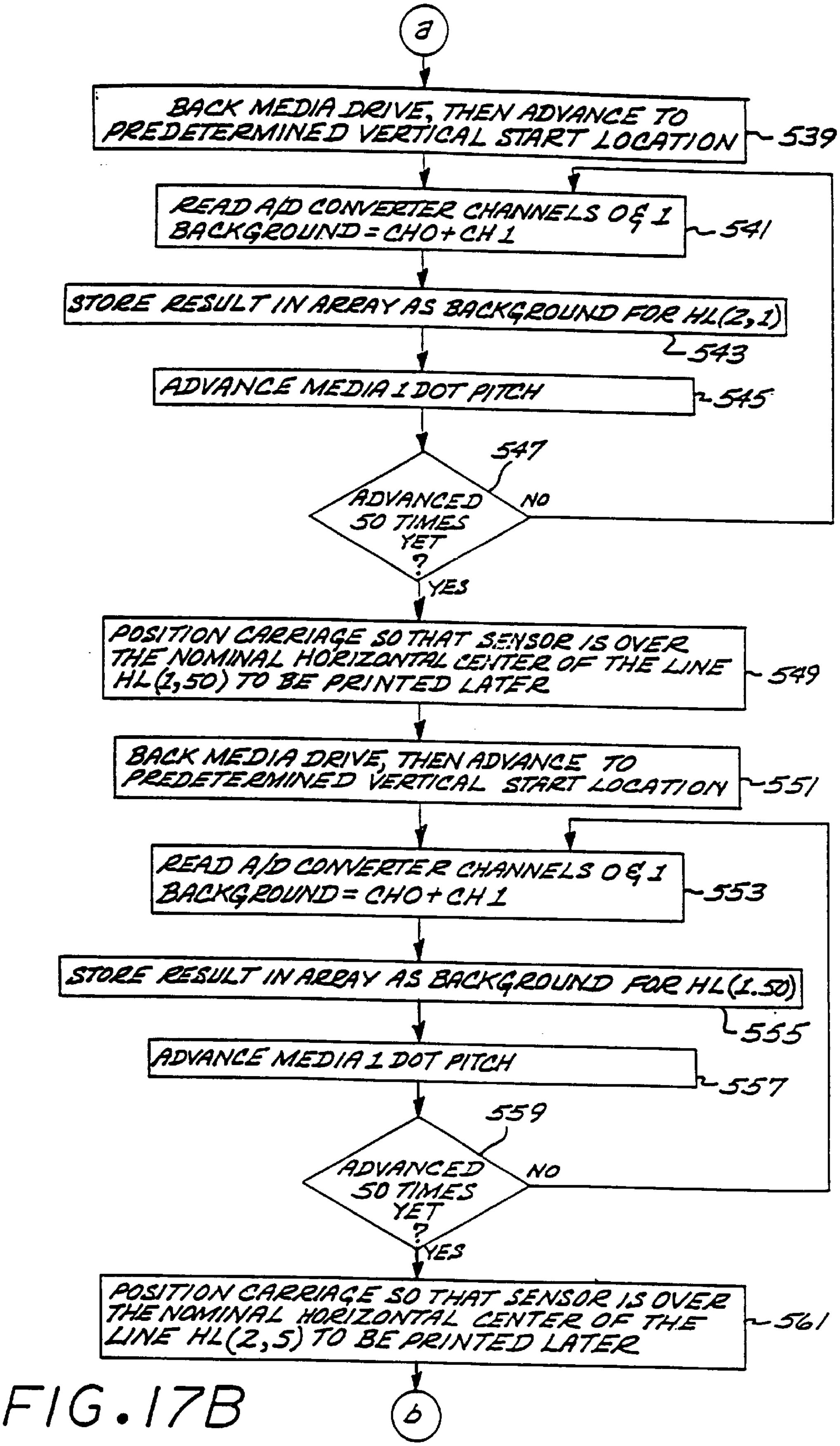
Figure 17C:
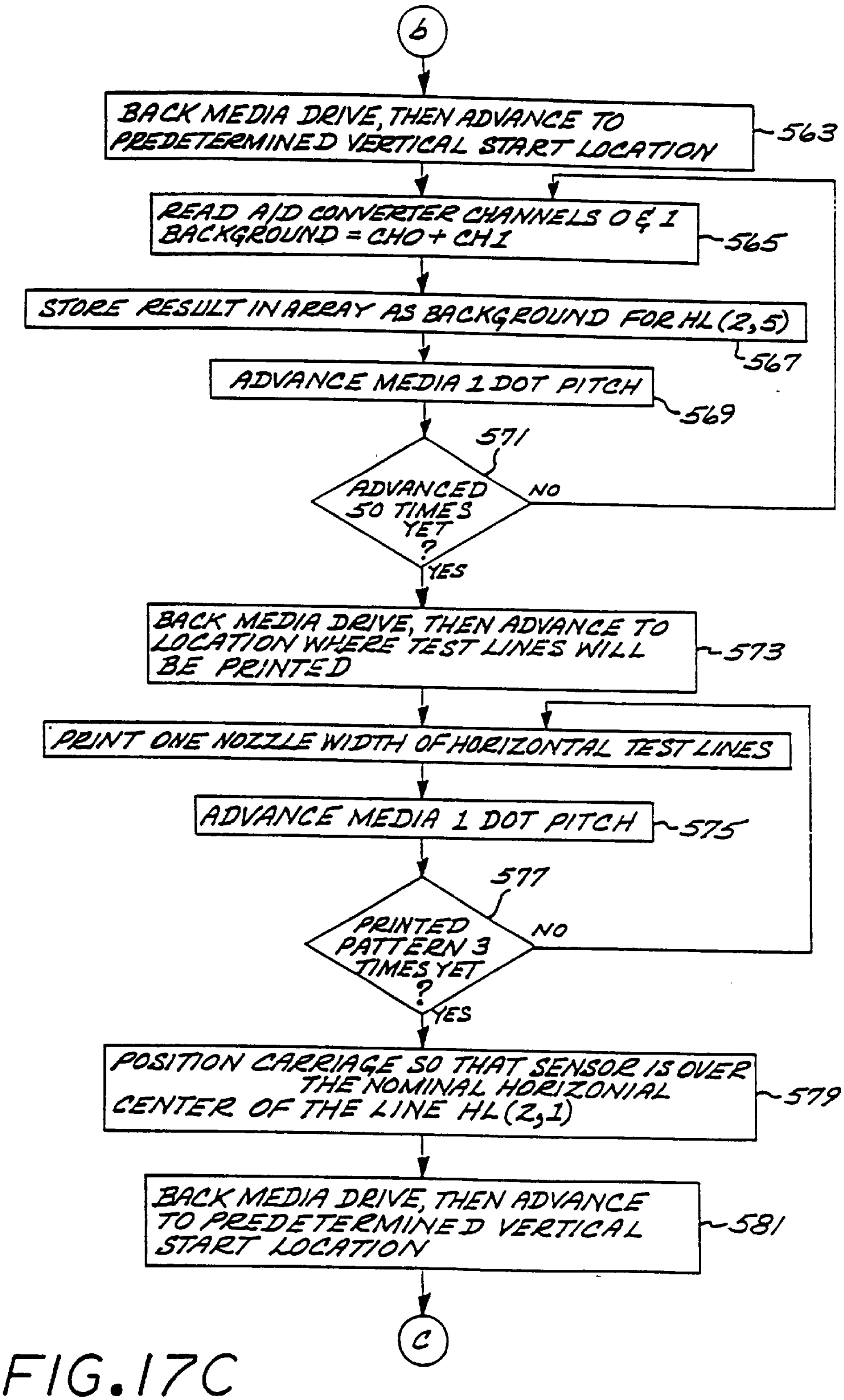
Figure 17D:
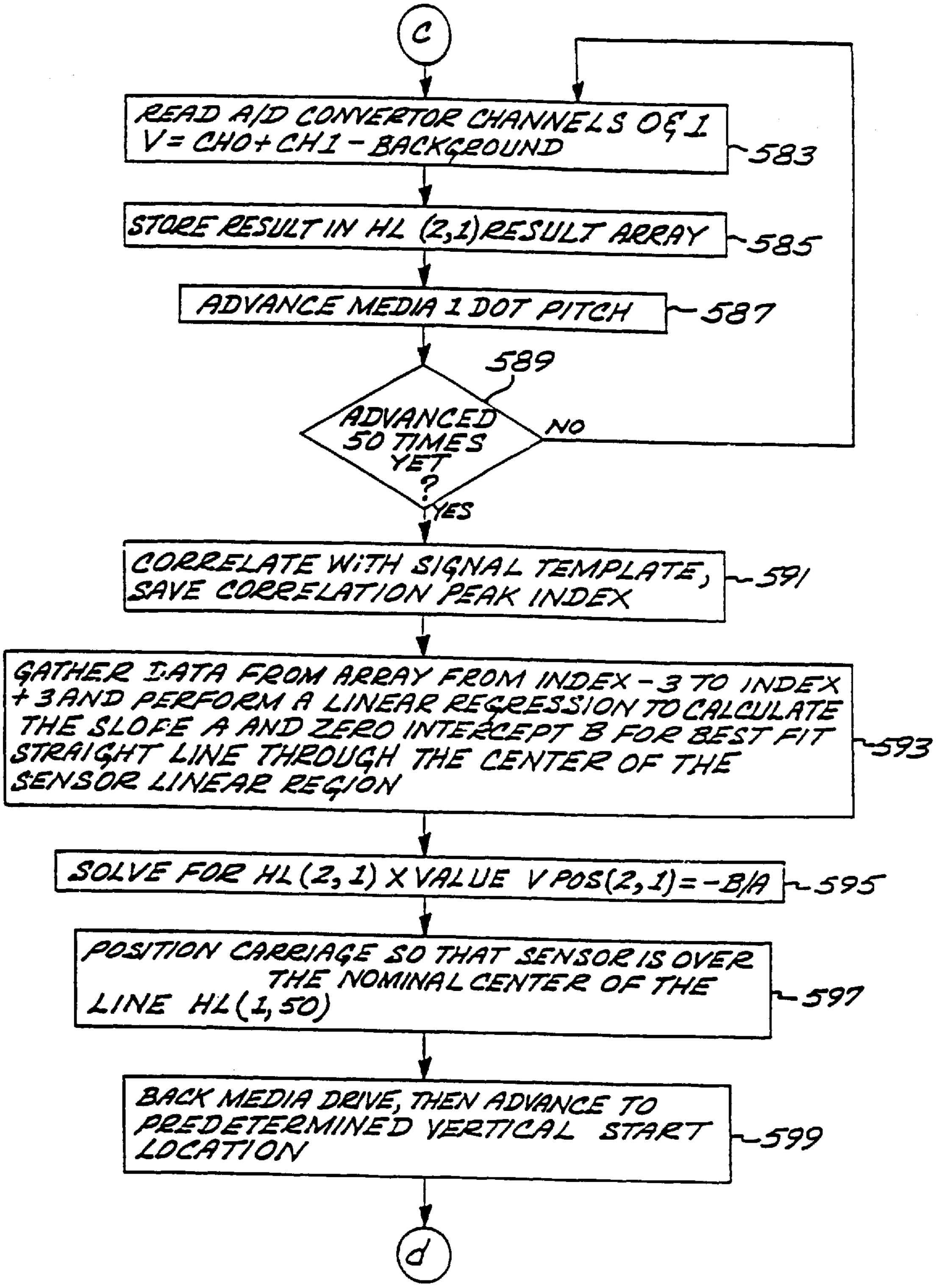
Figure 17E:
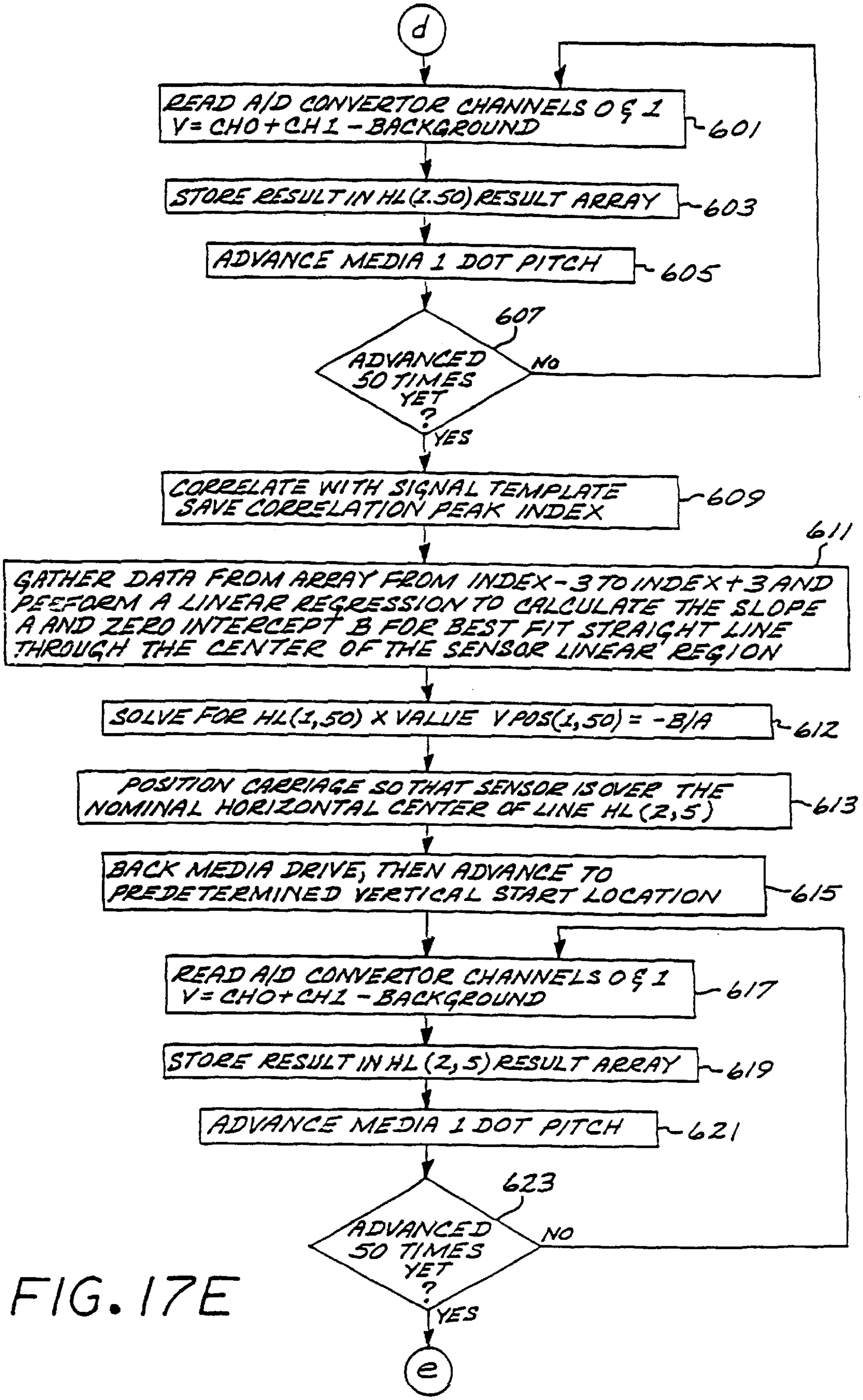
Figure 17F:
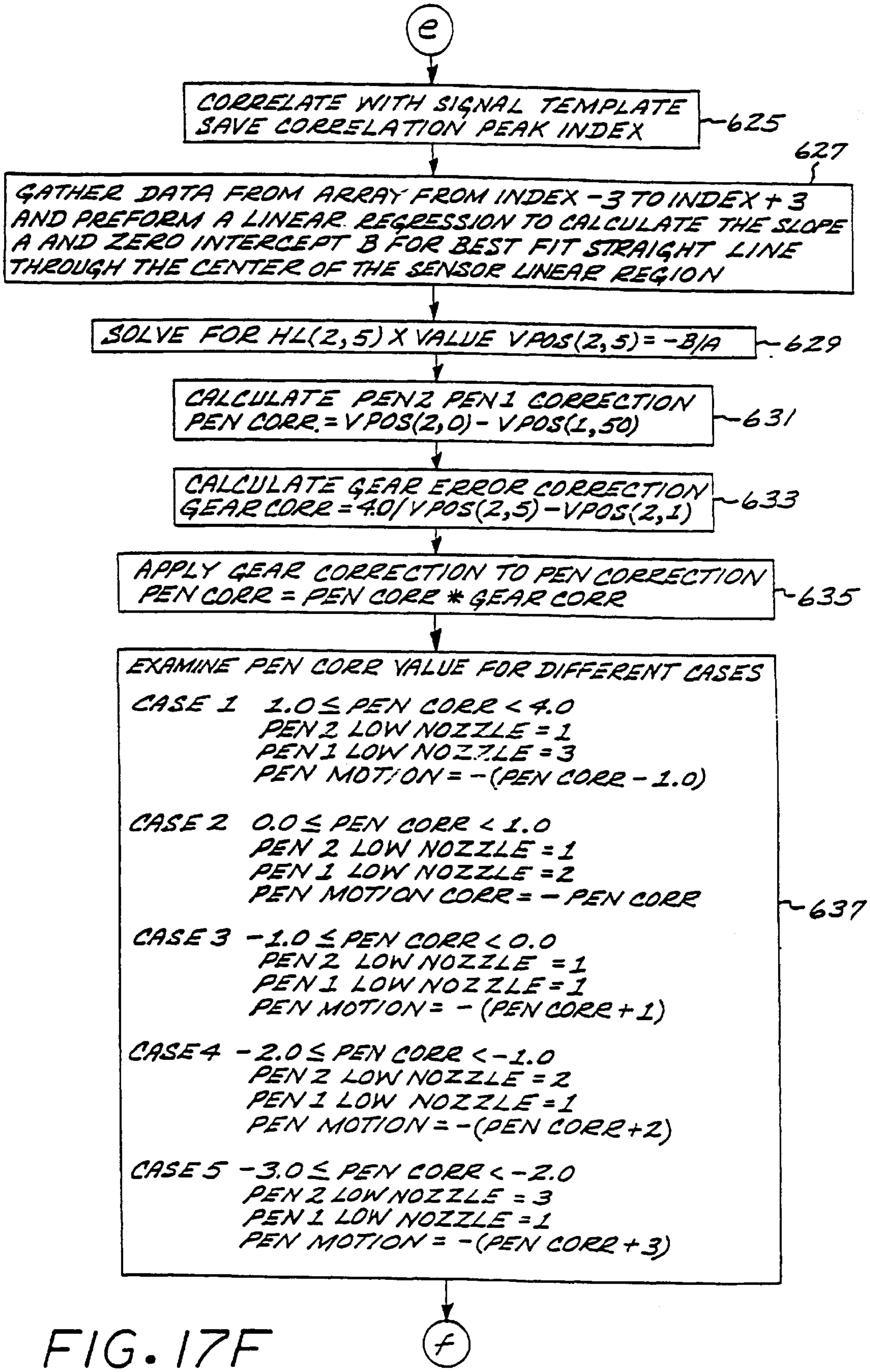
Figure 17G:
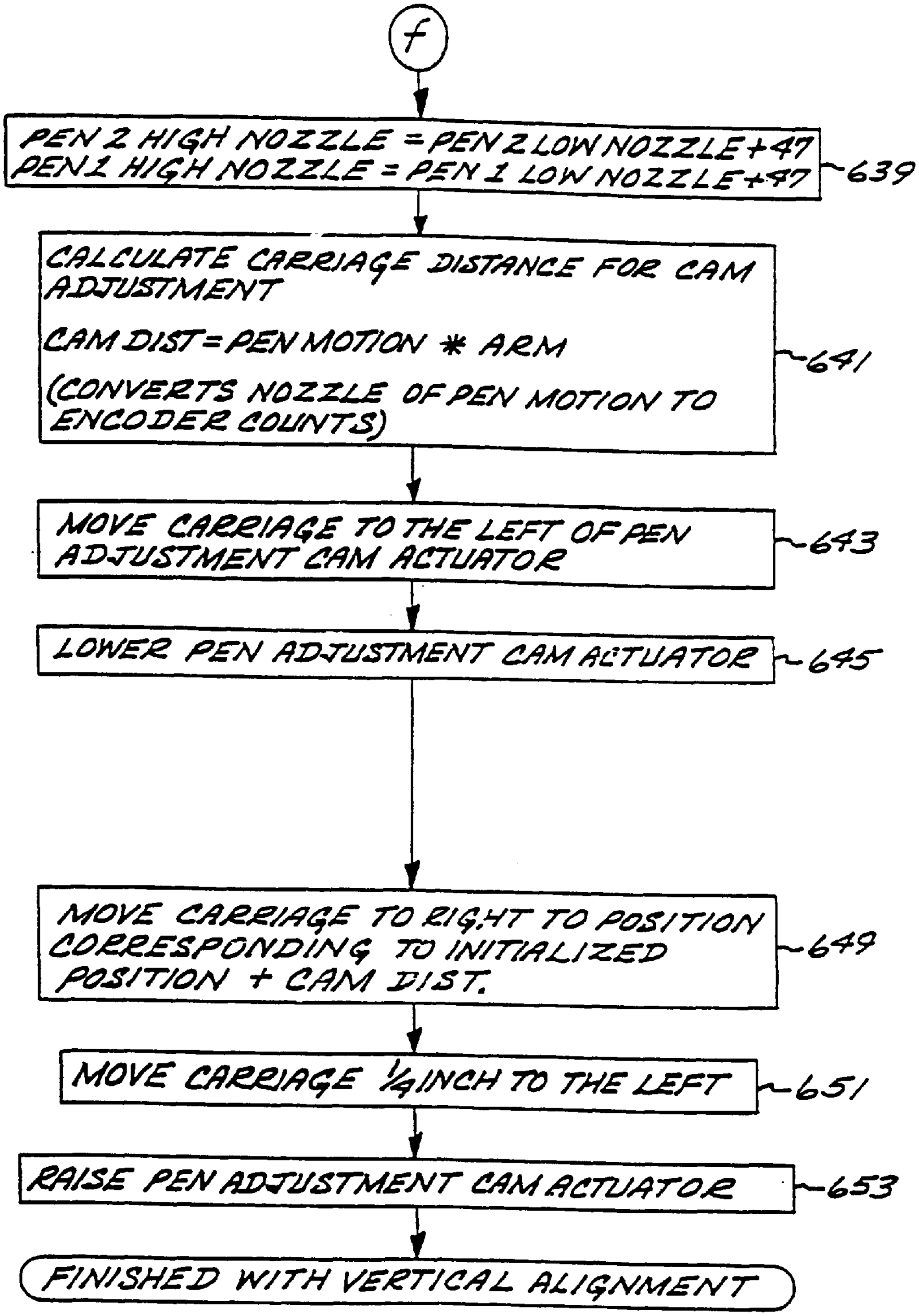

Referring now to FIGS. 16A through 16C, set forth therein is a flow diagram for providing horizontal alignment pursuant to printing vertical test line segments such as those schematically depicted in FIG. 11, determining the distances between such vertical test line segments, and utilizing the relative distance information to provide horizontal alignment corrections. At 351, timing delay corrections for the cartridges are set to zero, and swath data shifts are set to their nominal values that are based on conventionally considered factors such as nominal offsets between printhead cartridges, dimensions of the carriage, average ink drop flight times, and so forth. At 353 the media is positioned to allow printing in a clean area of the media, including for example the right margin. At 355 the carriage 51 is positioned at a predetermined horizontal location that is selected so that vertical test line segments to be printed later will be in the linear region of the difference signal H response for the sensor 65 as positioned at such predetermined horizontal location. At 357 the media is rewound and then advanced to a vertically align the sensor with the location of the nominal vertical center of the line to be printed later by the cartridge C1 on the first scan (identified as the line segment VL(1,1) in FIG. 11), and an array index I is set to 0. At 359 the sensor difference signal H is read and stored in a background array as BACKGROUND (I). At 361 the media is advanced one-half swath (i.e., one nominal nozzle array height), and at 363 a determination is made as to whether the media has been advanced 3 times pursuant to 361. If no, at 364 the index I is incremented by 1, and control transfers to 359 for another background reading of the sensor difference signal H. If the determination at 363 is yes, the media has been advanced 3 times pursuant to 361, control transfers to 365.

Pursuant to steps 353 through 363, print media background values for the difference signal H are calculated and stored for the media locations for which the sensor difference signal H will later be calculated in conjunction with determining the horizontal positions of vertical test lines printed in accordance with the following.

At 365 the media is rewound and then advanced to the vertical position where vertical line segments will be printed by both cartridges in a first swath or scan. At 367 each of the cartridges prints a 5 dot resolution pitch wide vertical line segment at the designated horizontal location, using for example 48 nozzles in each cartridge, in a first scan direction. At 369 the media is advanced one swath height, and at 371 the cartridges print a 5 dot resolution pitch wide vertical line segment at the designated horizontal location, using for example 48 nozzles in each cartridge, in second scan direction that is opposite the first scan direction.

Pursuant to steps 365 through 371, vertical test line segments are printed by each cartridge in each scan direction at a designed horizontal location. As a result of misalignments relative to the nominal mechanical specifications, the vertical test line segments are horizontally offset relative to each other, as shown in exaggerated form in FIG. 11, wherein the vertical lines VL(a,b) were printed by the $a^{th}$ cartridge in the $b^{th}$ scan or swath.

At 373, the optical sensor 65 is horizontally positioned at the predetermined horizontal location as utilized in step 355 above. At 375 the print media is rewound and then advanced to vertically align the sensor 65 with the nominal center of the first vertical line segment printed by the first cartridge C1, and the array index I is set to 0. At 377 the channel 0 and channel 1 outputs of the A/D converter 81 are read, and at 379 a background corrected value for the sensor difference signal H is calculated, and a value VAL(I) is calculated in accordance with:

$$VAL(I)=(H-B)/A \quad \text{(Equation 4)}$$

where the values for B and A were determined pursuant to the sensor horizontal position calibration of FIGS. 15A through 15C. VAL(I) represents the horizontal position of the Ith vertical line relative to a 0 horizontal location that is common to all of the vertical lines, but need not be explicitly defined, as discussed above relative to the calibration procedure.

At 379 the media is advanced by one-half swath, and at 381 a determination of made as to whether the media has been advanced 3 times pursuant to 379. If no, at 382 the index I is incremented by 1, and control transfers to 377 for another reading of the sensor difference signal H for another vertical test line. If the determination at 381 is yes, the media has been advanced 3 times pursuant to 379, control transfers to 383.

Pursuant to steps 375 through 382, the horizontal positions of the vertical test lines are determined and stored in the array VAL(I).

At 383, the arithmetic mean of the measured horizontal positions of the vertical test lines is calculated, and at 385 the horizontal correction values for each pen in each direction is calculated by subtracting the measured horizontal position from the mean of the array of horizontal positions VAL(I). Since the horizontal positions are in units of dot resolution pitches, the correction values are also in dot resolution pitches. At 387 the integer portion of the horizontal correction values are utilized to determine swath data shift corrections for each cartridge for each scan direction that will remove the coarse amounts of alignment error. At 389 the fractional part of the horizontal correction values are utilized to calculate cartridge timing delay corrections for each printhead cartridge for each scan direction that will remove the residual alignment error remaining after coarse correction. At 391 the existing swath data shifts and cartridge timing delay corrections are updated in accordance with the correction values determined at 387 and 389. At 393 the steps 353 through 391 are repeated for further convergence until (a) the calculated corrections are sufficiently small, or (b) corrections have been calculated a predetermined number of times.

It should be appreciated that pursuant to the repetition of steps 353 through 391, the swath data shifts and cartridge timing delay corrections are repeatedly updated, with the first update being relative to nominal data shift values and timing delay corrections of zero as set pursuant to step 351, and updates being made to previously updated data shift values and firing corrections.

At 395 an alignment procedure similar to the foregoing can be executed for the situation where each printhead cartridge contains a plurality of independently controllable primitives that are essentially vertically stacked multiple nozzle printing units, wherein each unit includes a plurality of nozzles. Such alignment would correct for rotational misalignment of the cartridges, sometimes called theta-z misalignments. For the example of each printhead cartridge having two primitives, one primitive having the top 25 nozzles and the other primitive having the lower 25 nozzles, the alignment procedure would involve printing and position detecting a total of eight (8) vertical test line segments: one for each primitive for each direction. Pursuant to calculated corrections based on primitives, the data column shift values and timing delay corrections can be updated as desired, starting with the data column shifts and timing delay corrections as updated at 391 for alignment based on full cartridge vertical lines.

The swath data shifts and cartridge timing delay corrections referred to in the foregoing procedure can achieved, for example, with circuitry and techniques disclosed in the previously referenced application Ser. No. 07/786,326, for "FAST FLEXIBLE PRINTER/PLOTTER WITH THETA-Z CORRECTION," by Chen, Corrigan, and Haselby. For instance, that application discloses Pixel Shuffler, Serial Link, and Theta-z Error Correction techniques as discussed above.

While the procedure of FIGS. 16A through 16C calculates correction values at 385 based on a single set of vertical test line segments, it should be appreciated that the horizontal positions of a plurality of sets of vertical test line segments can be utilized as follows:

1. The horizontal positions VAL(I, J) for a plurality of sets of vertical test lines located at different swath locations are calculated generally in accordance with steps 351 through 383, where I is the index for a set of vertical line segments at a given swath location and is indicative of cartridge and print direction, and J is the index for the sets of test lines. For alignment based on full nozzle height vertical lines printed by the two cartridges C1 and C2, then I=0,3; and J=0,N−1, where N sets of vertical lines are being averaged.

2. The average horizontal position AVAL(I) of the vertical lines printed by each pen in each direction is calculated as follows:

$$AVAL(0)=[VAL(0,0)+VAL(0,1)+ \ldots +VAL(0,N-1)]/N$$

$$AVAL(1)=[VAL(1,0)+VAL(1,1)+ \ldots +VAL(1,N-1)]/N$$

$$AVAL(2)=[VAL(2,0)+VAL(2,1)+ \ldots +VAL(2,N-1)]/N$$

$$AVAL(3)=[VAL(3,0)+VAL(3,1)+ \ldots +VAL(3,N-1)]/N$$

3. The arithmetic MEAN of the average horizontal positions and the corrections for each pen can be calculated as in steps 383 and 385 by substitution of the average horizontal positions AVAL(I) for the non-averaged horizontal positions utilized in steps 383 and 385:

$$MEAN=[AVAL(0)+AVAL(1)+AVAL(2)+AVAL(3)]/4$$

CORRECTION C1 DIRECTION RIGHT TO LEFT=MEAN−AVAL(0)

CORRECTION C21 DIRECTION RIGHT TO LEFT=MEAN−AVAL(1)

CORRECTION C1 DIRECTION RIGHT TO LEFT=MEAN−AVAL(2)

CORRECTION C21 DIRECTION RIGHT TO LEFT=MEAN−AVAL(3)

4. The foregoing correction values can then be utilized to arrive at swath data shifts and timing delay corrections in steps 387 and 389.

Figure 12:
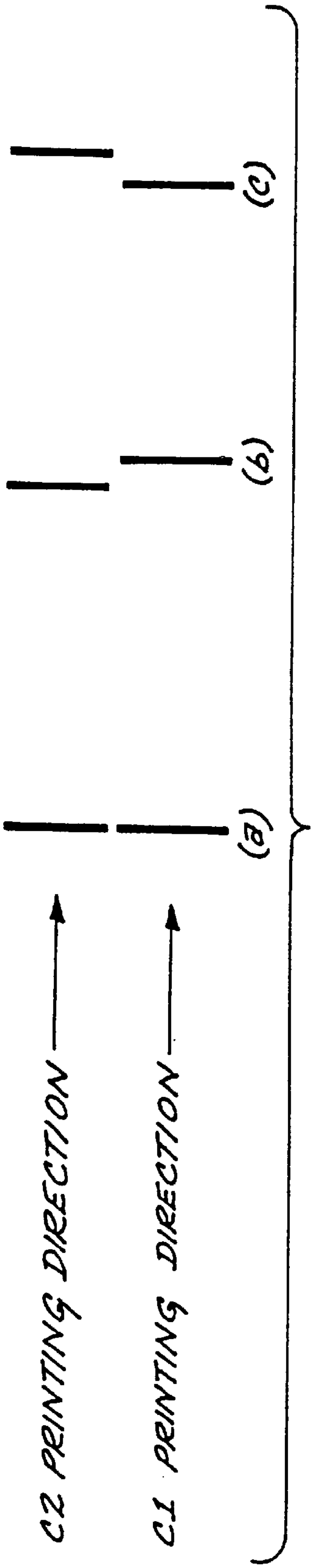
FIG. 12 illustrates in exaggerated form a plurality of vertical test line segments that can be utilized for horizontal alignment of the operation of the print cartridges of the swath printer of FIG. 1 for unidirectional printing.

While the foregoing horizontal alignment procedure is directed to horizontal alignment for bidirectional printing with both cartridges, horizontal alignment for unidirectional printing by both cartridges can be achieved with procedures similar to those set forth in FIGS. 15A through 15C and FIGS. 16A through 16C. After calibration of the optical sensor 65, background values for the test area are determined, vertical test lines at a test swath position are printed by both cartridges in the scan direction for which alignment is being sought, and the horizontal positions of the test lines relative to each other are determined to arrive at swath data shift and/or timing delay corrections. The test pattern produced would be one of three possible test patterns as represented by three pairs of vertical lines (a), (b), (c) in FIG. 12. The vertical lines (a) would be printed if the horizontal alignment between the printhead cartridges was proper. The vertical lines (b) would result if the print cartridge C2 lags the print cartridge C1 (or the print cartridge C1 leads the print cartridge C2). The vertical lines (c) would result if the print cartridge C1 lags the print cartridge C2 (or the print cartridge C2 leads the print cartridge C1). The relative positions of the two vertical test line segments would be utilized to provide swath data shift corrections and cartridge timing delay corrections.

Figure 13:
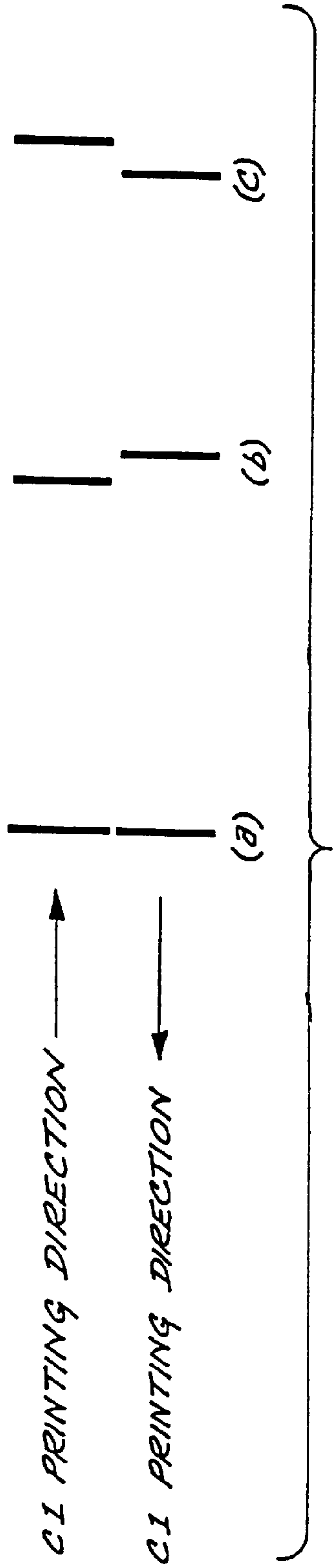
FIG. 13 illustrates in exaggerated form a plurality of vertical test line segments that can be utilized for horizontal alignment of the operation of the print cartridges of the swath printer of FIG. 1 for bidirectional printing with a single cartridge.

It would also be possible to provide for horizontal alignment for bidirectional printing by one print cartridge with procedures similar to those set forth in FIGS. 15A through 15C and FIGS. 16A through 16C. After sensor calibration, background values for the test area are determined, first and second vertical test lines at a selected swath location are printed in each of the carriage scan directions by the cartridge being aligned, and the horizontal positions of the vertical lines relative to each other are determined to arrive at data shift and/or timing delay corrections. The test pattern produced would be one of three possible test patterns as represented three pairs of vertical lines (a), (b), (c) in FIG. 13. The vertical lines (a) indicate that the spacing between the print cartridge and the print media is proper; the vertical segments (b) indicate that the spacing between the print cartridge and the print media is too small; and the vertical segments (c) indicate that the spacing between the print cartridge and the print media is too large. If the spacing is not proper, appropriate swath data shifts and/or cartridge delay corrections can be provided for one or both of the carriage scan directions.

Figure 14:
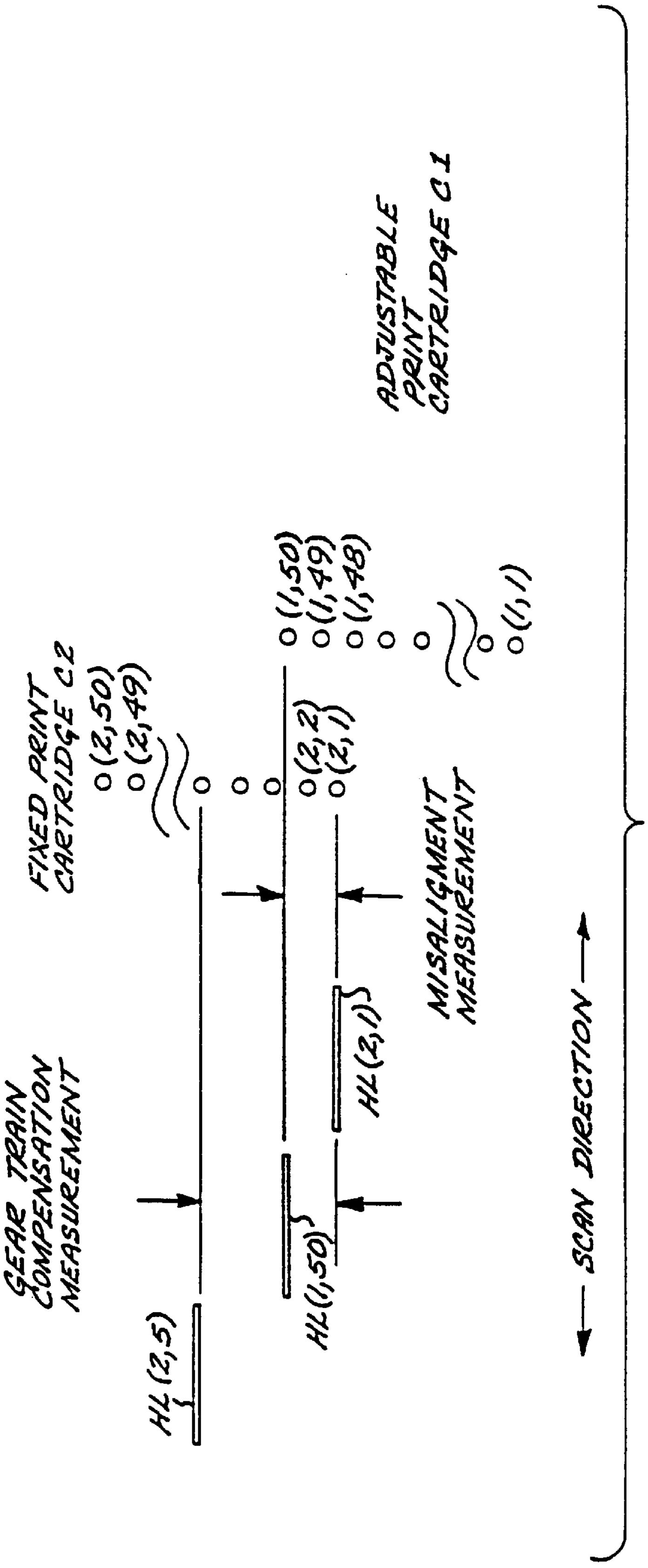
FIG. 14 illustrates in exaggerated form a series of horizontal test line segments that can be utilized for vertical alignment of the print cartridges of the swath printer of FIG. 1.

Vertical alignment can generally be achieved by printing a plurality of non-overlapping horizontal test lines with at least one nozzle of each of the printhead cartridges, utilizing the optical sensor 65 to precisely detect the vertical positions of the plurality of non-overlapping horizontal test line segments relative to a fixed reference, and processing the relative positions to arrive at an adjustment for the position of the first printhead cartridge C1. FIG. 14 sets forth by way of illustrative example horizontal test line segments HL(1, 50), HL(2,1), HL(2,5), which are respectively printed by nozzle 50 of the first print cartridge, the nozzle 1 of the second print cartridge, and the nozzle 5 of the second cartridge; and FIGS. 17A through 17G set forth a flow diagram of a procedure for achieving vertical alignment pursuant to printing and detecting the relative positions of such lines. It should be appreciated that the horizontal line segments are identified in the form of HL(c,d) where c identifies the cartridge number and d identifies the nozzle. Pursuant to the flow diagram of FIGS. 17A through 17G, the adjustment cam 111 is rotated to a known position, background values for the sensor difference signal V are calculated for locations on the print media where the sensor will be positioned for detecting the positions of horizontal test line segments to be printed later, the horizontal test line segments are printed, and the positions of the horizontal test line segments are determined by incrementally moving the print media relative to a fixed start position and calculating a value for the sensor difference signal V at each incremental position.

Referring in particular to FIGS. 17A through 17G, at 511 the carriage is moved so that the cam lever 117 is to the right of the cam actuator arm 121 which is in the raised position, and at 513 the cam actuator arm 121 is lowered. At 515 the carriage 51 is moved to the left so that the cam lever 117 is engaged by the cam actuator arm 121 and rotated against the right cam stop 119. At 517 the carriage 51 is moved to the right by one-quarter inch to disengage the cam actuator arm 121 from the cam lever 117, and at 519 the cam actuator arm 121 is raised. At 521 the carriage 51 is moved to the left so that the cam lever 117 is to the left of the actuator arm 121, and at 523 the actuator arm 121 is lowered. At 525 the carriage 51 is moved to the right to remove linkage backlash, and to move the cam lever 117 from the cam stop 19 to a known initial position relative to the carriage 51. At 527 the carriage 51 is moved to the left by one-quarter inch to disengage the cam lever 117 from the cam actuator arm 121, and at 529 the cam actuator arm 121 is raised.

Pursuant to steps 511 through 525, the cam lever 117 is set to an initial known position with respect. to the carriage 51. The carriage position along the carriage scan axis after moving the cam lever 117 to the initial known position is saved as a carriage reference position for later use to advance the cam lever further away from the right cam stop 119 (i.e., counterclockwise as viewed from above), as described further herein. Generally, the final carriage position corresponding to the final adjusted cam lever position will be based on the saved carriage reference position and a calculated additional carriage displacement necessary to move the cam lever 117 to its final adjusted position. Thus, for the final adjustment, the cam actuator arm 121 will be raised and the carriage 51 will be positioned so that the cam lever is to the left of the actuator arm 121. The cam actuator arm 121 would then be lowered, and the carriage 51 would be moved to the right to the final carriage position for cam adjustment, so as to move the cam lever 117 in a counterclockwise direction, as viewed from above, from the initial known position.

At 537 the carriage is positioned so that the optical sensor 65 is positioned over the location on the print media 61 of the nominal horizontal center of the horizontal line HL(2,1) line to be printed later. At 539 the print media 61 is rewound past a predetermined start location that will be used for all sensor detection operations, and is then advanced to the predetermined start location so as to remove backlash in the media drive gear train. The predetermined start location is selected so that all of the horizontal test lines will be close to the center of a vertical scan of 50 resolution dot pitches, for example. At 541 the channel 0 and channel 1 outputs of the A/D converter 81 are read, and a value of the background value of the difference signal V is calculated pursuant to Equation 2 for the particular vertical position of the print media 81. At 543 the background value for the present vertical location is stored in an array for the horizontal line HL(2,1), and at 545 the print media 61 is advanced by one resolution dot pitch. At 547 a determination is made as to whether the media 61 has been advanced 50 resolution dot pitches since the media was positioned at the predetermined start location in step 537. If no, control returns to 541 for calculation of further media background values of the sensor difference signal V. If the determination at 547 is yes, the media 61 has been advanced 50 times, the process continues to step 549.

Pursuant to steps 537 through 547, background values of the sensor difference signal V are calculated for each of the positions on the media for which values of the sensor difference signal V will be calculated in conjunction with determining the position of the horizontal line HL(2,1) to be printed later. The background values will later be subtracted from the values of the sensor difference signal V calculated for the same locations for determining the position of the horizontal line HL(2,1) after such line has been printed.

Steps 549 through 559 are similar to steps 537 through 547, and are performed to obtain media background values of the sensor difference signal V for the media positions for which values of the sensor difference signal V will be calculated in conjunction with determining the position of the horizontal line HL(1,50).

Steps 561 through 571 are also similar to steps 537 through 547, and are performed to obtain media background values of the sensor difference signal V for the media positions for which values of the sensor difference signal V will be calculated in conjunction with determining the position of the horizontal line HL(2,5).

At 572 the media drive is backed and then advanced to the location where the test lines are to be printed. At 573 one nozzle wide horizontal lines corresponding to the test lines are printed by the nozzles (2,5), (1,50), and (2,1) in one scan, and at 575 the print media is advanced by one resolution dot pitch. At 577 a determination is made as to whether the one nozzle wide test lines have been printed three times. If no, control returns to 573 to print further one nozzle wide test lines at the same horizontal locations. If the determination at 577 is yes, the one nozzle wide test lines have been printed three times, control transfers to 353. Essentially, the steps 573 through 577 causes the printing of horizontal test lines which are three nozzles wide as measured in the media scan direction, which provides for a larger optical sensor output.

At 579 the carriage is positioned so that the optical sensor 65 is positioned over the location of the nominal horizontal center of the horizontal test line segment HL(2,1). At 581 the print media 61 is rewound past the predetermined start location utilized for all sensor detection operations, and is then advanced to the predetermined start location so as to remove backlash in the media drive gear train. At 583 the channel 0 and channel 1 outputs of the A/D converter 81 are read, and a background corrected value for the difference signal V is calculated. At 585 the background corrected difference value for the present vertical media location is stored in the result array for the horizontal line HL(2,1), and at 587 the print media 61 is advanced by one resolution dot pitch. At 589 a determination is made as to whether the media 61 has been advanced 50 resolution dot pitches since the media was positioned at the predetermined start location in step 579. If not, control returns to 583 for calculations of further values of the sensor difference signal V.

If the determination at 589 is yes, the media has been advanced 50 times, at 591 the background corrected difference signal V data is correlated with a signal template that resembles the useful center portion of an ideal curve of the difference signal V. The template function has fewer data points than the stored array of background corrected values of the vertical difference signal V, and the array position of the vertical difference signal value at the center of the sequence of background corrected difference signal values that produces the maximum correlation is saved as the maximum correlation index. At 593 the background corrected value of the vertical difference signal V corresponding to the maximum correlation index and the three background corrected values of the difference signal V on either side thereof are utilized for a linear regression that determines the best fit straight line:

$$V=A*VPOS+B \quad \text{(Equation 5)}$$

where V is the background corrected vertical difference signal V calculated at step 583, VPOS is vertical line position relative to predetermined vertical start location, A is the slope, B is the hypothetical value of V according to the best fit line for a horizontal line located at the predetermined vertical start location. At 595 the vertical position for the line HL(2,1) relative to the predetermined vertical start location is set equal to −B/A, which follows from setting V equal to zero in Equation 5 above.

Pursuant to steps 579 through 595, values of the sensor vertical difference signal V are determined for locations spaced one resolution dot pitch apart over a vertical range that extends above and below the horizontal test line segment HL(2,1) in order to calculate a vertical position for the line relative to the predetermined vertical start location.

Steps 597 through 612 are performed to determine the vertical position of the line HL(1,50) relative to the predetermined vertical start location, and are similar to steps 579 through 595.

Steps 613 through 629 are performed to determine the vertical position of the line HL(2,5) relative to the predetermined vertical start location, and are also similar to steps 579 through 595.

At 631 a pen correction value PEN CORR is calculated by subtracting V(1,50) from V(2,0), and at 633 a gear train correction value GEAR CORR is calculated by dividing the nominal distance between the nozzles (2,5) and (2,1) (i.e., 4 dot pitches) by the calculated distance between such nozzles. At 635 the pen correction value PEN CORR calculated at 631 is multiplied by the gear correction value GEAR CORR to arrive at a final pen correction value PEN CORR. From the calculations for the final pen correction value PEN CORR, it should be appreciated that a positive value of PEN CORR indicates no overlap between the cartridge C1 nozzles and the cartridge C2 nozzles, while a negative value of PEN CORR indicates overlap.

The gear train correction value GEAR CORR corrects for cyclical gear errors in the media drive mechanism that could result in a slightly different gear ratio in the region of the horizontal test lines that are being measured. It is a second order effect but can be normalized using the measurement procedure described above so as to reference the misalignment distance (which is between the horizontal lines HL(2,1) and HL(1,50)) to the measured gear compensation distance (which is between HL(2,1) and HL(2,5)), rather than referencing the misalignment distance to an absolute rotation of the media drive motor encoder.

At 637, the lowermost enabled nozzles for the cartridges C1, C2 and a PEN MOTION value are determined by comparing the final pen correction value PEN CORR with certain empirically determined limits.

If PEN CORR is greater than or equal to 1.0 and less than 4.0, Case 1 applies: low nozzle for cartridge 2 is (2,1), low nozzle for cartridge C1 is (1,3), and PEN MOTION is equal to −(PEN CORR−1).

If PEN CORR is greater than or equal to 0.0 and less than 1.0, Case 2 applies: low nozzle for cartridge 2 is (2,1), low nozzle for cartridge C1 is (1,2), and PEN MOTION is equal to −PEN CORR.

If PEN CORR is greater than or equal to −1.0 and less than 0.0, Case 3 applies: low nozzle for cartridge 2 is (2,1), low nozzle for cartridge C1 is (1,1), and PEN MOTION is equal to −(PEN CORR+1).

If PEN CORR is greater than or equal to −2.0 and less than −1.0, Case 4 applies: low nozzle for cartridge 2 is (2,2), low nozzle for cartridge C1 is (1,1), and PEN MOTION is equal to −(PEN CORR+2).

If PEN CORR is greater than or equal to −3.0 and less than −2.0, Case 5 applies: low nozzle for cartridge 2 is (2: 3), low nozzle for cartridge C1 is (1,1), and PEN MOTION is equal to −(PEN CORR+3).

Pursuant to Cases 2 through 5 in step 637, appropriate sets of nozzles are selected for the printhead cartridges such that the vertical distance between the uppermost enabled nozzle of the cartridge C1 and the lowermost enabled nozzle of cartridge C2 is greater than or equal to 1 nozzle pitch but less than 2 nozzle pitches. This effectively implements the integer portion of the calculated correction. The fractional part of the calculated correction will be implemented by adjusting the position of the cartridge C1 so that the vertical distance between the uppermost enabled nozzle of the cartridge C1 and the lowermost enabled nozzle of cartridge C2 is substantially one nozzle pitch. Thus, as to Cases 2 through 5, the cam adjustment will be less than one nozzle pitch. Effectively, if there is overlap or if there is not overlap and the vertical distance between the top nozzle of the cartridge C1 and the bottom nozzle of the cartridge C2 is less than one nozzle pitch, nozzle selection is utilized in such that the vertical distance between the uppermost enabled nozzle of the cartridge C1 and the lowermost enabled nozzle of cartridge C2 is greater than or equal to 1 nozzle pitch but less than 2 nozzle pitches. Cam adjustment provides for the residual correction.

Case 1 is a special case where the nozzles of the cartridges C1, C2 do not overlap along the vertical direction with the cam in the reference position, and the cam adjustment must be greater than one nozzle pitch.

By way of illustrative example, a nominal nozzle overlap between cartridges of about 1 to 2 nozzle pitches and a total cam actuated mechanical adjustment range for the print cartridge C1 of about 2½ nozzle pitches provide for a total adjustment range of about ±4 nozzle pitches to correct for print cartridge manufacturing tolerances, retaining shoe manufacturing tolerances, and cartridge insertion tolerances.

The total equivalent adjustment of the printhead cartridge C1 to the cartridge C2 is thus achieved by (a) selecting the appropriate series of nozzles for use and (b) mechanically moving the print cartridge C1 to remove any misalignment remaining after nozzle selection. Only Case 1 of step 637 requires moving the print cartridge C1 more than one nozzle pitch toward the print cartridge C1, since Case 1 is for the situation where the cartridges are too far apart along the media scan axis and correction by nozzle selection is not possible.

For the arrangement shown in FIG. 14, Case 4 would apply since the PEN CORR for the lines HL(2,1) and HL(1,50) as shown would be greater than −2.0 and less than −1.0 resolution dot pitches. PEN CORR would be a positive fraction less than 1.0, which means that nozzle (1,48) will be brought closer to nozzle (2,2) along the media scan axis.

At 639 the high nozzles for each cartridge are determined by adding 47 to the low nozzle numbers, and at 641 the carriage travel distance CAM DIST in linear encoder counts for cam adjustment is calculated by multiplying PEN MOTION by ARM CONSTANT, where ARM CONSTANT is a constant that converts PEN MOTION, which is the number of nozzle pitches that cartridge C1 is to be brought closer along the media scan axis to the cartridge C1, to carriage displacement required to move the cam lever 117 with the cam actuator arm 121. ARM CONSTANT can be determined analytically or empirically, and the linear relation between CAM DIST and PEN MOTION is based on the cam 111 being designed so that an essentially linear relation exists between (a) carriage motion while moving the cam arm and (b) effective nozzle displacement along the media scan axis.

Alternatively, CAM DIST can be non-linearly related to PEN MOTION, and such relation can be derived analytically or empirically. Empirical data can be produced, for example, by incrementally positioning the cam pursuant by moving the carriage to known locations spaced by a predetermined number of encoder counts and measuring the resulting values of PEN CORR at each of the carriage locations. Pursuant to the empirical data, a function or look-up table scheme can be produced to relate cam moving carriage motion to change in nozzle distance.

At 643, with the cam actuator in the raised position, the carriage is moved to the left side thereof. At 645 the cam actuator arm is lowered, and at 649 the carriage is moved to the right to a position equal to the carriage reference position saved previously at step 525 and the CAM DIST value calculated above in step 641. This in effect moves the cam an amount corresponding to the carriage movement of CAM DIST, since in absolute scan axis encoder position the cam was left at the reference position saved at step 525. At 651 the carriage is moved left by ¼ of an inch so as to clear the cam arm from the cam adjustment actuator, and at 653 the cam adjustment actuator arm is raised. The vertical axis or media axis alignment procedure is then completed.

In the foregoing procedure for vertical alignment, the logically enabled nozzles are selected to correct the calculated misalignment to the closest integral nozzle pitch, except for Case 1 in step 637, and any remaining fractional dot pitch correction, as well as the correction for Case 1, is made in a fixed direction by physical carriage dimensional adjustment. It is also contemplated that the vertical alignment can be achieved by using only selection of logically enabled nozzles, for example in a swath printer having a sufficiently high resolution so that the residual fractional dot pitch errors do not produce objectionable print quality, and further having mechanical tolerances that assure overlapping or non-overlap with the vertical distance between the top nozzle (1,1) of the cartridge C1 and the bottom nozzle (2,50) of the cartridge C2 being less than one nozzle pitch. The enabled nozzles would then be selected as desired so that the enabled nozzles are non-overlapping, for example on the basis of print quality, achieving a remaining error of less than one nozzle pitch, or achieving a vertical distance between the top enabled nozzle of the cartridge C1 and the bottom enabled nozzle of the cartridge C2 that closest to one nozzle pitch, even if the resulting vertical distance is greater than one nozzle pitch.

While the foregoing disclosure sets forth one procedure for detecting relative positions of horizontal test line segments and another procedure for detecting relative positions of vertical test line segments, it should be appreciated that the procedure for horizontal test lines can be adapted for vertical test lines, and the procedure for vertical test lines can be adapted to horizontal test lines, depending upon the resolution and accuracy of the carriage positioning and media positioning mechanisms with which the procedures are implemented. It should also be appreciated as to detecting the positions of horizontal and vertical test lines that other types of sensors could be utilized, including for example charge coupled device (CCD) arrays. As a further alternative one dual detector could be utilized for detecting the positions of horizontal lines, and another dual detector could be utilized for detecting vertical lines.

While the disclosed apparatus and techniques for alignment of print element arrays have been discussed in the context of an ink jet printer having two printheads, the disclosed apparatus and techniques can be implemented with ink jet printers which have more than two printheads or nozzle arrays arranged to increase swath height, and also with other types of raster type printers such as pin type impact printers. Further, the horizontal alignment techniques can be implemented to correct for bidirectional printing errors of a single print element array printer such as a single cartridge ink jet printer.

The foregoing has been a disclosure of apparatus and techniques for efficiently and reliably achieving alignment of the printhead cartridges of a multiple printhead swath printer, which provides for improved continuous graphics throughput with high print quality. The disclosed apparatus and techniques in particular provide for high print quality with bidirectional printing with a multiple printhead ink jet printer. The disclosed apparatus and techniques advantageously avoid extremely tight mechanical tolerances, compensate for processing variations as well as voltage and temperature effects of electrical components, and compensate for print cartridge mounting errors that result from insertion of the cartridges into the cartridge retaining shoes which cannot be corrected by manufacturing tolerance control.

Although the foregoing has been a description and illustration of specific embodiments of the invention, various modifications and changes thereto can be made by persons skilled in the art without departing from the scope and spirit of the invention as defined by the following claims.

What is claimed is:

1. A swath printing system for calibrating and correcting alignment differences between a plurality of nozzle arrays mounted on a carriage for printing on a pixel grid comprising:

a first printhead with a first array of ink-firing nozzles;

a second printhead with a second array of ink-firing nozzles;

a carriage for mounting said first and second printheads in predetermined positions;

a guide member mounting said carriage to allow said carriage to move back and forth along a carriage scan axis over print media;

a motor for periodically advancing the print media in a path along a media axis;

a position encoder operatively connected to said carriage to determine changes in position of said carriage along said carriage scan axis; and a controller coupled to said position encoder and said printheads for respectively activating said first array to print a first test line segment and said second array to print a second test line segment spaced apart from said first test line segment, and as a result of a perceived offset between said first and second test line segments, said controller maps data to arrive at the ink-firing nozzles when the nozzles are over an appropriate location of the pixel grid as said carriage traverses along said carriage scan axis.

2. The printing system of claim 1 wherein said controller causes data shifts to occur between said ink-firing nozzles in order to compensate for misalignment between printheads bases on the perceived offset between said first and second test line segments.

3. The printing system of claim 1 wherein said controller causes a change in section of logically enabled ink-firing nozzles in order to compensate for misalignment between printheads bases on the perceived offset between said first and second test line segments.

4. The printing system of claim 1 wherein said controller causes a change in timing of an activation pulse sent to said ink-firing nozzles in order to compensate for misalignment between printheads bases on the perceived offset between said first and second test line segments.

5. The printing system of claim 1 wherein said controller causes a correction of one or more unitary dot pitches on the pixel grid.

6. The printing system of claim 5 wherein said controller causes a correction of said unitary dot pitches in a direction of said carriage scan axis.

7. The printing system of claim 5 wherein said controller causes a correction of said unitary dot pitches in a direction of said media axis.

8. The printing system of claim 3 wherein said controller causes a correction of a fractional dot pitch on the pixel grid.

9. The printing system of claim 10 wherein said controller causes a correction of said fractional dot pitch in a direction of said carriage scan axis.

10. The printing system of claim 10 wherein said controller causes a correction of said fractional dot pitch in a direction of said media axis.

11. The printing system of claim 3 wherein said first and second test line segments are horizontal line segments having a vertical offset which serves as a basis for determining printhead misalignment along the media axis.

12. The printing system of claim 3 wherein said first and second test line segments are vertical line segments having a horizontal offset which serves as a basis for determining printhead misalignment along the carriage scan axis.

13. The printing system of claim 3 wherein said first and second printheads are mounted in said carriage in predetermined positions such that said first and second arrays of ink-firing nozzles are at least partially overlapping along said media axis.

14. A method for aligning cartridges in an inkjet printer having plural inkjet cartridges, comprising:

a. determining an offset between nozzles on a first cartridge and nozzles on a second cartridge;

b. logically enabling a first array of nozzles on the first cartridge and a second array of nozzles on the second cartridge such that the first and second enabled arrays are non-overlapping in the media scan direction; and c. mapping image data to the first and second enabled arrays in accordance with the determined offset.

15. The method according to claim 14, wherein said logically enabling comprises selectively turning off at least one nozzle on a cartridge to define the enabled array for said cartridge.

16. The method according to claim 15, wherein said arrays are enabled to provide a distance between the enabled arrays equal to approximately one nozzle pitch.

17. The method according to claim 16, further comprising mechanically positioning said first and second cartridges with respect to one another such that the distance between enabled arrays is one nozzle pitch.

18. A method for calibrating and correcting alignment differences between a plurality of nozzle arrays mounted on a carriage for printing on a pixel grid, the method comprising the steps of:

a. determining a relative overlap between upper nozzles of a first nozzle array and lower nozzles of a second nozzle array; and b. selectively enabling nozzles of the first and second nozzle arrays based upon the relative overlap such that a properly aligned image is produced.

* * * * *

UNITED STATES PATENT AND TRADEMARK OFFICE

CERTIFICATE OF CORRECTION

PATENT NO. : 6,241,334 B1
DATED : June 5, 2001
INVENTOR(S) : Robert D. Haselby

It is certified that error appears in the above-identified patent and that said Letters Patent is hereby corrected as shown below:

Title page,
Item [54], Title should be changed to -- CALIBRATION SYSTEM TO CORRECT PRINTHEAD MISALIGNMENT --

Column 2,
Line 33, after "... controller," add -- for --

Column 3,
Line 8, after "...flow diagram," delete -- flow diagram --

Column 4,
Line 47, after "...printed by," delete -- with --

Column 6,
Line 5, after "...avoids the use," add -- of --
Line 10, after "...direction." delete -- Also --
Line 12, after "...moves," add -- to --

Column 7,
Line 2, correct "199" to -- 1099 --

Column 8,
Line 42, correct "ap" to -- as --
Line 54, after "...the latching of," delete -- , --

Column 9,
Lines 50-51, after "...column_offset," delete -- -pen_offset --

Column 11,
Line 9, correct "714" to -- 1714 --

Column 12,
Line 3, correct "ad" to -- and --

Column 14,
Lines 6-9, numbers should not be bold

UNITED STATES PATENT AND TRADEMARK OFFICE

CERTIFICATE OF CORRECTION

PATENT NO. : 6,241,334 B1
DATED : June 5, 2001
INVENTOR(S) : Robert D. Haselby

It is certified that error appears in the above-identified patent and that said Letters Patent is hereby corrected as shown below:

Column 15,
Line 11, correct "shirt" to -- shift --
Lines 33-35, after "printhead." delete -- Although only four controllers are shown, a separate controller may be provided for each nozzle of each printhead. --
Line 66, correct "sate" to -- state --

Column 17,
Line 67, correct "extend" to -- extended --

Column 18,
Line 41, after '...set forth," add -- in --
Line 58, correct "theia" to the -- media --

Column 19,
Line 29, after "...just printed," delete -- in --

Column 20,
Line 41, after "...then advanced to," delete -- a --

Column 21,
Line 33, after "...a determination," correct "of" -- to is --

Column 27,
Line 54, correct "C1" to -- C2 --

Column 28,
Line 4, correct "C1" to -- C2 --
Line 56, after "...C2 that," add -- is --

UNITED STATES PATENT AND TRADEMARK OFFICE

CERTIFICATE OF CORRECTION

PATENT NO. : 6,241,334 B1
DATED : June 5, 2001
INVENTOR(S) : Robert D. Haselby

It is certified that error appears in the above-identified patent and that said Letters Patent is hereby corrected as shown below:

<u>Column 30,</u>
Line 7, correct "section" to -- selection --
Lines 9 and 14, correct "bases" to -- based --
Lines 24, 32, 36, and 40, correct "3" to -- 1 --
Lines 26 and 29, correct "10" to -- 8 --

Signed and Sealed this

First Day of January, 2002

*Attest:*

JAMES E. ROGAN

*Attesting Officer*

*Director of the United States Patent and Trademark Office*